United States Patent
Imanaka et al.

(10) Patent No.: US 8,758,896 B2
(45) Date of Patent: Jun. 24, 2014

(54) METHOD FOR FORMING MULTILAYER COATING FILM

(75) Inventors: Kenji Imanaka, Miyoshi (JP); Yukihiro Ikeura, Miyoshi (JP); Hironori Tonomura, Miyoshi (JP); Hiroshi Kitagawa, Hiratsuka (JP); Tatsuya Azuma, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 13/805,362

(22) PCT Filed: Jun. 29, 2011

(86) PCT No.: PCT/JP2011/065418
§ 371 (c)(1),
(2), (4) Date: Dec. 19, 2012

(87) PCT Pub. No.: WO2012/002569
PCT Pub. Date: Jan. 5, 2012

(65) Prior Publication Data
US 2013/0089731 A1    Apr. 11, 2013

(30) Foreign Application Priority Data

| Jul. 2, 2010 | (JP) | 2010-152504 |
| Jul. 9, 2010 | (JP) | 2010-156933 |
| Aug. 11, 2010 | (JP) | 2010-180372 |
| Jan. 18, 2011 | (JP) | 2011-007734 |

(51) Int. Cl.
*B05D 1/36* (2006.01)

(52) U.S. Cl.
USPC ............... 428/411.1; 427/409; 427/384

(58) Field of Classification Search
CPC ........................................... B05D 7/16
USPC ............ 427/407.1, 409, 372.2, 379, 384; 428/411.1–704
See application file for complete search history.

(56) References Cited

U.S. PATENT DOCUMENTS 5,258,446 A * 11/1993 Enomoto et al. ............ 524/538
8,008,393 B2 * 8/2011 Iida et al. ................. 524/523

FOREIGN PATENT DOCUMENTS

| GB | 2 458 772 | 10/2009 |
| JP | 2002-179758 A * | 6/2002 |
| JP | 2002-179759 A * | 6/2002 |
| JP | 2003-251276 | 9/2003 |
| JP | 2004-097917 | 4/2004 |
| WO | 2007/043633 | 4/2007 |
| WO | 2009/014226 | 1/2009 |
| WO | WO 2009/014226 A2 * | 1/2009 |
| WO | 2009/157588 | 12/2009 |

OTHER PUBLICATIONS

International Search Report issued Nov. 23, 2011 in International (PCT) Application No. PCT/JP2011/065418.
Written Opinion issued Nov. 23, 2011 in International (PCT) Application No. PCT/JP2011/065418.

* cited by examiner

*Primary Examiner* — William Phillip Fletcher, III
(74) *Attorney, Agent, or Firm* — Wenderoth, Lind & Ponack, L.L.P.

(57) ABSTRACT

An object of the invention is to provide a method for forming a multilayer coating film with excellent smoothness, distinctness of image, and water resistance, by a 3-coat 1-bake coating method, even when preheating after the application of an aqueous first colored coating composition is omitted. The present invention provides a method for forming a multilayer coating film, including (1) applying an aqueous colored coating composition (A) to a substrate to form a colored coating film; (2) applying an effect pigment-containing aqueous coating composition (B) containing a binder component (b1), an effect pigment (b2), and a hydrophobic solvent (b3) in proportions of 15 to 30 parts by mass of effect pigment (b2) and 25 to 60 parts by mass of hydrophobic solvent (b3) relative to 100 parts by mass of the binder component (b1), to the colored coating film, without preheating the colored coating film, to form an effect coating film having a film thickness of 7 to 13 micrometers when cured; (3) applying a clear coating composition (C) to the effect coating film to form a clear coating film; and (4) heating the three coating films formed in steps (1) to (3) to simultaneously cure these three coating films.

14 Claims, No Drawings

METHOD FOR FORMING MULTILAYER COATING FILM

TECHNICAL FIELD

This application claims priority to JP Application No. 2010-152504, filed Jul. 2, 2010, JP Application No. 2010-156933, filed Jul. 9, 2010, JP Application No. 2010-180372, filed Aug. 11, 2010, and JP Application No. 2011-007734, filed Jan. 18, 2011, the disclosure of which is incorporated herein by reference in its entirety.

The present invention relates to a method capable of forming a multilayer coating film having excellent smoothness, distinctness of image, and water resistance, by a 3-coat 1-bake process. The present invention also relates to an article coated by this method.

BACKGROUND ART

Hitherto, a method for forming a multilayer coating film by a 3-coat 2-bake (3C2B) process is widely used as a method for forming a coating film on automobile bodies. This method sequentially comprises the following steps after applying an electrodeposition coating composition to a substrate, followed by heat-curing: application of an intermediate coating composition→curing by baking→application of a base coating composition→preheating (preliminary heating)→application of a clear coating composition→curing by baking. In general, this 3-coat 2-bake process is widely used for forming a coating film with a so-called metallic color by using a base coating composition containing an effect pigment (a luster pigment).

However, in recent years, for the purpose of saving energy, consideration has been given to omitting the bake-curing step that is performed after applying the intermediate coating composition, and using a 3-coat 1-bake (3C1B) process sequentially comprising the following steps: application of an intermediate coating composition→preheating (preliminary heating)→application of a base coating composition→preheating (preliminary heating)→application of a clear coating composition→curing by baking. From the viewpoint of reducing the environmental pollution caused by the vaporization of organic solvents, the establishment of a 3-coat 1-bake process using aqueous coating compositions as the intermediate coating composition and the base coating composition is particularly desired. It is also desired, for further energy savings, to omit the preheating step that is performed after applying the intermediate coating composition.

However, in the above-described 3-coat 1-bake process using an aqueous intermediate coating composition and an aqueous base coating composition, a resulting coating film is likely to have insufficient water resistance due to the use of a water-soluble or water-dispersible resin, as well as insufficient smoothness and distinctness of image due to the formation of a mixed layer from the aqueous intermediate coating composition and the aqueous base coating composition. In particular, when the preheating step that is performed after applying the intermediate coating composition is omitted, significant mixing of the aqueous intermediate coating composition and aqueous base coating composition occurs at the interface between the aqueous intermediate and aqueous base coating layers, resulting in the formation of a coating film with considerably deteriorated smoothness and distinctness of image.

In order to solve such problems, Patent Literature (PTL) 1 discloses a 3-coat 1-bake multilayer coating film forming method comprising sequentially applying an aqueous first colored coating composition, an aqueous second colored coating composition, and a clear coating composition. The method of PTL 1 comprises: applying, as the aqueous first colored coating composition (A), an aqueous colored coating composition (A) that contains 50 to 90 parts by weight of an urethane emulsion (a), and 10 to 200 parts by weight of a pigment component (c), relative to 100 parts by weight of the solids content of a resin component, and that has a solids content of 45 to 65 wt %; subjecting the resulting coating film to setting at an ordinary temperature, without air blowing or preheating; adjusting the viscosity of the coating film to $1 \times 10^3$ Pa·s or higher (at 20° C., and a shear rate of 0.1 sec$^{-1}$); and applying the aqueous second colored coating composition having a solids content of 15 to 50 wt %. In this method, PTL 1 further discloses that, no matter which portion (e.g., a horizontal or vertical portion) of a substrate the compositions are applied, a multilayer coating film can be obtained that has excellent finished appearance, and that does not have sagging, a mixed layer formed from the compositions, etc. Even in this multilayer coating film-forming method, however, there was a case where the resulting coating film was insufficient in smoothness and distinctness of image.

PTL 2 relates to a method for forming a multilayer coating film, comprising the steps of: applying an aqueous intermediate coating composition to a substrate to form an uncured intermediate coating film; applying an aqueous base coating composition to form an uncured base coating film; applying a clear coating composition to form an uncured clear coating film; and heating the uncured intermediate coating film, the uncured base coating film, and the uncured clear coating film to simultaneously cure these three coating films. However, PTL 2 discloses that it is preferable to perform preheating after the application of the aqueous intermediate coating composition, considering the finished appearance of the resulting film. This requires the heating step to be performed three times, and the method is therefore insufficient in terms of reduction in steps.

CITATION LIST

Patent Literature

PTL 1: Japanese Unexamined Patent Publication No. 2004-97917
PTL 2: Japanese Unexamined Patent Publication No. 2003-251276

SUMMARY OF INVENTION

Technical Problem

An object of the present invention is to provide a method capable of forming a multilayer coating film having excellent smoothness, distinctness of image, and water resistance, by a 3-coat 1-bake process using an aqueous first colored coating composition, an aqueous second colored coating composition, and a clear coating composition, even when preheating after the application of the aqueous first colored coating composition is omitted. Another object of the present invention is to provide an article coated by this method for forming a multilayer coating film.

Solution to Problem

As a result of extensive research to achieve the above object, the present inventors found the following: in a method for forming a multilayer coating film by a 3-coat 1-bake process comprising sequentially applying to a substrate an aqueous first colored coating composition, an aqueous second colored coating composition, and a clear coating composition, when an effect pigment-containing aqueous coating composition that contains specific amounts of an effect pigment and a hydrophobic solvent, and that has a solids concentration within a specific range is used as the aqueous second colored coating composition; and when such an effect pigment-containing aqueous coating composition is applied to obtain a film thickness that falls within a specific range when cured, a multilayer coating film having excellent smoothness, distinctness of image, and water resistance can be formed, even when preheating after applying the aqueous first colored coating composition is omitted. Thereby, the present invention is accomplished.

More specifically, the present invention provides a method for forming a multilayer coating film by sequentially performing the following steps (1) to (4):

(1) applying an aqueous colored coating composition (A) to a substrate to form an uncured colored coating film;

(2) applying an effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), to the uncured colored coating film formed in step (1), without preheating the uncured colored coating film, to form an uncured effect (luster) coating film having a film thickness of 7 to 13 µm when cured;

(3) applying a clear coating composition (C) to the uncured effect coating film formed in step (2) to form an uncured clear coating film; and (4) heating the uncured colored coating film, the uncured effect coating film, and the uncured clear coating film formed respectively in steps (1) to (3) to simultaneously cure these three coating films.

The present invention also provides an article coated by this method for forming a multilayer coating film.

Advantageous Effects of Invention

According to the method for forming a multilayer coating film of the present invention, in a 3-coat 1-bake coating method using an aqueous first colored coating composition, an aqueous second colored coating composition, and a clear coating composition, the formation of a mixed layer from the first colored coating composition and the second colored coating composition can be effectively prevented. For this reason, the method of the present invention can form a multilayer coating film having excellent smoothness, distinctness of image, and water resistance, even when preheating after applying the aqueous first colored coating composition is omitted.

DESCRIPTION OF EMBODIMENTS

Hereinafter, the method for forming a multilayer coating film of the present invention is described in further detail.

(I) First Embodiment

As described above, the present invention provides a method for forming a multilayer coating film as stated in Item 1A below:

Item 1A. A method for forming a multilayer coating film by sequentially performing the following steps (1) to (4):

(1) applying an aqueous colored coating composition (A) to a substrate to form an uncured colored coating film;

(2) applying an effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), to the uncured colored coating film formed in step (1), without preheating the uncured colored coating film, to form an uncured effect coating film having a film thickness of 7 to 13 µm when cured;

(3) applying a clear coating composition (C) to the uncured effect coating film formed in step (2) to form an uncured clear coating film; and (4) heating the uncured colored coating film, the uncured effect coating film, and the uncured clear coating film formed respectively in steps (1) to (3) to simultaneously cure these three coating films.

Item 2A. The method for forming a multilayer coating film according to Item 1A, wherein the effect pigment-containing aqueous coating composition (B) has a solids concentration of 18 to 35 mass %.

Item 3A. The method for forming a multilayer coating film according to Item 1A or 2A, wherein the aqueous colored coating composition (A) comprises a binder component (a1) and titanium dioxide and/or barium sulfate, and the total content of the titanium dioxide and barium sulfate is 50 to 150 parts by mass relative to 100 parts by mass of the solids content of the binder component (a1).

Item 4A. The method for forming a multilayer coating film according to any one of Items 1A to 3A, wherein the binder component (b1) comprises, as at least a part thereof, a hydroxy-containing polyester resin in which alicyclic polybasic acid content is 20 to 100 mol % relative to the total content of acid components in a starting material thereof.

Step (1)

In step (1) of the method for forming a multilayer coating film of the present invention, an aqueous colored coating composition (A) is applied to a substrate.

Substrate

The substrate to be coated is not particularly limited. Examples of substrates include exterior panel parts of automobile bodies such as passenger cars, trucks, motorcycles, and buses; automotive components; and exterior panel parts of household electric appliances such as cellular phones and audio equipment. Of these substrates, exterior panel parts of automobile bodies and automotive components are preferable.

The material for the substrate is not particularly limited. Examples of the material include iron, aluminum, brass, copper, stainless steel, tin, galvanized steel, steel plated with zinc alloys (Zn—Al, Zn—Ni, Zn—Fe, etc.) and like metal materials; polyethylene resins, polypropylene resins, acrylonitrile-butadiene-styrene (ABS) resins, polyamide resins, acrylic resins, vinylidene chloride resins, polycarbonate resins, polyurethane resins, epoxy resins and like resins, and various types of fiber-reinforced plastics (FRP) and like plastic materials; glass, cement, concrete and like inorganic materials; wood; and textile materials such as paper and cloth. Of these materials, metal materials and plastic materials are preferable.

The substrate may be a metal material as mentioned above, or a vehicle body, etc., formed from such metal material, whose metal surface has been subjected to a surface treatment such as phosphate treatment, chromate treatment, or composite oxide treatment. The substrate may also be such metal material, vehicle body, or the like as described above on which a coating film is formed.

Examples of the substrate on which a coating film is formed include a base material in which the surface is optionally treated, and an undercoating film is formed thereon; and a base material in which the surface is optionally treated, an undercoating film is formed thereon, and an intermediate coating film is further formed thereon. In particular, vehicle bodies having an undercoating film formed thereon using an electrodeposition coating composition are preferable, and those having an undercoating film formed thereon using a cationic electrodeposition coating composition are more preferable.

As the aqueous colored coating composition (A) that is applied to an aforementioned substrate, a coating composition containing, for example, a binder component (a1) and a pigment (a2); and further containing, if necessary, an additive for coating compositions, can be used.

Binder Component (a1)

A binder component (a1) itself has film-forming properties, and can either be non-crosslinkable or crosslinkable. As the binder component (a1), a known film-forming resin that has hitherto been used as a binder component for coating compositions can be used.

Examples of the film-forming resin include acrylic resins, polyester resins, alkyd resins, and polyurethane resins. It is preferable that the film-forming resin contains a crosslinkable functional group, such as hydroxy, carboxy, and epoxy.

When the film-forming resin contains a hydroxy group, it is preferable that the film-forming resin has a hydroxy value of about 1 to 200 mg KOH/g, more preferably about 2 to 180 mg KOH/g, and still more preferably about 5 to 170 mg KOH/g. When the film-forming resin contains an acid group such as carboxy, it is preferable that the film-forming resin has an acid value of about 5 to 150 mg KOH/g, more preferably about 10 to 100 mg KOH/g, and still more preferably about 15 to 80 mg KOH/g.

Crosslinking Agent

In addition to the film-forming resin, a crosslinking agent can also be used as the binder component (a1). When a crosslinking agent is used as a part of the binder component (a1), a resin (a base resin) that contains a crosslinkable functional group such as hydroxy, carboxy, or epoxy group, and that can form a crosslinked coating film by reaction with the crosslinking agent, is generally used as the aforementioned film-forming resin. From the viewpoint of the water resistance, chipping resistance, and the like of the resulting coating film, it is suitable to use a crosslinkable coating composition containing the above-described base resin and a crosslinking agent, as the aqueous colored coating composition (A).

Examples of the base resin include acrylic resins, polyester resins, alkyd resins, and polyurethane resins. In particular, the base resin is preferably a hydroxy-containing resin, and more preferably a hydroxy-containing acrylic resin (a1-1(a)) and/or a hydroxy-containing polyester resin (a1-2(a)). It is furthermore preferable that the hydroxy-containing acrylic resin (a1-1(a)) and the hydroxy-containing polyester resin (a1-2(a)) are used in combination to obtain a coating film with improved smoothness and distinctness of image. When used in combination, the proportion of the hydroxy-containing acrylic resin (a1-1(a)) is preferably about 10 to 90 mass %, more preferably about 20 to 80 mass %, and still more preferably about 30 to 70 mass %; and the proportion of the hydroxy-containing polyester resin (a1-2(a)) is preferably about 90 to 10 mass %, more preferably about 80 to 20 mass %, and still more preferably about 70 to 30 mass %, relative to the total amount of the hydroxy-containing acrylic resin (a1-1(a)) and the hydroxy-containing polyester resin (a1-2(a)).

Hydroxy-Containing Acrylic Resin (a1-1(a))

A hydroxy-containing acrylic resin (a1-1(a)) can be produced by copolymerizing, for example, a hydroxy-containing polymerizable unsaturated monomer, and one or more other polymerizable unsaturated monomers copolymerizable with the hydroxy-containing polymerizable unsaturated monomer, using a known method, such as an emulsion polymerization method in water.

The hydroxy-containing polymerizable unsaturated monomer is a compound having one or more hydroxy groups and one or more polymerizable unsaturated bonds per molecule. Examples thereof include monoesterified products of (meth)acrylic acid with a dihydric alcohol having 2 to 8 carbon atoms, such as 2-hydroxyethyl(meth)acrylate, 2-hydroxypropyl(meth)acrylate, 3-hydroxypropyl(meth)acrylate, and 4-hydroxybutyl(meth)acrylate; ε-caprolactone-modified products of the monoesterified products of (meth)acrylic acid with a dihydric alcohol having 2 to 8 carbon atoms; N-hydroxymethyl(meth)acrylamide; allyl alcohol; and (meth)acrylates having a hydroxy-terminated polyoxyethylene chain. These may be used singly, or in a combination of two or more.

As the aforementioned one or more other polymerizable unsaturated monomers copolymerizable with the hydroxy-containing polymerizable unsaturated monomer, the monomers listed in (i) to (xix) below can be used. These polymerizable unsaturated monomers may be used singly, or in a combination of two or more.

(i) Alkyl or cycloalkyl(meth)acrylates: for example, methyl(meth)acrylate, ethyl(meth)acrylate, n-propyl(meth)acrylate, isopropyl(meth)acrylate, n-butyl(meth)acrylate, isobutyl(meth)acrylate, tert-butyl(meth)acrylate, n-hexyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, isostearyl(meth)acrylate, cyclohexyl(meth)acrylate, methylcyclohexyl(meth)acrylate, tert-butylcyclohexyl(meth)acrylate, cyclododecyl(meth)acrylate, and tricyclodecanyl(meth)acrylate.

(ii) Polymerizable unsaturated monomers having an isobornyl group: for example, isobornyl(meth)acrylate.

(iii) Polymerizable unsaturated monomers having an adamantyl group: for example, adamantyl(meth)acrylate.

(iv) Polymerizable unsaturated monomer having a tricyclodecenyl group: for example, tricyclodecenyl(meth)acrylate.

(v) Aromatic ring-containing polymerizable unsaturated monomers: for example, benzyl(meth)acrylate, styrene, α-methyl styrene, and vinyltoluene.

(vi) Polymerizable unsaturated monomers having an alkoxysilyl group: for example, vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane.

(vii) Polymerizable unsaturated monomers having a fluorinated alkyl group: for example, perfluoroalkyl(meth)acrylates, such as perfluorobutylethyl(meth)acrylate and perfluorooctylethyl(meth)acrylate; and fluoroolefin.

(viii) Polymerizable unsaturated monomers having a photopolymerizable functional group, such as a maleimide group: those widely used in this technical field.

(ix) Vinyl compounds: for example, N-vinylpyrrolidone, ethylene, butadiene, chloroprene, vinyl propionate, and vinyl acetate.

(x) Carboxy-containing polymerizable unsaturated monomers: for example, (meth)acrylic acid, maleic acid, crotonic acid, and β-carboxyethyl acrylate.

(xi) Nitrogen-containing polymerizable unsaturated monomers: for example, (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide, methylene bis(meth)acrylamide, ethylene bis(meth)acrylamide, dimethylaminoethyl(meth)acrylate, and adducts of glycidyl(meth)acrylate with amines.

(xii) Polymerizable unsaturated monomers having two or more polymerizable unsaturated groups per molecule: for example, allyl(meth)acrylate, and 1,6-hexanediol di(meth)acrylate.

(xiii) Epoxy-containing polymerizable unsaturated monomers: for example, glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl(meth)acrylate, and allyl glycidyl ether.

(xiv) (Meth)acrylates having an alkoxy-terminated polyoxyethylene chain: those widely used in this technical field.

(xv) Sulfonic acid group-containing polymerizable unsaturated monomers: for example, 2-acrylamide-2-methylpropanesulfonic acid, 2-sulfoethyl(meth)acrylate, allylsulfonic acid, and 4-styrenesulfonic acid; and sodium salts and ammonium salts of such sulfonic acids.

(xvi) Phosphate group-containing polymerizable unsaturated monomers: for example, acid phosphoxyethyl(meth)acrylate, acid phosphoxypropyl(meth)acrylate, acid phosphoxypoly(oxyethylene)glycol(meth)acrylate, and acid phosphoxypoly(oxypropylene)glycol(meth)acrylate.

(xvii) Polymerizable unsaturated monomers having a UV-absorbing functional group: for example, 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole.

(xviii) UV-stable polymerizable unsaturated monomers: for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Carbonyl-containing polymerizable unsaturated monomers: for example, acrolein, diacetone acrylamide, diacetone methacrylamide, acetoacetoxyethyl methacrylate, formylstyrol, and vinyl alkyl ketones having 4 to 7 carbon atoms (e.g., vinyl methyl ketone, vinyl ethyl ketone, and vinyl butyl ketone).

As used herein, a polymerizable unsaturated group means an unsaturated group that can undergo radical polymerization. Examples of such polymerizable unsaturated groups include a vinyl group, and a (meth)acryloyl group.

The term "(meth)acrylate" used herein means "acrylate or methacrylate." The term "(meth)acrylic acid" means "acrylic acid or methacrylic acid." The term "(meth)acryloyl" means "acryloyl or methacryloyl." The term "(meth)acrylamide" means "acrylamide or methacrylamide."

The hydroxy-containing acrylic resin (a1-1(a)) preferably contains an amide group. The hydroxy-containing acrylic resin containing an amide group can be produced by using, for example, an amide-containing polymerizable unsaturated monomer, such as (meth)acrylamide, N,N-dimethylaminopropyl(meth)acrylamide, methylenebis(meth)acrylamide, and ethylenebis(meth)acrylamide, as one of the one or more other polymerizable unsaturated monomers polymerizable with the hydroxy-containing polymerizable unsaturated monomer.

The amount of the hydroxy-containing polymerizable unsaturated monomer used to produce the hydroxy-containing acrylic resin (a1-1(a)) is preferably about 1 to 50 mass %, more preferably about 2 to 40 mass %, still more preferably about 3 to 30 mass %, relative to the total amount of the monomer component.

In terms of properties such as the storage stability of the coating composition and the water resistance of the resulting coating film, the hydroxy-containing acrylic resin (a1-1(a)) has an acid value of preferably about 0.1 to 200 mg KOH/g, more preferably about 2 to 150 mg KOH/g, and further preferably about 5 to 100 mg KOH/g.

Further, in terms of properties such as water resistance of the resulting coating film, the hydroxy-containing acrylic resin (a1-1(a)) preferably has a hydroxy value of about 0.1 to 200 mg KOH/g, more preferably about 2 to 150 mg KOH/g, and still more preferably about 5 to 100 mg KOH/g.

When the aqueous colored coating composition (A) contains a hydroxy-containing acrylic resin (a1-1(a)), the content of the hydroxy-containing acrylic resin (a1-1(a)) is preferably about 2 to 70 mass %, more preferably about 10 to 65 mass %, and still more preferably about 20 to 60 mass %, relative to the solids content of the binder component (a1).

Hydroxy-Containing Polyester Resin (a1-2(a))

A hydroxy-containing polyester resin (a1-2(a)) can generally be produced by an esterification or transesterification reaction of an acid component with an alcohol component.

The acid component may be a compound that is generally used as an acid component for producing a polyester resin. Examples of such acid components include aliphatic polybasic acids, alicyclic polybasic acids, and aromatic polybasic acids.

Generally, aliphatic polybasic acids include aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; and esters of such aliphatic polycarboxylic acids with lower alkyls having about 1 to 4 carbon atoms. Such aliphatic polybasic acids can be used singly, or in a combination of two or more.

In terms of the smoothness of the resulting coating film, it is particularly preferable to use adipic acid and/or adipic anhydride as an aliphatic polybasic acid.

Generally, alicyclic polybasic acids include compounds having at least one alicyclic structure and at least two carboxy groups per molecule; acid anhydrides of such compounds; and esters of such compounds. The alicyclic structure is typically a 4-6 membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; and esters of such alicyclic polycarboxylic acids with lower alkyls having about 1 to 4 carbon atoms. Such alicyclic polybasic acids can be used singly, or in a combination of two or more.

In terms of the smoothness of the resulting coating film, preferable alicyclic polybasic acids include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, it is particularly preferable to use 1,2-cyclohexanedicarboxylic acid and/or 1,2-cyclohexanedicarboxylic anhydride.

Generally, aromatic polybasic acids include aromatic compounds having at least two carboxy groups per molecule; anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; and esters of such aromatic polycarboxylic acids with lower alkyls having about 1 to 4 carbon atoms. Such aromatic polybasic acids can be used singly, or in a combination of two or more.

Preferable aromatic polybasic acids include phthalic acid, phthalic anhydride, isophthalic acid, trimellitic acid, and trimellitic anhydride.

Acid components other than aliphatic polybasic acids, alicyclic polybasic acids, and aromatic polybasic acids can also be used. Such other acid components are not limited, and include, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linolic acid, linolenic acid, benzoic acid, p-tert-butyl benzoic acid, cyclohexanoic acid, 10-phenyloctadecanoic acid, and like monocarboxylic acids; and lactic acid, 3-hydroxybutanoic acid, 3-hydroxy-4-ethoxybenzoic acid, and like hydroxycarboxylic acids. Such acid components can be used singly, or in a combination of two or more.

Polyhydric alcohols having at least two hydroxy groups per molecule can be preferably used as the above-mentioned alcohol component. Examples of such polyhydric alcohols include ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and like dihydric alcohols; polylactone diols obtained by adding lactone compounds, such as ε-caprolactone, to such dihydric alcohols; bis(hydroxyethyl) terephthalate and like ester diol compounds; alkylene oxide adducts of bisphenol A, polyethylene glycols, polypropylene glycols, polybutylene glycols, and like polyether diol compounds; glycerol, trimethylolethane, trimethylolpropane, diglycerol, triglycerol, 1,2,6-hexanetriol, pentaerythritol, dipentaerythritol, tris(2-hydroxyethyl)isocyanuric acid, sorbitol, mannitol, and like trihydric or higher polyhydric alcohols; and polylactone polyol compounds obtained by adding lactone compounds, such as ε-caprolactone, to such trihydric or higher polyhydric alcohols.

Alcohol components other than polyhydric alcohols can also be used. Such other alcohol components are not limited, and include, for example, methanol, ethanol, propyl alcohol, butyl alcohol, stearyl alcohol, 2-phenoxyethanol, and like monohydric alcohols; and alcohol compounds obtained by reacting, with acids, propylene oxide, butylene oxide, "Cardura E10" (product name, produced by HEXION Specialty Chemicals; glycidyl ester of a synthetic highly branched saturated fatty acid), and like monoepoxy compounds.

The production method for the hydroxy-containing polyester resin (a1-2(a)) is not limited, and may be performed by any usual method. For example, the acid component and alcohol component are heated in a nitrogen stream at about 150 to 250° C. for about 5 to 10 hours to thereby carry out an esterification reaction or transesterification reaction of the acid component with the alcohol component. Thereby, the hydroxy-containing polyester resin can be produced.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy- and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, known catalysts are usable. Examples thereof include dibutyltin oxide, antimony trioxide, zinc acetate, manganese acetate, cobalt acetate, calcium acetate, lead acetate, tetrabutyl titanate, and tetraisopropyl titanate.

The hydroxy-containing polyester resin (a1-2(a)) can be modified with a fatty acid, monoepoxy compound, polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid. Preferable examples of the monoepoxy compound include "Cardura E10" (product name, produced by HEXION Specialty Chemicals; glycidyl ester of a synthetic highly branched saturated fatty acid).

Examples of the polyisocyanate compound include lysine diisocyanate, hexamethylene diisocyanate, trimethylhexane diisocyanate, and like aliphatic diisocyanate compounds; hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), 1,3-(isocyanatomethyl)cyclohexane, and like alicyclic diisocyanate compounds; tolylene diisocyanate, xylylene diisocyanate, diphenylmethane diisocyanate, and like aromatic diisocyanate compounds; organic polyisocyanates, such as lysine triisocyanate and like tri- or higher polyisocyanates; adducts of such organic polyisocyanates with polyhydric alcohols, low-molecular-weight polyester resins, water, and/or the like; and cyclopolymers (e.g., isocyanurate), biuret adducts, etc., of such organic polyisocyanates. Such polyisocyanate compounds can be used singly, or in a combination of two or more.

In the hydroxy-containing polyester resin (a1-2(a)), to obtain a coating film with excellent smoothness and excellent water resistance, the amount of alicyclic polybasic acid in the acid components used as starting materials is preferably about 20 to 100 mol %, more preferably about 25 to 95 mol %, and even more preferably about 30 to 90 mol %, relative to the total amount of the acid components. In particular, it is preferable to use, as an alicyclic polybasic acid, 1,2-cyclohexanedicarboxylic acid and/or 1,2-cyclohexanedicarboxylic anhydride, in terms of providing a coating film with excellent smoothness.

The hydroxy-containing polyester resin (a1-2(a)) preferably has a hydroxy value of about 1 to 200 mg KOH/g, more preferably about 2 to 180 mg KOH/g, and even more preferably about 5 to 170 mg KOH/g. When the hydroxy-containing polyester resin (a1-2(a)) also has a carboxy group, the acid value of the resin is preferably about 5 to 150 mg KOH/g, more preferably about 10 to 100 mg KOH/g, and even more preferably about 15 to 80 mg KOH/g. The hydroxy-containing polyester resin (a1-2(a)) preferably has a number average molecular weight of about 500 to 50,000, more preferably about 1,000 to 30,000, and even more preferably about 1,200 to 10,000.

When the aqueous colored coating composition (A) contains the hydroxy-containing polyester resin (a1-2(a)), the content of the hydroxy-containing polyester resin (a1-2(a)) is preferably about 2 to 70 mass %, more preferably about 10 to 55 mass %, still more preferably about 15 to 45 mass %, relative to the solids content of the binder component (a1).

The crosslinking agent is a compound that can react with crosslinkable functional groups, such as hydroxy, carboxy epoxy, etc., in the base resin, to thereby cure the aqueous colored coating composition (A). Examples of the crosslinking agents include amino resins, polyisocyanate compounds, blocked polyisocyanate compounds, epoxy-containing compounds, carboxy-containing compounds, carbodiimide-containing compounds, hydrazide-containing compounds, and semicarbazide-containing compounds. Among these, amino resins, polyisocyanate compounds, and blocked polyisocyanate compounds, which react with hydroxy groups, and carbodiimide-containing compounds, which react with carboxy groups, are preferable. Amino resins are particularly preferable. Such crosslinking agents may be used singly, or in a combination of two or more.

Usable amino resins include partially or fully methylolated amino resins obtained by the reactions of amino components with aldehyde components. Examples of the amino components include melamine, urea, benzoguanamine, acetoguanamine, steroguanamine, spiroguanamine, and dicyandiamide. Examples of the aldehyde components include formaldehyde, paraformaldehyde, acetaldehyde, and benzaldehyde.

The methylolated amino resins in which some or all of the methylol groups have been etherified with suitable alcohols are also usable. Examples of alcohols that can be used for the etherification include methyl alcohol, ethyl alcohol, n-propyl alcohol, isopropyl alcohol, n-butyl alcohol, isobutyl alcohol, 2-ethylbutanol, and 2-ethylhexanol.

A melamine resin is preferably used as the amino resin. In particular, a methyl-etherified melamine resins obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl-etherified melamine resin obtained by etherifying some or all of the methylol groups of a partially or fully methylolated melamine resin with methyl alcohol and butyl alcohol are preferable.

In terms of the water resistance of the resulting coating film, the melamine resin preferably has a weight average molecular weight of 400 to 6,000, more preferably 500 to 4,000, and still more preferably 600 to 3,000.

A commercially available melamine resin can be used as the melamine resin. Examples of commercially available products include Cymel 202, Cymel 203, Cymel 238, Cymel 251, Cymel 303, Cymel 323, Cymel 324, Cymel 325, Cymel 327, Cymel 350, Cymel 385, Cymel 1156, Cymel 1158, Cymel 1116, and Cymel 1130 (produced by Nihon Cytec Industries Inc.), U-VAN 120, U-VAN 20HS, U-VAN 20SE60, U-VAN 2021, U-VAN 2028, and U-VAN 28-60 (produced by Mitsui Chemicals, Inc.).

When a melamine resin is used as a crosslinking agent, paratoluene sulfonic acid, dodecylbenzenesulfonic acid, dinonylnaphthalene sulfonic acid, and like sulfonic acids; monobutyl phosphate, dibutyl phosphate, mono-2-ethylhexyl phosphate, di-2-ethylhexyl phosphate, and like alkyl phosphoric esters; and salts of these acids with an amine compound may be used as a catalyst.

The polyisocyanate compound has at least two isocyanate groups per molecule. Examples thereof include hexamethylene diisocyanate, trimethylhexamethylene diisocyanate, dimer acid diisocyanate, lysine diisocyanate, and like aliphatic diisocyanate compounds; hydrogenated xylylene diisocyanate, cyclohexylene diisocyanate, isophorone diisocyanate, and like alicyclic diisocyanate compounds; tolylene diisocyanate, phenylene diisocyanate, 4,4'-diphenylmethane diisocyanate, xylylene diisocyanate, tetramethylxylylene diisocyanate, naphthalene diisocyanate, and like aromatic diisocyanate compounds; trivalent or higher organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly referred to as triamino-nonane triisocyanate); dimers and trimers of such polyisocyanate compounds; and prepolymers obtained by urethanization reactions of such polyisocyanate compounds with polyhydric alcohols, low-molecular-weight polyester resins, or water, under conditions such that isocyanate groups are present in excess.

The blocked polyisocyanate compounds can be obtained by blocking isocyanate groups of a polyisocyanate compound with a blocking agent. Examples of blocking agents include phenols, lactams, alcohols, ethers, glycolic acid esters, lactates, oximes, active methylenes, mercaptans, acid amides, imides, amines, imidazoles, ureas, carbamates, and imines.

When the polyisocyanate compound or the blocked polyisocyanate compound is used as a crosslinking agent, tin octylate, dibutyltin diacetate, dibutyltin di(2-ethylhexanoate), dibutyltin dilaurate, dioctyltin diacetate, dioctyltin di(2-ethylhexanoate), dibutyltin oxide, dioctyltin oxide, dibutyltin fatty acid salts, lead 2-ethylhexanoate, zinc octylate, zinc naphthenate, zinc fatty acid compounds, cobalt naphthenate, calcium octylate, copper naphthenate, tetra(2-ethylhexyl)titanate, and like organometallic compounds; tertiary amines; phosphoric acid compounds; etc., can be used as a catalyst.

The carbodiimide-containing compounds usable herein are, for example, those obtained by subjecting isocyanate groups in polyisocyanate compound to a carbon dioxide removal reaction. Commercial products are available as such carbodiimide-containing compounds. Examples of trade names of such commercial products include Carbodilite SV-02, Carbodilite V-02, Carbodilite V-02-L2, Carbodilite V-04, Carbodilite E-01, and Carbodilite E-02 (produced by Nisshinbo Industries, Inc.).

When the aqueous colored coating composition (A) contains the crosslinking agent, from the viewpoint of improvement in the smoothness and water resistance of the resulting multilayer coating film, the content of the base resin is about 30 to 95 mass %, preferably about 50 to 90 mass %, more preferably about 60 to 80 mass %; and the content of the crosslinking agent is about 5 to 70 mass %, preferably about 10 to 50 mass %, and more preferably about 20 to 40 mass %, relative to the total mass of the base resin and the crosslinking agent.

As the aqueous colored coating composition (A), a thermosetting aqueous coating composition containing a hydroxy-containing resin as the base resin and a melamine resin as the crosslinking agent can be advantageously used, in view of the smoothness, distinctness of image, and water resistance of the resulting multilayer coating film.

Pigment (a2)

A pigment (a2) may be a color pigment, an extender pigment, an effect pigment, etc.

Examples of color pigments include titanium dioxide, zinc flower, carbon black, molybdenum red, Prussian blue, cobalt blue, azo pigments, phthalocyanine pigments, quinacridone pigments, isoindoline pigments, threne (anthraquinone) pigments, perylene pigments, dioxazine pigments, and diketopyrrolopyrrole pigments. These may be used singly, or in a combination of two or more. Of these, titanium dioxide is preferably used as at least one of the color pigments.

When the aqueous colored coating composition (A) contains the color pigment, it is preferable that the content of the color pigment be typically 1 to 150 parts by mass, preferably 3 to 130 parts by mass, and more preferably 5 to 110 parts by mass, relative to 100 parts by mass of the solids content of the binder component in the aqueous colored coating composition (A).

Examples of extender pigments include clay, kaolin, barium sulfate, barium carbonate, calcium carbonate, talc, silica, and alumina white. These may be used singly, or in a combination of two or more. Of these, barium sulfate and/or talc is preferably used, and barium sulfate is more preferably used as at least one of the extender pigments.

When the aqueous colored coating composition (A) contains the extender pigment, the content of the extender pigment is typically 1 to 150 parts by mass, preferably 3 to 130 parts by mass, and more preferably 5 to 110 parts by mass, relative to 100 parts by mass of the solids content of the binder component in the aqueous colored coating composition (A).

Examples of effect pigments (luster pigments) include aluminium (such as vapor-deposited aluminum), copper, zinc, brass, nickel, aluminium oxide, mica, titanium oxide- or iron oxide-coated aluminium oxide, titanium oxide- or iron oxide-coated mica, glass flakes, and holographic pigments. These may be used singly, or in a combination of two or more. Of these, at least one effect pigment selected from the group consisting of aluminium, aluminium oxide, mica, titanium oxide- or iron oxide-coated aluminium oxide, and titanium oxide- or iron oxide-coated mica is preferably used as the effect pigment.

The effect pigment is preferably in the form of scales. As the effect pigment, pigments having a longitudinal dimension of 1 to 100 µm, particularly 5 to 40 µm, and a thickness of 0.001 to 5 µm, particularly 0.01 to 2 µm, are suitable.

When the aqueous colored coating composition (A) contains the effect pigment, the content of the effect pigment is typically 1 to 50 parts by mass, preferably 2 to 30 parts by mass, and more preferably 3 to 20 parts by mass, relative to 100 parts by mass of the solids content of the binder component in the aqueous colored coating composition (A).

In view of the smoothness, distinctness of image, and water resistance of the resulting multilayer coating film, it is preferable that the aqueous colored coating composition (A) contains titanium dioxide and/or barium sulfate in a total amount of 50 to 150 parts by mass, preferably 55 to 130 parts by mass, and more preferably 60 to 120 parts by mass, relative to 100 parts by mass of the solids content of the binder component (a1). In particular, the content of the titanium dioxide is preferably 50 to 150 parts by mass, more preferably 55 to 130 parts by mass, and even more preferably 60 to 120 parts by mass, relative to 100 parts by mass of the solids content of the binder component (a1).

The aqueous colored coating composition (A) may further contain, if necessary, an additive for coating compositions, such as thickeners, curing catalysts, UV absorbers, light stabilizers, antifoaming agents, plasticizers, surface control agents, and antisettling agents.

Examples of thickeners include inorganic thickeners such as silicate, metal silicate, montmorillonite, and colloidal alumina; polyacrylic acid thickeners such as copolymers of (meth)acrylic acid and (meth)acrylic ester, and sodium polyacrylate; associative thickeners having a hydrophilic moiety and a hydrophobic moiety per molecule, and effectively enhancing the viscosity in an aqueous medium by adsorption of the hydrophobic moiety on the surface of a pigment or emulsion particles in a coating composition, or by association between hydrophobic moieties; cellulose-derived thickeners, such as carboxymethylcellulose, methylcellulose, and hydroxyethylcellulose; protein thickeners such as casein, sodium caseinate, and ammonium caseinate; alginate thickeners such as sodium alginate; polyvinyl thickeners such as polyvinyl alcohol, polyvinylpyrrolidone, and polyvinyl benzyl ether copolymers; polyether thickeners such as polyether dialkyl ester, polyether dialkyl ether, and polyether epoxy-modified products; maleic anhydride copolymer thickeners such as partial esters of vinyl methyl ether-maleic anhydride copolymers; and polyamide thickeners such as polyamide amine. These thickeners may be used singly, or in a combination of two or more. Of these, polyacrylic acid thickeners and/or associative thickeners are preferably used.

Examples of polyacrylic acid thickeners include commercial products that are available under the trade names, for example, ACRYSOL ASE-60, ACRYSOL TT-615, and ACRYSOL RM-5 (produced by Rohm & Haas Co., Ltd.); and SN thickener 613, SN thickener 618, SN thickener 630, SN thickener 634, and SN thickener 636 (produced by San Nopco Ltd.).

Examples of usable associative thickeners include commercially available products, which are available, for example, under the trade names UH-420, UH-450, UH-462, UH-472, UH-540, UH-752, UH-756VF, and UH-814N (produced by ADEKA Co. Ltd.); ACRYSOL RM-8W, Primal RM-12W, ACRYSOL RM-825, and ACRYSOL SCT-275 (produced by Rohm & Haas Co., Ltd.); and SN thickener 612, SN thickener 621N, SN thickener 625N, SN thickener 627N, and SN thickener 660T (produced by San Nopco Ltd.).

When the aqueous colored coating composition (A) contains the thickener, the content of the thickener is typically 0.01 to 10 parts by mass, preferably 0.05 to 3 parts by mass, and more preferably 0.1 to 2 parts by mass, relative to 100 parts by mass of the solids content of the binder component in the aqueous colored coating composition (A).

The aqueous colored coating composition (A) can be prepared by mixing and dispersing, in an aqueous medium, the binder component (a1), pigment (a2), together with, if necessary, a thickener, a curing catalyst, a UV absorber, a light stabilizer, an antifoaming agent, a plasticizer, a surface control agent, an antisettling agent, and other additives for coating compositions, by using a known method. Examples of the aqueous medium include deionized water, and a mixture of deionized water and a hydrophilic organic solvent. Examples of the hydrophilic organic solvent include propylene glycol monomethyl ether. It is preferable that the aqueous colored coating composition (A) contains water in an amount of 10 to 95 mass %, more preferably 20 to 80 mass %, and still more preferably 30 to 70 mass %.

It is preferable that the aqueous colored coating composition (A) generally has a solids concentration of 30 to 80 mass %, more preferably 40 to 70 mass %, and still more preferably 45 to 60 mass %.

The aqueous colored coating composition (A) can be coated on a cured electrodeposition coating film by a known method such as air spray coating, airless spray coating, rotary atomization coating, or curtain coating. An electrostatic charge may be applied during the coating. Among these, air spray coating, rotary atomization coating, etc., are preferable.

From the viewpoint of the smoothness of the resulting multilayer coating film, the aqueous colored coating composition (A) is preferably applied to obtain a film thickness of 5 to 40 μm, more preferably 10 to 30 μm, and still more preferably 15 to 25 μm when cured.

Step (2)

An effect pigment-containing aqueous coating composition (B) that contains a binder component (b1), an effect pigment (b2), and a hydrophobic solvent (b3) in proportions relative to 100 parts by mass of the solids content of the binder component (b1), of 15 to 30 parts by mass of effect pigment (b2), 25 to 60 parts by mass of hydrophobic solvent (b3), is applied to the coating film formed of the aqueous colored coating composition (A) (hereinafter, sometimes referred to as a "colored coating film") formed in step (1) above without preheating. Thereby, an uncured effect coating film having a film thickness of 7 to 13 μm when cured is formed.

Binder Component (b1)

A binder component (b1) itself has film-forming properties, and can either be non-crosslinkable or crosslinkable. As the binder component (b1), a known film-forming resin that has hitherto been used as a binder component for coating compositions can be used.

Examples of the film-forming resin include acrylic resins, polyester resins, alkyd resins, and polyurethane resins. It is preferable that the film-forming resin contains a crosslinkable functional group, such as hydroxy, carboxy, and epoxy.

In the binder component (b1), when the film-forming resin contains a hydroxy group, it is preferable that the film-forming resin has a hydroxy value of about 1 to 200 mg KOH/g, more preferably about 2 to 180 mg KOH/g, and still more preferably about 5 to 170 mg KOH/g. When the film-forming resin contains an acid group such as carboxy, it is preferable that the film-forming resin has an acid value of about 5 to 150 mg KOH/g, more preferably about 10 to 100 mg KOH/g, and still more preferably about 15 to 80 mg KOH/g.

In addition to the film-forming resin, a crosslinking agent can also be used as the binder component (b1). When a crosslinking agent is used as a part of the binder component (b1), a resin (a base resin) that contains a crosslinkable functional group such as hydroxy, carboxy, or epoxy group, and that can form a crosslinked coating film by reaction with the crosslinking agent is generally used as the aforementioned film-forming resin. From the viewpoint of the water resistance, chipping resistance, and the like of the resulting coating film, it is suitable to use a crosslinkable coating composition containing the above-described base resin and a crosslinking agent, as the effect pigment-containing aqueous coating composition (B).

Examples of the base resin include acrylic resins, polyester resins, alkyd resins, and polyurethane resins. In particular, the base resin is preferably a hydroxy-containing resin, and more preferably a hydroxy-containing acrylic resin (b1-1) and/or a hydroxy-containing polyester resin (b1-2). It is furthermore preferable that the hydroxy-containing acrylic resin (b1-1) and the hydroxy-containing polyester resin (b1-2) are used in combination to obtain a coating film with improved smoothness and distinctness of image. When used in combination, the proportion of the hydroxy-containing acrylic resin (b1-1) is preferably about 10 to 90 mass %, and more preferably about 20 to 80 mass %, and the proportion of the hydroxy-containing polyester resin (b1-2) is preferably about 90 to 10 mass %, and more preferably about 80 to 20 mass %, relative to the total amount of the hydroxy-containing acrylic resin (b1-1) and the hydroxy-containing polyester resin (b1-2).

Hydroxy-Containing Acrylic Resin (b1-1)

A hydroxy-containing acrylic resin (b1-1) can be produced by copolymerizing, for example, a hydroxy-containing polymerizable unsaturated monomer, and one or more other polymerizable unsaturated monomers copolymerizable with the hydroxy-containing polymerizable unsaturated monomer, using a known method, such as an emulsion polymerization method in water.

The hydroxy-containing polymerizable unsaturated monomers mentioned in the explanation of the hydroxy-containing acrylic resin (a1-1(a)) may be used as the hydroxy-containing polymerizable unsaturated monomer, or as the one or more other polymerizable unsaturated monomers copolymerizable with the hydroxy-containing polymerizable unsaturated monomer.

The amount of the hydroxy-containing polymerizable unsaturated monomer used to produce the hydroxy-containing acrylic resin (b1-1) is preferably about 1 to 50 mass %, more preferably about 2 to 40 mass %, still more preferably about 3 to 30 mass %, relative to the total amount of the monomer component.

In terms of properties such as the storage stability of the coating composition and the water resistance of the resulting coating film, the hydroxy-containing acrylic resin (b1-1) preferably has an acid value of about 0.1 to 200 mg KOH/g, more preferably about 2 to 150 mg KOH/g, and further preferably about 5 to 100 mg KOH/g.

Further, in terms of properties such as water resistance of the resulting coating film, the hydroxy-containing acrylic resin (b1-1) preferably has a hydroxy value of about 0.1 to 200 mg KOH/g, more preferably about 2 to 150 mg KOH/g, and further preferably about 5 to 100 mg KOH/g.

When the effect pigment-containing aqueous coating composition (B) contains a hydroxy-containing acrylic resin (b1-1), the content of the hydroxy-containing acrylic resin (b1-1) is preferably about 2 to 70 mass %, more preferably about 10 to 65 mass %, and still more preferably about 20 to 60 mass %, relative to the solids content of the binder component (b1).

Hydroxy-Containing Polyester Resin (b1-2)

A hydroxy-containing polyester resin (b1-2) can generally be produced by an esterification or transesterification reaction of an acid component with an alcohol component.

The compounds mentioned in the explanation of the hydroxy-containing polyester resin (a1-2(a)) may be used as the acid component or alcohol component.

The production method for the hydroxy-containing polyester resin (b1-2) is not limited, and may be performed by any usual method. For example, the acid component and alcohol component are heated in a nitrogen stream at about 150 to 250° C. for about 5 to 10 hours to thereby carry out an esterification reaction or transesterification reaction of the acid component with the alcohol component. Thereby, the hydroxy-containing polyester resin can be produced.

For the esterification reaction or transesterification reaction, the acid component and alcohol component may be added to a reaction vessel at one time, or one or both of the components may be added in several portions. Alternatively, a hydroxy-containing polyester resin may be first synthesized and then reacted with an acid anhydride for half-esterification to thereby obtain a carboxy- and hydroxy-containing polyester resin. Further alternatively, a carboxy-containing polyester resin may be first synthesized, and the above-mentioned alcohol component may be added to obtain a hydroxy-containing polyester resin.

For promoting the esterification or transesterification reaction, known catalysts are usable. Examples thereof include dibutyltin oxide, antimony trioxide, zinc acetate, manganese acetate, cobalt acetate, calcium acetate, lead acetate, tetrabutyl titanate, and tetraisopropyl titanate.

The hydroxy-containing polyester resin (b1-2) can be modified with a fatty acid, monoepoxy compound, polyisocyanate compound, or the like, during or after the preparation of the resin.

The compounds mentioned in the explanation of the hydroxy-containing polyester resin (a1-2(a)) can be used as the fatty acid, monoepoxy compound, or polyisocyanate compound.

In order to obtain a multilayer coating film with excellent smoothness, distinctness of image, and water resistance, in the hydroxy-containing polyester resin (b1-2), at least as a part thereof, the amount of alicyclic polybasic acid in the acid components used as starting materials is preferably about 20 to 100 mol %, more preferably about 25 to 80 mol %, and even more preferably about 30 to 60 mol %, relative to the total amount of the acid components. In particular, it is preferable to use, as an alicyclic polybasic acid, 1,2-cyclohexanedicarboxylic acid and/or 1,2-cyclohexanedicarboxylic anhydride, in terms of providing a coating film with excellent smoothness.

The hydroxy-containing polyester resin (b1-2) preferably has a hydroxy value of about 1 to 200 mg KOH/g, more preferably about 2 to 180 mg KOH/g, and even more preferably about 5 to 170 mg KOH/g. When the hydroxy-containing polyester resin (b1-2) also has a carboxy group, the acid value of the resin is preferably about 5 to 150 mg KOH/g, more preferably about 10 to 100 mg KOH/g, and even more preferably about 15 to 80 mg KOH/g. The hydroxy-containing polyester resin (b1-2) preferably has a number average molecular weight of about 500 to 50,000, more preferably about 1,000 to 30,000, and even more preferably about 1,200 to 10,000.

When the effect pigment-containing aqueous coating composition (B) contains the hydroxy-containing polyester resin (b1-2), the content of the hydroxy-containing polyester resin (b1-2) is preferably about 2 to 70 mass %, more preferably about 10 to 55 mass %, still more preferably about 15 to 45 mass %, relative to the solids content of the binder component (b1).

The crosslinking agent usable in the effect pigment-containing aqueous coating composition (B) is a compound that can react with crosslinkable functional groups, such as hydroxy, carboxy, epoxy, etc., in the base resin, to thereby cure the effect pigment-containing aqueous coating composition (B). Examples of the crosslinking agents include amino resins, polyisocyanate compounds, blocked polyisocyanate compounds, epoxy-containing compounds, carboxy-containing compounds, carbodiimide-containing compounds, hydrazide-containing compounds, and semicarbazide-containing compounds. As the crosslinking agent, those mentioned in the explanation of the aqueous colored coating composition (A) can be used. Among these, amino resins, polyisocyanate compounds, and blocked polyisocyanate compounds, which react with hydroxy groups, and carbodiimide-containing compounds, which react with carboxy groups, are preferable. Amino resins are particularly preferable. Such crosslinking agents may be used singly, or in a combination of two or more.

When the effect pigment-containing aqueous coating composition (B) contains the crosslinking agent, from the viewpoint of improvement in the smoothness and water resistance of the resulting multilayer coating film, the content of the base resin is about 30 to 95 mass %, preferably about 50 to 90 mass %, more preferably about 60 to 80 mass %; and the content of the crosslinking agent is about 5 to 70 mass %, preferably about 10 to 50 mass %, and more preferably about 20 to 40 mass %, relative to the total mass of the base resin and the crosslinking agent.

As the effect pigment-containing aqueous coating composition (B), a thermosetting aqueous coating composition containing a hydroxy-containing resin as the base resin and a melamine resin as the crosslinking agent can be advantageously used, in view of the smoothness, distinctness of image, and water resistance of the resulting multilayer coating film.

Effect Pigment (b2)

Examples of an effect pigment (b2) include aluminium (such as vapor-deposited aluminum), copper, zinc, brass, nickel, aluminium oxide, mica, titanium oxide- or iron oxide-coated aluminium oxide, titanium oxide- or iron oxide-coated mica, glass flakes, and holographic pigments. These may be used singly, or in a combination of two or more. Of these, at least one effect pigment selected from the group consisting of aluminium, aluminium oxide, mica, titanium oxide- or iron oxide-coated aluminium oxide, and titanium oxide- or iron oxide-coated mica is preferably used as the effect pigment, and aluminium is particularly preferably used.

The effect pigment (b2) is preferably in the form of scales. As the effect pigment (b2), pigments having a longitudinal dimension of 1 to 100 μm, particularly 5 to 40 μm, and a thickness of 0.001 to 5 μm, particularly 0.01 to 2 μm, are suitable.

Hydrophobic Solvent (b3)

A hydrophobic solvent (b3) is desirably an organic solvent in which the mass of the organic solvent that is dissolved in 100 g of water at 20° C. is 10 g or less, preferably 5 g or less, more preferably 1 g or less. Examples of such organic solvents include hydrocarbon solvents such as rubber solvents, mineral spirits, toluene, xylene, and solvent naphtha; alcoholic solvents such as 1-hexanol, 1-octanol, 2-octanol, 2-ethyl-1-hexanol, 1-decanol, benzyl alcohol, ethylene glycol mono-2-ethylhexylether, propylene glycol mono-n-butyl ether, dipropylene glycol mono-n-butyl ether, tripropylene glycol mono-n-butyl ether, propylene glycol mono-2-ethylhexyl ether, and propylene glycol monophenyl ether; ester solvents such as n-butyl acetate, isobutyl acetate, isoamyl acetate, methylamyl acetate, and ethylene glycol monobutyl ether acetate; and ketone solvents such as methyl isobutyl ketone, cyclohexanone, ethyl n-amyl ketone, and diisobutyl ketone. Such solvents can be used singly, or in a combination of two or more.

In order to obtain a multilayer coating film with improved smoothness and distinctness of image, the hydrophobic solvent (b3) is preferably an alcohol hydrophobic organic solvent, and more preferably a $C_7$-$C_{14}$ alcohol hydrophobic solvent. In particular, at least one alcohol hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether, is preferable.

Preparation of Effect Pigment-Containing Aqueous Coating Composition (B)

An effect pigment-containing aqueous coating composition (B) contains the binder component (b1) and effect pigment (b2), and hydrophobic solvent (b3) in proportions relative to 100 parts by mass of the solids content of the binder component (b1), of 15 to 30 parts by mass, preferably 16 to 25 parts by mass, still more preferably 18 to 23 parts by mass of the effect pigment (b2), and 25 to 60 parts by mass, preferably 30 to 50 parts by mass, still more preferably 35 to 45 parts by mass of the hydrophobic solvent (b3).

The effect pigment-containing aqueous coating composition (B) may contain one or more pigments other than the effect pigment (b2), if necessary. Examples of such pigments include color pigments, and extender pigments.

Examples of color pigments include titanium dioxide, zinc flower, carbon black, molybdenum red, Prussian blue, cobalt blue, azo pigments, phthalocyanine pigments, quinacridone pigments, isoindoline pigments, threne (anthraquinone) pigments, perylene pigments, dioxazine pigments, and diketopyrrolopyrrole pigments. These may be used singly, or in a combination of two or more.

When the effect pigment-containing aqueous coating composition (B) contains the color pigment, it is preferable that the content of the color pigment be typically 1 to 100 parts by mass, preferably 2 to 50 parts by mass, and more preferably 3 to 30 parts by mass, relative to 100 parts by mass of the solids content of the binder component (b1) in the effect pigment-containing aqueous coating composition (B).

Examples of extender pigments include clay, kaolin, barium sulfate, barium carbonate, calcium carbonate, talc, silica, and alumina white. These may be used singly, or in a combination of two or more.

When the effect pigment-containing aqueous coating composition (B) contains the extender pigment, the content of the extender pigment is typically 1 to 100 parts by mass, preferably 2 to 50 parts by mass, and more preferably 3 to 30 parts by mass, relative to 100 parts by mass of the solids content of the binder component (b1) in the effect pigment-containing aqueous coating composition (B).

The effect pigment-containing aqueous coating composition (B) may further contain, if necessary, an additive generally used for coating compositions, such as curing catalysts, thickeners, UV absorbers, light stabilizers, antifoaming agents, plasticizers, organic solvents, surface control agents, and antisettling agents. These additives for coating compositions may be used singly, or in a combination of two or more. As the additives for coating compositions, those mentioned in the explanation of the aqueous colored coating composition (A) can be used.

In the method for forming a multilayer coating film of the present invention, the effect pigment-containing aqueous coating composition (B) preferably has a solids concentration of 18 to 35 mass %. In particular, the solids concentration of the effect pigment-containing aqueous coating composition (B) is preferably 20 to 30 mass %, and more preferably 23 to 27 mass %, in view of the smoothness and distinctness of image of the resulting multilayer coating film.

The effect pigment-containing aqueous coating composition (B) can be coated by a known method such as air spray, airless spray, or rotary atomization coating. An electrostatic charge may be applied during the coating.

In the method for forming a multilayer coating film of the present invention, the effect coating film formed by application of the effect pigment-containing aqueous coating composition (B) has a film thickness within a range of 7 to 13 μm when cured. In particular, in view of the smoothness and distinctness of image of the resulting multilayer coating film, the effect coating film preferably has a film thickness of, when cured, 7 μm or more, more preferably 8 μm or more, and still more preferably 9 μm or more. Moreover, the effect coating film preferably has a film thickness of, when cured, 13 μm or less, more preferably 12 μm or less, and still more preferably 10 μm or less. For example, the effect coating film preferably has a film thickness of, when cured, 8 to 12 μm, and more preferably 9 to 11 μm.

Step (3)

In the method for forming a multilayer coating film of the present invention, a clear coating composition (C) is applied to the coating film formed of the effect pigment-containing aqueous coating composition (B) (hereinafter, sometimes referred to as a "effect coating film") formed in step (2) above.

Before application of the clear coating composition (C), the effect coating film is preferably subjected to preheating, air blowing, or the like, under conditions in which the coating film is not substantially cured. The preheating temperature is preferably 40 to 100° C., more preferably 50 to 90° C., and still more preferably 60 to 80° C. The preheating time is preferably 30 seconds to 15 minutes, more preferably 1 to 10 minutes, and still more preferably 2 to 5 minutes. Air blowing can be typically performed by blowing either ordinary temperature air, or air heated to 25 to 80° C., over the coated surface of the substrate for 30 seconds to 15 minutes.

It is preferable to adjust the solids concentration of the effect coating film to generally 70 to 100 mass %, preferably 80 to 100 mass %, and more preferably 90 to 100 mass %, by subjecting, if necessary, the effect coating film to preheating, air blowing, or the like before application of the clear coating composition (C).

As the clear coating composition (C), any known thermosetting clear coating composition for coating automobile bodies, etc., can be used. Examples of such thermosetting clear coating compositions include organic solvent-type thermosetting coating compositions, aqueous thermosetting coating compositions, and powder thermosetting coating compositions, all of which contain a crosslinking agent and a base resin having a crosslinkable functional group.

Examples of the crosslinkable functional group contained in the base resin include carboxy, hydroxy, epoxy, and silanol. Examples of the base resin include acrylic resins, polyester resins, alkyd resins, urethane resins, epoxy resins, and fluororesins. Examples of the crosslinking agent include polyisocyanate compounds, blocked polyisocyanate compounds, melamine resins, urea resins, carboxy-containing compounds, carboxy-containing resins, epoxy-containing resins, and epoxy-containing compounds.

Examples of preferable combinations of base resin/crosslinking agent for the clear coating composition (C) are carboxy-containing resin/epoxy-containing resin, hydroxy-containing resin/polyisocyanate compound, hydroxy-containing resin/blocked polyisocyanate compound, and hydroxy-containing resin/melamine resin.

The clear coating composition (C) may be a single-liquid type coating composition, or a multi-liquid type coating composition such as a two-liquid type urethane resin coating composition.

The clear coating composition (C) may contain, if necessary, color pigments, effect pigments, dyes, etc., in such amounts that the transparency of the clear coating composition is not impaired; and may further appropriately contain extender pigments, UV absorbers, light stabilizers, antifoaming agents, thickeners, anticorrosives, surface control agents, etc.

The clear coating composition (C) can be applied to the surface of a coating film formed of the effect pigment-containing aqueous coating composition (B), by a known method, such as airless spray coating, air spray coating, or rotary atomization coating. An electrostatic charge may be applied during the coating.

The clear coating composition (C) can typically be applied to obtain a film thickness of 10 to 80 μm, preferably 15 to 60 μm, and more preferably 20 to 50 μm when cured.

After the application of the clear coating composition (C), it is possible, if necessary to have an interval of about 1 to 60 minutes at room temperature, or to perform preheating at about 40 to 80° C. for about 1 to 60 minutes.

Step (4)

In the method for forming a multilayer coating film of the present invention, the uncured colored coating film, uncured effect coating film, and uncured clear coating film formed in steps (1) to (3) above are simultaneously cured by heating.

The colored coating film, effect coating film, and clear coating film are cured by a usual method for baking coating films, such as hot air blowing, infrared heating, or high frequency heating.

The heating temperature is preferably 80 to 180° C., more preferably 100 to 170° C., and still more preferably 120 to 160° C.

The heating time is preferably 10 to 60 minutes, and more preferably 15 to 40 minutes. This heating allows three layers of a multilayer coating film, i.e., the colored coating film, effect coating film, and clear coating film, to be simultaneously cured.

In the method for forming a multilayer coating film of the present invention, the formation of a mixed layer from the aqueous colored coating composition (A) and the effect pigment-containing aqueous coating composition (B) rarely occurs; accordingly, a multilayer coating film having excellent smoothness and distinctness of image can be formed even without preheating. Therefore, the method for forming a multilayer coating film of the present invention is preferably employed in a 3-coat-1-bake process in which an aqueous colored coating composition (A) is applied in an intermediate coating booth, an effect pigment-containing aqueous coating composition (B) is applied in a base coating booth without preheating, and a clear coating composition is applied in a clear coating booth. In this case, the method for forming a multilayer coating film may be performed, for example, by Method I described below.

Method I

A method for forming a multilayer coating film by sequentially performing the following steps (1) to (5):

(1) applying an electrodeposition coating material to the surface of a steel plate, followed by heat-curing, to form a cured electrodeposition coating film;

(2) applying an aqueous colored coating composition (A) to the cured electrodeposition coating film obtained in step (1) in an intermediate coating booth to form an uncured intermediate coating film;

(3) applying an effect pigment-containing aqueous coating composition (B) to the uncured intermediate coating film obtained in step (2) in a base coating booth without preheating the uncured intermediate coating film, to form an uncured base coating film having a film thickness of 7 to 13 μm when cured, the effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), and the effect pigment-containing aqueous coating composition (B) having a solids concentration of 18 to 35 mass %;

(4) applying a clear coating composition (C) to the uncured base coating film obtained in step (3) in a clear coating booth to form an uncured clear coating film; and (5) heating the uncured intermediate coating film, uncured base coating film, and uncured clear coating film formed respectively in steps (2) to (4) to simultaneously cure these three coating films.

Note that the above-described booths are facilities that maintain coating environment conditions such as temperature, humidity, etc., within certain ranges in order to ensure uniform coating quality. Generally, different booths are used according to the types of coating materials to be applied. Additionally, in order to prevent sagging, unevenness, and the like, of the coating material applied to a substrate, there are cases where the same coating material is applied to the substrate two separate times in the same booth. In this case, the first coating is referred to as a first-stage coating, and the second coating is referred to as a second-stage coating.

In Method I, the aqueous colored coating composition (A) is typically applied to obtain a film thickness of 2 to 35 μm, preferably 3 to 24 μm, more preferably 4 to 19 μm, and sill more preferably 5 to 16 μm when cured. The effect pigment-containing aqueous coating composition (B) is typically applied to obtain a film thickness of 7 to 13 μm, preferably 8 to 12 μm, and more preferably 9 to 11 μm when cured. The clear coating composition is typically applied to obtain a film thickness of 10 to 80 μm, preferably 15 to 60 μm, and more preferably 20 to 50 μm when cured.

The method for forming a multilayer coating film of the present invention is preferably employed in a 3-coat-1-bake process in which an aqueous colored coating composition (A) is applied as the first-stage coating performed in a base coating booth, an effect pigment-containing aqueous coating composition (B) is applied as the second-stage coating performed in a base coating booth, and a clear coating composition is applied in a clear coating booth. In this case, Method II described below may, for example, be used to form the coating film.

Method II

A method for forming a multilayer coating film by sequentially performing the following steps (1) to (5):

(1) applying an electrodeposition coating material to the surface of a steel plate, followed by heat-curing, to form a cured electrodeposition coating film;

(2) applying an aqueous colored coating composition (A) to the cured electrodeposition coating film obtained in step (1) in a base coating booth, as a first-stage coating, to form an uncured first base coating film;

(3) applying an effect pigment-containing aqueous coating composition (B) in a base coating booth, as a second-stage coating, without preheating the uncured first base coating film, to the uncured first base coating film obtained in step (2), to form an uncured second base coating film having a film thickness of 7 to 13 μm when cured, the effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), and the effect pigment-containing aqueous coating composition (B) having a solids concentration of 18 to 35 mass %;

(4) applying a clear coating composition (C) to the uncured second base coating film obtained in step (3) in a clear coating booth to form an uncured clear coating film; and (5) heating the uncured first base coating film, uncured second base coating film, and uncured clear coating film formed respectively in steps (2) to (4) to simultaneously cure these three coating films.

Unlike an ordinary 2-stage coating in which the same coating composition is used in the first-stage coating and the second-stage coating in a base coating booth, different coating compositions are used in the first-stage coating and the second-stage coating in Method II.

Method II is the more preferable of the two methods, i.e., Method I and Method II, described above because it does not require an intermediate coating booth and it can therefore reduce the amount of energy used to adjust the temperature and humidity of the intermediate coating booth.

In the method for forming a multilayer coating film of the present invention, the formation of a mixed layer from the aqueous colored coating composition (A) and the effect pigment-containing aqueous coating composition (B) rarely occurs; accordingly, a multilayer coating film having excellent smoothness and distinctness of image can be formed even without preheating. Therefore, the method for forming a multilayer coating film of the present invention is preferably employed in Method II described above in which it is difficult to introduce equipment for preheating because the coating of an aqueous colored coating composition (A) and the coating of an effect pigment-containing aqueous coating composition (B) are performed in the same coating booth.

In step (4) of Method II described above, preheating, air blowing, and the like, may be performed on the base coating film formed in step (3).

In Method II described above, the aqueous colored coating composition (A) is typically applied to obtain a film thickness of 2 to 35 μm, preferably 3 to 24 μm, more preferably 4 to 19 μm, and sill more preferably 5 to 16 μm when cured. The effect pigment-containing aqueous coating composition (B) is typically applied to obtain a film thickness of 7 to 13 μm, preferably 8 to 12 μm, and more preferably 9 to 11 μm when cured. The clear coating composition is typically applied to obtain a film thickness of 10 to 80 μm, preferably 15 to 60 μm, and more preferably 20 to 50 μm when cured.

The method for forming a multilayer coating film of the present invention allows a multilayer coating film having excellent smoothness, distinctness of image, and water resistance to be formed even omitting the preheating step after the application of the aqueous colored coating composition (A) and applying the effect pigment-containing aqueous coating composition (B) to a colored coating film that contains a large amount of solvent. This is presumably because thinly applying an effect pigment-containing aqueous coating composition (B) that has a relatively high solids concentration and contains a large amount of effect pigment forms a thin coating film in which a resin component and effect pigment exist with high density on the colored coating film. This makes it difficult for the solvent contained in the colored coating film to move into the effect coating film. Furthermore, because the effect pigment-containing aqueous coating composition (B) contains a relatively large amount of hydrophobic solvent (b3), it is difficult for the water contained in the colored coating film to move into the effect coating film. Therefore, the formation of a mixed layer from the aqueous colored coating composition (A) and the effect pigment-containing aqueous coating composition (B) can be suppressed.

(II) Embodiment Characterized by Solids Content and Viscosity 30 Seconds after the Application of Aqueous Colored Coating Composition (A)

The present invention provides a method for forming a multilayer coating film described in Items 1B and 2B below as a preferred embodiment.

Item 1B. A method for forming a multilayer coating film by sequentially performing the following steps (1) to (4):

(1) applying an aqueous colored coating composition (A) to a substrate to form an uncured colored coating film;

(2) applying an effect pigment-containing aqueous coating composition (B) comprising 15 to 30 parts by mass of effect pigment relative to 100 parts by mass of the solids content of the binder component (b1), to the uncured colored coating film formed in step (1) without preheating, to form an uncured effect coating film having a film thickness of 7 to 13 μm when cured;

(3) applying a clear coating composition (C) to the uncured effect coating film obtained in step (2) after preheating the uncured effect coating film, to form an uncured clear coating film; and (4) heating the uncured colored coating film, uncured effect coating film, and uncured clear coating film formed respectively in steps (1) to (3) to simultaneously cure these three coating films;

the aqueous colored coating composition (A) having a solids content of 45 to 65% thirty seconds after the application thereof, and a viscosity of 50,000 to 500,000 mPa·s thirty seconds after the application thereof measured at 23° C. and a shear rate of 0.1 sec$^{-1}$, when the aqueous colored coating composition (A) is applied at a temperature of 20° C. and humidity of 65% so as to have a coating film thickness of 20 μm when cured.

Item 2B. The method for forming a multilayer coating film according to Item IB, wherein a part of a resin component, which is a binder component, of the aqueous colored coating composition (A) is an aqueous urethane resin.

The substrates mentioned in the "Substrate" item in the first embodiment described above can be used in this embodiment also. A substrate having film formed thereon comprising an undercoating film formed on the substrate described above is also usable. Among various usable materials, use of substrate having film formed thereon is particularly preferable.

The undercoating film is formed to conceal the surface of the substrate, to impart corrosion resistance and rust resistance, or to improve the adhesion between the substrate and the coating film formed by the aqueous colored coating composition (A) described later. The undercoating film can be formed by applying and then curing an undercoating composition. The materials for the undercoating composition are not particularly limited and, for example, when the substrate is a metal or a metal that has undergone a surface treatment, a cationic electrodeposition coating composition can be used.

Examples of usable cationic electrodeposition coating compositions include known ones that can be obtained by, for example, adding a crosslinking agent, various pigments, and other additives, if necessary, to an aqueous solution or a dispersion of a cationic polymer compound. Examples of the cationic polymer compounds include those obtained by introducing an amino group to an acrylic resin or epoxy resin that contains a crosslinkable functional group such as a hydroxy group. The resulting cationic polymer compound is neutralized using an organic acid or inorganic acid to dissolve or disperse the cationic polymer compound to obtain an aqueous solution or a dispersion of a cationic polymer compound. Examples of the crosslinking agents include blocked polyisocyanate compounds and alicyclic epoxy compounds.

Coating of the cationic electrodeposition coating composition can be performed by, for example, immersing a substrate in a cationic electrodeposition coating composition bath (preferably with a solids content of 10 to 35 mass %) as a cathode, and then applying an electric current under ordinary conditions. The film thickness is preferably about 10 to 40 when cured. The coating film can be cured by heating it, after washing, at about 130 to 200° C., and preferably at about 150 to 180° C. for about 10 to 40 minutes.

In the present invention, a coating film obtained by applying an anti-chipping coating composition to a coating film formed of a cationic electrodeposition coating composition can be used as a substrate. An anti-chipping coating composition is applied to a multilayer coating film in order to prevent a coating film from peeling due to an impact caused by a stone or the like colliding therewith, and to suppress the deterioration of corrosion resistance of the coating film and the progress of corrosion of the steel plate and the like caused by peeling due to an impact. Known examples of the anti-chipping coating compositions include those containing polyolefin resin or urethane resin as a vehicle formation component (in the present specification, a vehicle formation component is equivalent to a binder component) and those containing synthetic rubber latex and like particles. In the present invention, a coating film, to which a known anti-chipping coating composition is applied, can be used as the substrate.

The anti-chipping coating composition can be applied by known methods, such as air spray coating, airless spray coating, and electrostatic spray coating. The film thickness is preferably about 5 to 200 μm and more preferably about 40 to 100 μm. The heating conditions depend on the binder component contained in the coating composition. The heating temperature is preferably about 20 to 200° C. and heating time is preferably about 10 minutes to 60 minutes.

In step (1) of the method for forming a multilayer coating film of the present invention, an aqueous colored coating composition (A) is coated on the substrate. The aqueous colored coating composition (A) of the present invention is a coating composition applied to conceal the color of the substrate and improve the adhesion between the substrate and the coating film formed by the aqueous colored coating composition (A) described later, thereby obtaining sufficient water resistance of the resulting multilayer coating film.

In the present embodiment, an aqueous coating composition that contains a resin component (i.e., a binder component) and a color pigment but does not contain an effect pigment can be used as the aqueous colored coating composition (A) of the present invention.

In the embodiment characterized by the solids content and viscosity 30 seconds after the application of the aqueous colored coating composition (A), known resins those conventionally used as binder components in a coating composition can be used as the binder component of the aqueous colored coating composition (A). Examples of such resins include acrylic resins, polyester resins, alkyd resins, and urethane resins. In the present invention, a resin that contains a crosslinkable functional group, such as hydroxy, carboxy, or epoxy, is preferably used. The resins mentioned in the explanation of the first embodiment are also usable in this embodiment.

The aqueous colored coating composition (A) may further contain a curing agent. When the aqueous colored coating composition (A) contains a curing agent, a resin (base resin) that has a crosslinkable functional group, such as hydroxy, carboxy, or epoxy group, and that can form a cured coating film by reaction with a curing agent, is generally used as the above-described resin. The resin solids content of the aqueous colored coating composition (A) of the present invention is the total mass of the solid components of the above-described resin and the curing agent. The resins mentioned in the explanation of the first embodiment are also usable in this embodiment.

Examples of the above-described resins include acrylic resins, polyester resins, and alkyd resins. Among these, the base resin is preferably a hydroxy-containing resin, more preferably a hydroxy-containing acrylic resin and/or a hydroxy-containing polyester resin. In order to improve the finished appearance and water resistance of the coating film, it is more preferable that a hydroxy-containing acrylic resin and a hydroxy-containing polyester resin be used in combination. When these resins are used in combination, the content of the hydroxy-containing acrylic resin is preferably about 20 to 80 mass %, and more preferably about 30 to 70 mass %, and the content of the hydroxy-containing polyester resin is preferably about 80 to 20 mass %, and more preferably about 70 to 30 mass % relative to the total amount of the hydroxy-containing acrylic resin and hydroxy-containing polyester resin.

When a carboxy- or like acid-group-containing resin is used, the resin preferably has an acid value of about 5 to 150 mgKOH/g, more preferably about 10 to 100 mgKOH/g, and still more preferably about 15 to 80 mgKOH/g. When a hydroxy-containing resin is used, the resin preferably has a hydroxy value of about 1 to 200 mgKOH/g, more preferably about 2 to 180 mgKOH/g, and more preferably about 5 to 170 mgKOH/g.

In the present embodiment, an aqueous colored coating composition (A) has a solids content of 45 to 65% thirty seconds after the application thereof, and a viscosity of 50,000 to 500,000 mPa·s thirty seconds after the application thereof measured at 23° C. and a shear rate of 0.1 sec$^{-1}$, when the aqueous colored coating composition (A) is applied at a temperature of 20° C. and humidity of 65% in such a manner that the resulting coating film will have a thickness of 20 μm when cured. In such an embodiment, the aqueous colored coating composition (A) of the present invention preferably contains an aqueous urethane resin as the binder component, in order to prevent the formation of a mixed layer from the aqueous colored coating composition (A) and the effect pigment-containing aqueous coating composition (B) when the effect pigment-containing aqueous coating composition (B) is applied to the aqueous colored coating composition (A) without preheating.

There is no limitation on the aqueous urethane resin, and conventionally known aqueous urethane resins can be used. It is preferable to use particle-form emulsion having an average particle size of 0.01 to 1 μm, and more preferably 0.1 to 0.5 μm.

In the present invention, in order to impart excellent storage stability and water resistance to the coating film, the aqueous urethane resin preferably has an acid value of 5 to 100 mgKOH/g, and more preferably 10 to 70 mgKOH/g.

In the present invention, the aqueous urethane resin can be obtained by, for example, dispersing into water a urethane prepolymer formed by the reaction of a polyisocyanate, a polyol, and a carboxy-containing diol.

Examples of the polyisocyanates include hexamethylene diisocyanate, trimethyl hexamethylene diisocyanate, dimer acid diisocyanate, lysine diisocyanate, and like aliphatic diisocyanate compounds; biuret-type adducts or isocyanuric ring-type adducts of these diisocyanate compounds; isophorone diisocyanate, 4,4'-methylenebis(cyclohexyl isocyanate), methylcyclohexane-2,4-(or -2,6-)diisocyanate, 1,3-(or 1,4-)di(isocyanatomethyl)cyclohexane, 1,4-cyclohexane diisocyanate, 1,3-cyclopentane diisocyanate, 1,2-cyclohexane diisocyanate and like alicyclic diisocyanate compounds; biuret-type adducts or isocyanuric ring-type adducts of these diisocyanates; xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenylisocyanate), and like aromatic diisocyanate compounds; biuret-type adducts or isocyanuric ring-type adducts of these diisocyanate compounds; triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate and like polyisocyanate compounds having at least three isocyanate groups per molecule; biuret-type adducts or isocyanuric ring-type adducts of these polyisocyanate compounds; urethanized adducts obtained by reacting a polyol such as ethylene glycol, propylene glycol, 1,4-butylene glycol, dimethylolpropionic acid, polyalkylene glycol, trimethylolpropane, or hexanetriol, with a polyisocyanate compound in a ratio such that the amount of isocyanate groups is excessive relative to the amount of polyol hydroxy groups; and biuret-type adducts or isocyanuric ring-type adducts of these urethanized adducts.

Examples of the polyols include those having a weight average molecular weight within a range of 200 to 10,000. Specific examples thereof include polyethylene glycol, polypropylene glycol, polyethylene-propylene (block or random) glycol, polytetramethylene ether glycol, polyhexamethylene ether glycol, polyoctamethylene ether glycol and like polyether polyols; polyols obtained by the condensation polymerization of a dicarboxylic acid (adipic acid, succinic acid, sebacic acid, glutaric acid, maleic acid, fumaric acid, phthalic acid, etc.) with a glycol (ethylene glycol, propylene glycol, 1,4-butanediol, 1,6-hexanediol, 3-methyl-1,5-pentanediol, neopentyl glycol, bis-hydroxymethylcyclohexane, etc.), e.g., polyethylene adipate, polybutylene adipate, polyhexamethylene adipate, polyneopentyl adipate, poly-3-methylpentyl adipate, polyethylene/butylene adipate, polyneopentyl/hexyl adipate and like polyester polyols; polycaprolactone polyol, poly-3-methylvalerolactone polyol; polycarbonate polyol; ethylene glycol, diethylene glycol, triethylene glycol, 1,2-propylene glycol, 1,4-butanediol, tetramethylene glycol, hexamethylene glycol, decamethyleneglycol, octanediol, tricyclodecanedimethylol, hydrogenated bisphenol A, cyclohexane dimethanol, 1,6-hexanediol and like low-molecular-weight glycol compounds. These polyols may be used singly or in a combination of two or more.

Examples of the carboxy-containing diols include dimethylolacetic acid, dimethylolpropionic acid, dimethylolbutyric acid, dimethylolpropionic acid, and dimethylolbutyric acid.

In the present invention, the aqueous urethane resin may be neutralized using a basic compound. Examples of the basic compounds include monoethanolamine, ethylamine, dimethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholino and like water-soluble amino compounds, and ammonia. The neutralizing agent is used in an amount generally 0.5 to 2.0 equivalents, and preferably 0.7 to 1.3 equivalents per equivalent of carboxy in the aqueous urethane resin.

The amount of aqueous urethane resin in the aqueous colored coating composition (A) of the present invention is preferably about 20 to 80 mass %, and more preferably about 30 to 70 mass % relative to the total amount of resin, which is one of the binder components, of the aqueous colored coating composition (A), in order to adjust the viscosity and solids content of the coating film 30 seconds after application of the coating composition within the ranges specified below, and to impart excellent water resistance to the resulting multilayer coating film.

The curing agent cures the aqueous colored coating composition (A) of the present invention by reacting with hydroxy, carboxy, epoxy, and like crosslinkable functional groups. Examples of the curing agents include amino resins, polyisocyanate compounds, blocked polyisocyanate compounds, epoxy-containing compounds, carboxy-containing compounds, carbodiimide-containing compounds, hydrazide-containing compounds, and semicarbazide-containing compounds. Among the above, amino resins reactable with a hydroxy group, polyisocyanate compounds, blocked polyisocyanate compounds, and carbodiimide-containing compounds reactable with a carboxy group are preferable. Among these, amino resins are particularly preferable. The curing agents may be used singly or in a combination of two or more.

Usable amino resins include partially or fully methylolated amino resins obtained by the reaction of an amino component with an aldehyde component. Examples of such amino components include melamine, urea, benzoguanamine, acetoguanamine, steroguanamine, spiroguanamine, and dicyandiamide. Examples of such aldehyde components include formaldehyde, paraformaldehyde, acetaldehyde, and benzaldehyde.

It is also possible to use resins obtained by partially or fully etherifying the methylol groups of methylolated amino resins by using a suitable alcohol. Examples of the alcohols usable for etherification include methyl alcohol, ethyl alcohol, n-propyl alcohol, isopropyl alcohol, n-butyl alcohol, isobutyl alcohol, 2-ethylbutanol, and 2-ethylhexanol.

A melamine resin is preferably used as the amino resin. In particular, a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixture-etherified melamine resin obtained by etherifying some or all of the methylol groups of a partially or fully methylolated melamine resin with methyl alcohol and butyl alcohol are preferable. Among these, a methyl-butyl mixture-etherified melamine resin is particularly preferable.

In terms of the water resistance of the resulting coating film, the melamine resin has a weight average molecular weight preferably of 400 to 6,000, more preferably of 500 to 4,000, and still more preferably of 600 to 3,000.

A commercially available melamine resin can be used as the melamine resin. Examples of commercially available products include Cymel 202, Cymel 203, Cymel 238, Cymel 251, Cymel 303, Cymel 323, Cymel 324, Cymel 325, Cymel 327, Cymel 350, Cymel 385, Cymel 1156, Cymel 1158, Cymel 1116, and Cymel 1130 (produced by Nihon Cytec Industries Inc.), U-VAN 120, U-VAN 20HS, U-VAN 20SE60, U-VAN 2021, U-VAN 2028, and U-VAN 28-60 (produced by Mitsui Chemicals, Inc.).

When a melamine resin is used as the curing agent, paratoluene sulfonic acid, dodecylbenzenesulfonic acid, dinonylnaphthalene sulfonic acid and like sulfonic acids; monobutyl phosphate, dibutyl phosphate, mono-2-ethylhexyl phosphate, di-2-ethylhexyl phosphate and like alkyl phosphoric esters; and salts of these acids with an amine compound may be used as a catalyst.

The polyisocyanate compound has at least two isocyanate groups per molecule. Examples thereof include hexamethylene diisocyanate, trimethylhexamethylene diisocyanate, dimer acid diisocyanate, lysine diisocyanate, and like aliphatic diisocyanate compounds; hydrogenated xylylene diisocyanate, cyclohexylene diisocyanate, isophorone diisocyanate, and like alicyclic diisocyanate compounds; tolylene diisocyanate, phenylene diisocyanate, 4,4'-diphenylmethane diisocyanate, xylylene diisocyanate, tetramethylxylylene diisocyanate, naphthalene diisocyanate, and like aromatic diisocyanate compounds; trivalent or higher organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (commonly referred to as triamino-nonane triisocyanate); dimers and trimers of such polyisocyanate compounds; and prepolymers obtained by a urethanization reaction of such polyisocyanate compounds with polyhydric alcohols, low-molecular-weight polyester resins, or water, under conditions such that isocyanate groups are present in excess.

When a polyisocyanate compound is used as the curing agent, examples of usable catalysts include tin octylate, dibutyltin diacetate, dibutyltin di(2-ethylhexanoate), dibutyltin dilaurate, dibutyltin diacetate, dioctyltin di(2-ethylhexanoate), dibutyltin oxide, dioctyltin oxide, dibutyltin fatty acid salt, lead 2-ethylhexanoate, zinc octylate, zinc naphthenate, zinc fatty acid compounds, cobalt naphthenate, calcium octylate, copper naphthenate, tetra(2-ethylhexyl)titanate and like organic metal compounds; tertiary amines; and phosphoric acid compounds. Such compounds may be used singly or in a combination of two or more.

The blocked polyisocyanate compounds can be obtained by blocking isocyanate groups of a polyisocyanate compound with a blocking agent. Usable blocking agents include oxime compounds, phenol compounds, alcohol compounds, lactam compounds, mercaptan compounds, and the like.

Examples of the carbodiimide-containing compounds include those obtained by subjecting isocyanate groups of a polyisocyanate compound to a carbon dioxide removal reaction. Commercially available carbodiimide-containing compounds include, for example, Carbodilite V-02, Carbodilite V-02-L2, Carbodilite V-04, Carbodilite E-01, and Carbodilite E-02 (produced by Nisshinbo Industries, Inc.).

The aqueous colored coating composition (A) of the present invention contains a color pigment in order to conceal the color of the substrate, and to adjust the hue and brightness of a multilayer coating film. There is no particular limitation on the color pigment, and specific examples thereof include inorganic pigments such as transparent iron oxide pigment, titan yellow and like composite oxide pigments; and organic pigments such as azo-based pigment, quinacridone-based pigment, diketopyrrolopyrrole-based pigment, perylene-based pigment, perinone-based pigment, benzimidazolon-based pigment, isoindoline-based pigment, isoindolinone-based pigment, azo-metal chelate pigment, phthalocyanine-based pigment, indanthrone-based pigment, dioxazine-based pigment, threne-based pigment, and indigo-based pigment; and titanium oxide pigment and carbon black pigment. One or more arbitrarily selected pigments are used singly or in a combination of two or more. In the present invention, the use of a titanium oxide pigment is preferable in order to conceal the color of the substrate.

Titanium oxide pigments are widely used as a white pigment because of their high refractive index. There are two types of titanium oxide pigments, namely, rutile titanium dioxide and anatase titanium, depending on their crystal systems. Both types of titanium dioxides are usable in the present invention; however, the rutile titanium dioxide is preferably used from the viewpoint of weather resistance. Furthermore, in order to improve dispersibility and weather resistance, the surface of the titanium dioxide may be treated with an inorganic compound such as silica, zirconium oxide, or aluminum oxide. In the present invention, in order to satisfactorily conceal the color of the substrate, the titanium oxide pigment preferably has an average primary particle size of 100 to 400 nm, and more preferably 200 to 300 nm.

When titanium oxide pigment is used in the aqueous colored coating composition (A) as a color pigment, the content of the titanium oxide pigment is preferably 30 to 200 parts by mass, and more preferably 50 to 120 parts by mass relative to 100 parts by mass of resin solids content from the viewpoint of the finished appearance.

The aqueous colored coating composition (A) may contain one or more color pigments other than the titanium oxide pigment in order to adjust the brightness of the multilayer coating film. In this case, the content of such pigments is preferably 0.1 to 50 parts by mass, and more preferably 0.5 to 20 parts by mass relative to 100 parts by mass of resin solids content in order to obtain the desired brightness of the multilayer coating film.

Furthermore, the aqueous colored coating composition (A) may contain water, organic solvent, and like solvents; pigment dispersant, antisettling agent, curing catalyst, antifoaming agent, antioxidant, UV absorber, and like additives; extender pigments; etc., if necessary. The aqueous colored coating composition (A) can be prepared by mixing and dispersing the components described above. It is preferable to adjust the solids content of the coating composition during application (i.e., before being cured) to 30 to 70 mass %, and preferably 40 to 60 mass %, with a viscosity, measured using a B-type viscometer, of 300 to 2,500 mPa·s (number of rotations: 6).

In step (1) of the present invention, an aqueous colored coating composition (A) is coated on the substrate by electrostatic coating, air spray coating, airless spray coating, or the like. It is preferable that the coating film have a thickness, when cured, of 10 to 30 µm, and more preferably 15 to 25 µm, in order to conceal the color of the substrate or to impart an excellent finished appearance to the resulting coating film.

In step (2) of the present invention, an aqueous colored coating composition (A) is applied, and then an effect pigment-containing aqueous coating composition (B) is coated on the uncured colored coating film obtained in step (1) (in this specification, the uncured colored coating film may be referred to as a first base coating film) without preheating, to form a second base coating film. In this case, in order to prevent the formation of a mixed layer from the first base coating film and the second base coating film, and to enhance the brilliance of the resulting multilayer coating film, the aqueous colored coating composition (A) of the present invention is preferably applied in such a manner that it has a film thickness of 20 µm when cured, and a solids content of 45 to 65% thirty seconds after the application thereof. Furthermore, the aqueous colored coating composition (A) of the present invention preferably has a viscosity of 50,000 to 500,000 mPa·s thirty seconds after the application thereof, measured at 23° C. and a shear rate of 0.1 sec$^{-1}$, when it is applied at a temperature of 20° C. and humidity of 65%.

The solids content 30 seconds after the application of the coating composition is attained by scraping off a portion of the coating film 30 seconds after the application of the coating composition, and measuring the coated NV (non-volatile organic compound) value after drying at 110° C. for 1 hour. More specifically, the heating residue (i.e., nonvolatile content) was measured after heating 1±0.1 g of coating composition at 110° C. for 1 hour, and dividing the heating residue by the weight of the coating composition before drying (within the range of 1±0.1 g).

In this specification, the viscosity 30 seconds after the application of the first base coating film is defined in the following manner. A single coat of aqueous colored coating composition (A) is applied using a rotary atomization bell-shaped coating device, i.e., ABB's Cartridge Bell System (product name, produced by ABB K.K.) in such a manner that the film thickness becomes 20 μm when cured, under the following conditions: bell diameter: 77 mm, bell rotation speed: 25,000 rpm, shaping air flow rate: 700 NL/min, applied voltage: −60 kV, temperature: 23° C., and humidity: 75%. Thirty seconds after the application of the aqueous colored coating composition (A), a portion of the coating film is scraped off and collected using a spatula or the like. The viscosity of the collected coating film is measured using a viscotester at 23° C. and a shear rate of 0.1 sec$^{-1}$ when the shear rate is changed from 10,000 sec$^{-1}$ to 0.0001 sec$^{-1}$. The viscosity thus measured is defined as the viscosity 30 seconds after application. One example of a viscotester is the HAAKE RheoStress RS150 (product name, produced by HAAKE). Note that the unit NL/min for the shaping air flow rate is generally used in measurements performed using an area flowmeter for measuring gas flow, wherein the volume of the shaping air passing through a pipe over one minute is converted into that under the normal condition (0° C., 1 atm., i.e., atmospheric pressure).

Control of the viscosity 30 seconds after application of the aqueous colored coating composition (A) can be performed by using an aqueous urethane resin as the resin component, adding a rheology control agent, or adjusting the solids content of the coating composition.

Examples of rheology control agents include silicate, metal silicate, montmorillonite, organic montmorillonite, colloidal alumina and like inorganic thickeners; sodium polyacrylate, polyacrylic acid/(meth)acrylic-acid ester copolymer and like polyacrylic acid-based thickeners; urethane associative thickeners having a urethane bond and a polyether chain per molecule and effectively exhibiting a thickening effect by the binding of the urethane bonds to each other in an aqueous medium (examples of commercially available urethane associative thickeners include UH-814N, UH-462, UH-420, UH-472, and UH-540 produced by Asahi Denka Kogyo K.K.; and SN Thickener 612, SN Thickener 621N, SN Thickener 625N, and SN Thickener 627N produced by San Nopco Ltd.); carboxymethylcellulose, methylcellulose, hydroxyethylcellulose, and like cellulose derivative thickeners; casein, sodium caseinate, ammonium caseinate, and like protein thickeners; sodium alginate and like alginic acid thickeners; polyvinyl alcohol, polyvinyl pyrrolidone, polyvinyl benzyl ether copolymers, and like polyvinyl thickeners; pluronic polyether, polyether dialkyl ester, polyether dialkyl ether, a polyether epoxy-modified product, and like polyether-based thickeners; partial esters of a copolymer of vinyl methyl ether and maleic anhydride, and like maleic anhydride copolymer thickeners; and polyamide amine salts and like polyamide-based thickeners. Among these, polyacrylic acid-based thickeners or urethane-associated thickeners are preferable, and urethane-associated thickeners are particularly preferable. These rheology control agents may be used singly or in a combination of two or more.

In order to obtain a desirable finished appearance and water resistance of the multilayer coating film, the application of the effect pigment-containing aqueous coating composition (B) in step (2) of the present invention is preferably performed when the first base coating film has an application solids content (wet film non volatile) of 45 to 65% and an application viscosity of 50,000 to 500,000 mPa·s measured at 23° C. and a shear rate of 0.1 sec$^{-1}$. The application solids content and viscosity can be defined by the values measured in the same manner as measuring the viscosity and solids content 30 seconds after application.

In step (2) of the present invention, in order to prevent the formation of a mixed layer from the first base coating film and the second base coating film; and, at the same time, to enhance the adhesion between the first base coating film and the second base coating film, it is preferable to perform setting for about 1 to 10 minutes at room temperature, and more preferably for 2 and a half minutes to 6 minutes, after the application of the first aqueous base coating composition.

In the present embodiment, the effect pigment-containing aqueous coating composition (B) is a coating composition that comprises an effect pigment and that is coated on the uncured first base coating film without preheating the first base coating film. In the effect pigment-containing aqueous coating composition (B), the content of the effect pigment is preferably within a range of 15 to 50 parts by mass, and more preferably within a range of 18 to 30 parts by mass relative to 100 parts by mass of resin component from the viewpoint of the finished appearance of the multilayer coating film and the adhesion between the first base coating film and the second base coating film. Examples of the usable effect pigments are the same as those mentioned in Item (1) above, and the scale-like effect pigment is preferable among those. Examples of the scale-like effect pigments include scale-like metallic pigments such as aluminium, copper, nickel alloy, and stainless steel, scale-like metallic pigments covered with metal oxide, scale-like metallic pigments onto whose surfaces color pigment is chemically adhered, scale-like aluminium pigments onto whose surfaces an aluminum oxide layer is formed by inducing an oxidation reduction reaction, aluminium-dissolved iron oxide flake pigments, glass flake pigments, glass flake pigments covered with metal or metal oxide, glass flake pigments onto whose surfaces color pigment is chemically absorbed, interference mica pigments covered with titanium dioxide, reduced mica pigments obtained by reducing interference mica pigment, colored mica pigments onto whose surfaces color pigment is chemically absorbed or whose surfaces are covered with iron oxide, graphite pigments covered with titanium dioxide, silica flake or alumina flake pigments covered with titanium dioxide, iron oxide flake pigments, holographic pigments, synthetic mica pigments, helical cholesteric liquid crystal polymer pigments, and bismuth oxychloride pigments.

In the present invention, the effect pigment-containing aqueous coating composition (B) may further contain color pigments suitably selected from those mentioned as the usable examples for the aqueous colored coating composition (A) described above. In the present invention, the amount of the color pigment is preferably within a range of 10 to 50 parts by mass, and more preferably 12 to 25 parts by mass relative to 100 parts by mass of the resin solids content in the coating composition described later, from the viewpoint of the brilliance and water resistance of the resulting multilayer coating film.

In the present invention, the effect pigment-containing aqueous coating composition (B) may use, as the binder component, resins and curing agents, those usable in the aqueous colored coating composition (A). In the effect pigment-containing aqueous coating composition (B) of the present invention, it is preferable to use a hydroxy-containing acrylic resin and a hydroxy-containing polyester resin in combination, and further add a curing agent in order to obtain excellent finished appearance of the multilayer coating film.

Furthermore, the effect pigment-containing aqueous coating composition (B) may contain water, organic solvent and like solvents; pigment dispersant, antisettling agent, curing catalyst, antifoaming agent, antioxidant, UV absorber, and like additives; extender pigments; etc., if necessary. The second base coating composition can be prepared by mixing and dispersing the components described above. It is preferable to adjust the solids content of the effect pigment-containing aqueous coating composition (B) during application (i.e., before being cured) to 30 to 70 mass %, and preferably 40 to 60 mass %, with a viscosity, measured using a B-type viscometer, of 300 to 2,500 mPa·s (number of rotations: 6).

In the present embodiment, i.e., in the embodiment wherein an aqueous colored coating composition (A) having a viscosity 30 seconds after application falls within the above range is used, the content of the hydrophobic solvent (b3) is not particularly limited. The content of the hydrophobic solvent (b3) is preferably 25 to 60 parts by mass, more preferably 30 to 50 parts by mass, and still more preferably 35 to 45 parts by mass.

In step (2) of the present invention, it is preferable that the effect pigment-containing aqueous coating composition (B) is applied in such a manner that the resulting coating film will have a thickness of 7 to 13 μm when cured, in order to attain both excellent finished appearance and water resistance of the multilayer coating film.

In the present embodiment, after applying the effect pigment-containing aqueous coating composition (B), in order to prevent popping and like defects of the first base coating film and the second base coating film, preheating (preliminary heating) is conducted in step (3), and then the top clear coating composition described below is applied. The temperature of the preheating is preferably 40 to 100° C., more preferably 50 to 90° C., and still more preferably 60 to 80° C. The preheating time is preferably 30 seconds to 15 minute, more preferably 1 to 10 minutes, and still more preferably 2 to 5 minutes.

In step (3), after performing the preheating, one, two, or more layers of the top clear coating composition is applied to form a clear coating film.

The top clear coating composition used in the method for forming a multilayer coating film of the present invention comprises resin components and solvent as main components, and other additives for use in coating compositions, if necessary. The top clear coating composition is a liquid coating composition that can form a colored or transparent coating film.

There is no limitation to the top clear coating composition used in the present invention, and various known coating compositions can be used. Examples of the usable coating compositions include liquid or powder coating compositions containing a base resin and crosslinking agent. Examples of base resins include acrylic resins, polyester resins, alkyd resins, fluororesins, urethane resins, and silicon-containing resins that contain hydroxy, carboxy, silanol, epoxy and like crosslinkable functional groups. Examples of crosslinking agents include melamine resins, urea resins, polyisocyanate compounds, blocked polyisocyanate compounds, epoxy compounds or resins, carboxy-containing compounds or resins, acid anhydride, and alkoxysilane-containing compounds or resins that can react with the base resin. Furthermore, water, organic solvent and like solvents; curing catalysts, antifoaming agents, rheology control agents, antioxidants, surface modifiers and like additives may be added, if necessary.

The top clear coating composition may contain a color pigment in such an amount that the transparency of the clear coating composition is not impaired. Usable color pigments include conventionally known pigments for use in ink or coating compositions; and these pigments may be used singly, or in a combination of two or more. The amount of the color pigments added may be suitably selected. The content of the color pigments is generally 30 parts by mass or less, and preferably 0.01 to 5 parts by mass, relative to 100 parts by mass of the resin solids content of the top clear coating composition.

The top clear coating composition can be applied by electrostatic coating, air spray coating, airless spray coating, or the like. The thickness thereof is preferably within a range of 5 to 40 μm when cured.

In step (4) of the present invention, the three layers of the coating film obtained in steps (1) to (3) are simultaneously cured by heating. After the application of the top clear coating composition, it is possible, if necessary, to have an interval of about 1 to 60 minutes at room temperature, or to perform preheating at about 40 to 80° C. for about 1 to 60 minutes.

Heat curing of the three-layer coating film can be performed by a known heating method. For example, the method described above in the first embodiment can be used.

(III) Embodiment in which the Aqueous Colored Coating Composition (A) Comprises a Specific Urethane Resin Emulsion In another preferable embodiment, the present invention provides a method for forming a multilayer coating film according to the following Items 1C to 3C:

Item 1C. A method for forming a multilayer coating film comprising the following steps (1) to (4):

(1) applying an aqueous colored coating composition (A) to a substrate to form an uncured colored coating film, the aqueous colored coating composition (A) comprising a binder component (a1) and a pigment (a2), the binder component (a1) comprising a urethane resin emulsion (a1-1(c)) having a weight average molecular weight of 2,000 to 50,000 produced using a polyisocyanate component and a polyol component as starting materials, the polyisocyanate component comprising alicyclic diisocyanate, and the polyol component comprising 50 mass % or more polycarbonate diol relative to the total amount of the polyol component;

(2) applying an effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), to the uncured colored coating film formed in step (1), without preheating the uncured colored coating film, to form an uncured effect coating film having a film thickness of 7 to 13 μm when cured;

(3) applying a clear coating composition (C) to the uncured effect coating film formed in step (2) to form an uncured clear coating film; and (4) heating the uncured colored coating film, the uncured effect coating film, and the uncured clear coating film formed respectively in steps (1) to (3) to simultaneously cure these three coating films.

Item 2C. The method for forming a multilayer coating film according to Item 1C, wherein the polycarbonate diol is obtained by reacting a diol component and a carbonylating agent, the diol component comprises a diol having 6 or more carbon atoms in an amount of 90 mass % or more relative to the total amount of the diol component, and the diol having 6 or more carbon atoms comprises a cycloalkylene group-containing alicyclic diol having 6 or more carbon atoms.

Item 3C. The method for forming a multilayer coating film according to Item 1C or 2C, wherein the pigment (a2) comprises titanium dioxide and/or barium sulfate, and the total content of the titanium dioxide and barium sulfate is 50 to 150 parts by mass relative to 100 parts by mass of the solids content of the binder component (a1).

The substrates mentioned in the "Substrate" item in the first embodiment described above can also be used in this embodiment.

Aqueous Colored Coating Composition (A)

The aqueous colored coating composition (A) to be applied to a substrate may be, for example, a coating composition comprising a binder component (a1), a pigment (a2), and optionally additives for coating compositions, etc.

Binder Component (a1)

The binder component (a1) comprises, as at least a part thereof, a urethane resin emulsion (a1-1(c)) with a weight average molecular weight of 2,000 to 50,000 prepared using, as starting materials, a polyisocyanate component containing an alicyclic diisocyanate, and a polyol component containing a polycarbonate diol in an amount of 50 mass % or more. As the binder component (a1), known film-forming resins that have been used as binder components of coating compositions can also be used, if necessary. Non-crosslinked type resin and crosslinked type resin both can be used.

The urethane resin emulsion (a1-1(c)) has the following features: the emulsion is prepared by reacting a polyisocyanate component and a polyol component; the polyisocyanate component contains an alicyclic diisocyanate; and the polyol component contains a polycarbonate diol in an amount of 50 mass % or more relative to the total amount of the polyol component.

Examples of polyisocyanate components include an alicyclic diisocyanate as the essential component and other polyisocyanates.

Examples of alicyclic diisocyanates include isophorone diisocyanate, dicyclohexylmethane-4,4'-diisocyanate, trans-1,4-cyclohexyl diisocyanate, and norbornane diisocyanate. Among these, isophorone diisocyanate and dicyclohexylmethane-4,4'-diisocyanate are particularly preferable as the alicyclic diisocyanates, in view of improving the anti-organic solvent swelling property of the resulting coating film.

The content (mass %) of the aliphatic diisocyanate in the polyisocyanate component is preferably 50 to 100%, and more preferably 70 to 100%, in view of chipping resistance.

Examples of other polyisocyanates are diisocyanates other than alicyclic diisocyanates, and polyisocyanates having three or more isocyanate groups per molecule.

Examples of diisocyanates other than alicyclic diisocyanates include tolylene diisocyanate, diphenylmethane-4,4'-diisocyanate, p-phenylene diisocyanate, xylylene diisocyanate, 1,5-naphtylene diisocyanate, 3,3'-dimethyldiphenyl-4,4'-diisocyanate, dianisidine diisocyanate, tetramethylxylylene diisocyanate, and like aromatic diisocyanates; and 1,6-hexamethylene diisocyanate, 2,2,4 and/or (2,4,4)-trimethylhexamethylene diisocyanate, lysine diisocyanate, and like aliphatic diisocyanates.

The above diisocyanates may be used in the form of isocyanates blocked with various blocking agents.

Examples of polyisocyanates having three or more isocyanate groups per molecule include isocyanurate trimers, biuret trimers, trimethylolpropane adducts of the above-mentioned diisocyanates, and the like; and triphenylmethane triisocyanate, 1-methylbenzole-2,4,6-triisocyanate, dimethyl triphenylmethane tetraisocyanate, and like tri- or poly-functional isocyanates. These isocyanate compounds may be used in the form of modified products, such as carbodiimide-modified products, isocyanurate-modified products, and biuret-modified products, or in the form of blocked isocyanates, i.e., isocyanates blocked with various blocking agents.

Examples of the polyol component used as a starting material for the urethane resin emulsion (a1-1(c)) include polycarbonate polyols, including polycarbonate diols used as an essential component, ester bond-containing polyols, polycaprolactone polyols, low-molecular-weight polyols, polyether polyols, polybutadiene polyols, and silicone polyols.

The polycarbonate polyols are compounds obtained by a polycondensation reaction of a known polyol with a carbonylating agent according to a common method.

Examples of polyols that can be used as starting materials for polycarbonate polyols include diols and trihydric or higher polyhydric alcohols.

Among the polyols that can be used as starting materials for polycarbonate polyols, examples of diols include 1,3-propanediol, 1,4-butanediol, 1,5-pentanediol, 1,6-hexanediol, 1,7-heptanediol, 1,8-octanediol, 1,9-nonanediol, 1,10-decanediol, and like straight-chain aliphatic diols; 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, and like branched-chain aliphatic diols; 1,3-cyclohexane diol, 1,4-cyclohexane diol, 1,4 cyclohexane dimethanol, and like alicyclic diols; p-xylenediol, p-tetrachloroxylenediol, and like aromatic diols; and diethylene glycol, dipropylene glycol, and like ether diols. Such diols may be used singly or in a combination of two or more.

Among the polyols that can be used as starting materials for polycarbonate polyols, examples of trihydric or higher polyhydric alcohols include glycerin, trimethylolethane, trimethylolpropane, trimethylolpropane dimer, and pentaerythritol. Such trihydric or higher polyhydric alcohols can be used singly or in a combination of two or more.

Known carbonylating agents may be used as the starting material for polycarbonate polyols. Specific examples thereof include alkylene carbonates, dialkyl carbonates, diaryl carbonates, and phosgene. These compounds may be used singly or in a combination of two or more. Preferable among these are ethylene carbonate, propylene carbonate, dimethyl carbonate, diethyl carbonate, dibutyl carbonate, diphenyl carbonate, etc.

The polycarbonate diol used as an essential starting material in the present invention can be synthesized by using a diol as the only polyol that is reacted with a carbonylating agent, without using trihydric or higher polyhydric alcohols.

The diol component of the polycarbonate diol may be a diol typically having 6 or more carbon atoms, preferably 6 to 20 carbon atoms, more preferably 6 to 15 carbon atoms, and still more preferably 6 to 12 carbon atoms.

Examples of diols having 6 or more carbon atoms include a cycloalkylene group-containing alicyclic diol having 6 or more carbon atoms, and alkylene group-containing cycloalkylene groups having 6 or more carbon atoms.

Examples of cycloalkylene group-containing alicyclic diols having 6 or more carbon atoms include alicyclic diols having 6 or more carbon atoms, and preferably 6 to 12 carbon atoms, such as 1,3-cyclohexanediol, 1,4-cyclohexanediol, and 1,4-cyclohexane dimethanol.

Among these, 1,4-cyclohexane dimethanol is preferable in view of chipping resistance.

Examples of alkylene group-containing aliphatic diols having 6 or more carbon atoms include straight or branched-chain aliphatic diols having 6 or more carbon atoms, and preferably 6 to 10 carbon atoms, such as 1,6-hexanediol, 1,7-heptanediol, 1,8-octanediol, 1,9-nonanediol, 1,10-decanediol, and like straight-chain aliphatic diols; and 3-methyl-1,5-pentanediol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, 2-ethyl-1,3-hexanediol, and like branched-chain aliphatic diols.

Either the above straight-chain aliphatic diols or branched-chain aliphatic diols, or both may be used.

Among these, straight-chain aliphatic diols are preferable in view of chipping resistance, and 1,6-hexanediol is particularly preferable.

The diol component of the polycarbonate diol preferably contains a $C_6$ or greater diol in an amount of 90 mass % or more, and particularly preferably 95 mass % or more, relative to the total amount of the diol component.

In view of the surface smoothness of the resulting multilayer coating film, the following polycarbonate diols are particularly preferable: polycarbonate diols obtained by a reaction of a diol component with a carbonylating agent, wherein the diol component contains a $C_6$ or greater diol in an amount of 90 mass % or more, relative to the total amount of the diol component; and the $C_6$ or greater diol contains a cycloalkylene group-containing alicyclic diol having 6 or more carbon atoms.

The cycloalkylene group-containing alicyclic diols having 6 or more carbon atoms is preferably used in an amount of 50 mass % or more, more preferably 65 to 100 mass %, and particularly preferably 75 to 100 mass %, in the total amount of the diols having 6 or more carbon atoms.

In another preferable embodiment, examples of polycarbonate diols that can be used as a starting material for the urethane resin emulsion (a1-1(c)) include polycarbonate diols produced using a diol component containing a cycloalkylene group-containing alicyclic diol having 6 or more carbon atoms as mentioned above, i.e., polycarbonate diols obtained by reacting a diol component containing a cycloalkylene group-containing $C_6$ or greater alicyclic diol, with a carbonylating agent.

In this embodiment, examples of polycarbonate diols that can be preferably used as a starting material for the urethane resin emulsion (a1-1(c)) include polycarbonate diols produced using a diol component containing a cycloalkylene group-containing alicyclic diol having 6 or more carbon atoms and an alkylene group-containing aliphatic diol having 6 or more carbon atoms, wherein the total amount of the alicyclic diol and the aliphatic diol in the diol component is 50 mass % or more, relative to the total amount of the diol component, that is, polycarbonate diols obtained by reacting a diol component containing the above alicyclic diol and the above aliphatic diol in an amount of 50 mass % or more, with a carbonylating agent.

In this embodiment, it is further preferable that 1,4-cyclohexane dimethanol is used as a cycloalkylene group-containing alicyclic diol having 6 or more carbon atoms, and that 1,6-hexanediol is used as an alkylene group-containing aliphatic diol having 6 or more carbon atoms.

In this embodiment, the mass ratio of the cycloalkylene group-containing alicyclic diol having 6 or more carbon atoms to the alkylene group-containing aliphatic diol having 6 or more carbon atoms is preferably in the range of 20:80 to 80:20.

In another preferable embodiment, examples of polycarbonate diols that can be used as a starting material for the urethane resin emulsion (a1-1(c)) include polycarbonate diol components produced using a diol component containing an alkylene group-containing aliphatic diol having 6 or more carbon atoms and a cycloalkylene group-containing alicyclic diol having 6 or more carbon atoms, wherein the total amount of the aliphatic diol and the alicyclic diol in the diol component is 50 mass % or more, relative to the total amount of the diol component.

In this embodiment, it is preferable that 1,6-hexanediol be used as the alkylene group-containing aliphatic diol having 6 or more carbon atoms, and 1,4-cyclohexane dimethanol be used as the cycloalkylene group-containing alicyclic diol having 6 or more carbon atoms.

In this embodiment, the mass ratio of the alkylene group-containing aliphatic diol having 6 or more carbon atoms to the cycloalkylene group-containing alicyclic diol having 6 or more carbon atoms is preferably in the range of 20:80 to 80:20.

Among the polyol components, examples of ester bond-containing polyols include polyester polyols and polyester polycarbonate polyols.

Examples of polyester polyols include those obtained by a direct esterification reaction and/or an ester exchange reaction of a polyhydric alcohol with a polycarboxylic acid or an ester-forming compound thereof, such as an ester, anhydride, or halide thereof, wherein the polycarboxylic acid or ester-forming compound is used in an amount less than the stoichiometric amount of the polyhydric alcohol.

Examples of polyhydric alcohols that can be used as starting materials for polyester polyols include ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol, triethylene glycol, and like aliphatic diol compounds; cyclohexane dimethanol, cyclohexane diol, and like alicyclic diol compounds; and trimethylolethane, trimethylolpropane, hexitol compounds, pentitol compounds, glycerin, pentaerythritol, tetramethylolpropane, and like trihydric or higher polyhydric alcohol compounds.

Examples of polycarboxylic acids or ester-forming compounds thereof that can be used as starting materials for polyester polyols include oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, dimer acid, and like aliphatic dicarboxylic acid compounds; phthalic acid, terephthalic acid, isophthalic acid, naphthalene dicarboxylic acid, and like aromatic dicarboxylic acid compounds; 1,2-cyclopentane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 1,4-dicarboxymethylcyclohexane, nadic acid, methylnadic acid, and like alicyclic dicarboxylic acid compounds; tricarboxylic acid compounds (e.g., trimellitic acid, trimesic acid, and trimer of castor oil fatty acid), and like polycarboxylic acids; acid anhydrides of these polycarboxylic acids; halides, such as chlorides and bromides of the polycarboxylic acids; lower esters of the polycarboxylic acids, such as methyl esters, ethyl esters, propyl esters, isopropyl esters, butyl esters, isobutyl esters, and amyl esters; and γ-caprolactone, δ-caprolactone, ε-caprolactone, dimethyl-ε-caprolactone, δ-valerolactone, γ-valerolactone, γ-butyrolactone, and like lactone compounds.

Among polyol components, examples of polycaprolactone polyols include ring-opened polymers of caprolactones, such as polycaprolactone diols.

Among polyol components, examples of low-molecular-weight polyols include polyhydric alcohols exemplified by polyester polyols.

Among polyol components, examples of polyether polyols include ethylene oxide and/or propylene oxide adducts of the above-mentioned low-molecular-weight polyols and polytetramethylene glycols.

Among polyol components, examples of polybutadiene polyols are those widely known in this technical field.

Examples of silicone polyols include hydroxy-terminated silicone oil compounds having a siloxane bond in the molecule.

As the polyol component, a carboxy-containing diol can be used. The carboxy-containing diol is used for introducing a hydrophilic group to the polyurethane molecules. The hydrophilic group is a carboxy group. Specific examples thereof include dimethylol propionic acid, dimethylol butanoic acid, dimethylol butyric acid, and dimethylol valeric acid.

In the present invention, the amount of the polycarbonate diol component in the urethane resin emulsion (a1-1(c)) is preferably 50 mass % or more, particularly preferably 75 to 100 mass %, and still more preferably 90 to 100 mass %, based on the total amount of the polyol component, in view of the surface smoothness of the coated surface.

The urethane resin emulsion (a1-1(c)) may be produced by using an amine component, if necessary, in addition to the polyisocyanate component and the polyol component. Examples of amine components include monoamine compounds and diamine compounds.

The monoamine compounds are not particularly limited, and known monoamine compounds can be used singly or in a combination or two or more. Examples of monoamine compounds include ethylamine, propylamine, 2-propylamine, butylamine, 2-butylamine, tertiary butylamine, isobutylamine, and like alkylamines; aniline, methylaniline, phenylnaphthylamine, naphtylamine, and like aromatic amines; cyclohexylamine, methylcyclohexylamine, and like alicyclic amines; 2-methoxy ethylamine, 3-methoxy propylamine, 2-(2-methoxyethoxy)ethylamine, and like ether amines; and ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, N-ethylethanolamine, and like alkanolamines. Among these, alkanolamines are preferable because they impart good water dispersion stability to polyurethane molecules. 2-aminoethanol and diethanolamine are preferable in view of supply stability.

The diamine compounds are not particularly limited, and known diamine compounds can be used singly or in a combination of two or more. Examples of diamine compounds include low-molecular-weight diamine compounds obtained by substitution of an alcoholic hydroxy group in the above-exemplified low-molecular-weight diols with an amino group, such as ethylenediamine and propylenediamine; polyoxypropylenediamine, polyoxyethylenediamine and like polyetherdiamine compounds; menthanediamine, isophoronediamine, norbornenediamine, bis(4-amino-3-methyldicyclohexyl)methane, diaminodicyclohexylmethane, bis(aminomethyl)cyclohexane, 3,9-bis(3-aminopropyl)2,4,8,10-tetraoxaspiro(5,5)undecane, and like alicyclic diamine compounds; m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α'-bis(4-aminophenyl)-p-diisopropylbenzene, and like aromatic diamine compounds; hydrazines; and dicarboxylic acid dihydrazide compounds, which are compounds formed between dicarboxylic acids exemplified by the polycarboxylic acids used for the polyester polyols, and hydrazines. Among the diamine compounds, low-molecular-weight diamine compounds are preferable in view of handleability. Ethylenediamines are particularly preferable.

Further, a carboxy-neutralizing component may be used, if necessary. The carboxy-neutralizing component is a basic compound that reacts with a carboxy group in the carboxy-containing diol and that forms a hydrophilic salt. Examples thereof include trimethylamine, triethylamine, tributylamine, and like trialkylamine compounds; N,N-dimethylethanolamine, N,N-dimethylpropanolamine, N,N-dipropylethanolamine, 1-dimethylamino-2-methyl-2-propanol, and like N,N-dialkyl alkanolamine compounds; N-alkyl-N,N-dialkanolamine compounds; trialkanolamine compounds (such as triethanolamine), and like tertiary amine compounds; ammonia; trimethyl ammonium hydroxide; sodium hydroxide; potassium hydroxide; and lithium hydroxide. Among these, tertiary amine compounds are preferable because the dispersion stability of the resulting urethane resin emulsion (a1-1(c)) is good.

In addition to the components described above, the urethane resin emulsion (a1-1(c)) may further contain an internal branching agent for imparting a branched structure to the polyurethane molecules and/or an internal crosslinking agent for imparting a crosslinking structure to the polyurethane molecules. Trihydric or higher polyhydric polyols can be preferably used as such internal branching agents and internal crosslinking agents. Examples thereof include trimethylolpropane.

The method for producing a urethane resin emulsion (a1-1(c)) is not particularly limited, and can be selected from known methods. A preferable production method comprises synthesizing a prepolymer or polymer in a solvent that is inert to reaction and that has high hydrophilicity, and feeding the prepolymer or polymer to water to disperse the same therein. Specific examples of such methods include (A) a method comprising synthesizing a prepolymer from the polyisocyanate component and the polyol component in the above solvent, and reacting the prepolymer in water with an amine component, which is used if necessary; and (B) a method comprising synthesizing a polymer from the polyisocyanate component, the polyol component, and an amine component, which is used if necessary, and feeding the polymer to water to disperse the same therein. The neutralizing component, which is used if necessary, may be added in advance to the water to which the prepolymer or polymer is fed, or may be added to the water after the prepolymer or polymer is fed.

Examples of solvents that are inert to reaction and that have high hydrophilicity, which are used in the preferable production method, include acetone, methyl ethyl ketone, dioxane, tetrahydrofuran, and N-methyl-2-pyrrolidone. Such solvents are typically used in an amount of 3 to 100 mass %, relative to the total amount of the starting materials used for producing a prepolymer.

In the above production methods, the composition ratio is not particularly limited. The composition ratio can be expressed as the molar ratio of isocyanate-reactive groups in the polyol component and the amine component to isocyanate groups in the polyisocyanate component at the time of the reaction. The molar ratio of the isocyanate-reactive groups to the isocyanate groups is preferably in the range of 0.5:1 to 2.0:1. This is because if the amount of unreacted isocyanate groups in the dispersed polyurethane molecules is insufficient, the adhesion and/or strength of the coating film may be reduced when the product is used as a coating composition; whereas if unreacted isocyanate groups are present in excess, the dispersion stability and/or properties of the coating composition may be affected by the isocyanate groups. The molar ratio of isocyanate-reactive groups in the polyol component to isocyanate groups in the polyisocyanate component is preferably in the range of 0.3:1 to 1.0:1, and more preferably 0.5:1 to 0.9:1. Further, the molar ratio of isocyanate-reactive groups in the amine component, which is used if necessary, to isocyanate groups in the polyisocyanate component is preferably in the range of 0.1:1 to 1.0:1, and more preferably 0.2:1 to 0.5:1.

Furthermore, the rate of neutralization by the carboxy-neutralizing component, which is used if necessary, is set to a range that imparts sufficient dispersion stability to the resulting urethane resin emulsion (a1-1(c)). The amount of carboxy-neutralizing component is preferably 0.5 to 2.0 equivalents, and more preferably 0.7 to 1.5 equivalents, per mole of carboxy groups in the carboxy-containing diol.

One or more emulsifiers, such as surfactants, may be used to stabilize the dispersibility of the urethane resin emulsion (a1-1(c)). Although the particle size is not particularly limited, it is preferably 1 μm or less, and more preferably 500 nm or less, because this allows a good dispersion state to be maintained.

Examples of usable emulsifiers include known surfactants that are used for urethane resin emulsions, such as anionic surfactants, nonionic surfactants, cationic surfactants, amphoteric surfactants, polymeric surfactants, and reactive surfactants. Among these surfactants, anionic surfactants, nonionic surfactants, and cationic surfactants are preferable because they are low-cost and can provide good emulsification.

Examples of anionic surfactants include sodium dodecyl sulfate, potassium dodecyl sulfate, ammonium dodecyl sulfate, and like alkylsulfate compounds; sodium dodecyl polyglycol ether sulfate; sodium sulforicinoleate; alkali metal salts of sulfonated paraffin, ammonium salts of sulfonated paraffin, and like alkyl sulfonates; sodium laurate, triethanolamine oleate, triethanolamine abietate, and like fatty acid salts; sodium benzene sulfonate, alkali metal sulfates of alkali phenol hydroxyethylene, and like alkylarylsulfonates; higher alkylnaphthalenesulfonates; naphthalenesulfonic acid-formalin condensates; dialkyl sulfosuccinates; polyoxyethylene alkylsulfates; and polyoxyethylene alkylarylsulfates.

Examples of nonionic surfactants include $C_1$-$C_{18}$ alcohol-ethylene oxide and/or propylene oxide adducts; alkylphenol-ethylene oxide and/or propylene oxide adducts; and alkylene glycol and/or alkylene diamine-ethylene oxide and/or propylene oxide adducts.

Examples of $C_1$-$C_{18}$ alcohols forming the nonionic surfactants include methanol, ethanol, propanol, 2-propanol, butanol, 2-butanol, tertiary butanol, amyl alcohol, isoamyl alcohol, tertiary amyl alcohol, hexanol, octanol, decane alcohol, lauryl alcohol, myristyl alcohol, palmityl alcohol, and stearyl alcohol. Examples of alkylphenols include phenol, methylphenol, 2,4-di-tertiary butylphenol, 2,5-di-tertiary butylphenol, 3,5-di-tertiary butylphenol, 4-(1,3-tetramethylbutyl)phenol, 4-isooctylphenol, 4-nonylphenol, 4-tertiary octylphenol, 4-dodecylphenol, 2-(3,5-dimethylheptyl)phenol, 4-(3,5-dimethylheptyl)phenol, naphthol, bisphenol A, and bisphenol F. Examples of alkylene glycols include ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol, and 1,6-hexanediol. Examples of alkylene diamines include these alkylene glycols in which alcoholic hydroxy groups are substituted with amino groups. Further, the ethylene oxide and propylene oxide adducts may be random or block adducts.

Examples of cationic surfactants include primary to tertiary amine salts, pyridinium salts, alkyl pyridinium salts, alkyl halide quaternary ammonium salts, and like quaternary ammonium salts.

Although these emulsifiers may be used in any amount with no particular limitation, the mass ratio of the emulsifier to the urethane resin is preferably in the range of 0.01:1 to 0.3:1, and more preferably 0.05:1 to 0.2:1. This is because when the emulsifier/urethane resin ratio is less than 0.05, the dispersibility may not be sufficient, whereas when the emulsifier/urethane resin ratio exceeds 0.3, properties such as water resistance, strength, and elongation at break of the coating film obtained from the aqueous coating composition may be reduced.

Further, the solids content of the urethane resin emulsion (a1-1(c)) may be selected arbitrarily with no particular limitation. The solids content is preferably 10 to 50 mass % because dispersibility and coating performance are good in that range, with 20 to 40 mass % being more preferable.

The weight average molecular weight of the urethane resin dispersed in the urethane resin emulsion (a1-1(c)) is preferably 2,000 to 50,000, and more preferably 3,000 to 40,000, in view of the smoothness of the resulting coating film. Further, the hydroxy value may also be selected arbitrarily with no particular limitation. The hydroxy value is expressed in consumption (mg) of KOH per gram of resin and is typically 0 to 100 mg KOH/g.

In the present specification, the number average molecular weight and the weight average molecular weight are converted values obtained by gel permeation chromatography using tetrahydrofuran as a solvent, and using polystyrene having a known molecular weight as a reference substance.

The amount of urethane resin emulsion (a1-1(c)) in the binder component (a1) is preferably 10 mass % or more, more preferably 15 to 60 mass %, and even more preferably 15 to 55 mass %, relative to the solids content of the binder component (a1), in view of the smoothness and distinctness of image of the resulting multilayer coating film.

Examples of other film-forming resins that can be used as the binder component (a1) together with the urethane resin emulsion (a1-1(c)) include acrylic resins, polyester resins, alkyd resins, and polyurethane resins other than the urethane resin emulsion (a1-1(c)). These preferably have crosslinkable functional groups, such as hydroxy groups, carboxy groups, and epoxy groups. When the film-forming resin has a hydroxy group, its hydroxy value is preferably about 1 to 200 mg KOH/g, more preferably about 2 to 180 mg KOH/g, and even more preferably about 5 to 170 mg KOH/g. Moreover, when the film-forming resin has an acid group such as a carboxyl group, its acid value is preferably about 5 to 150 mg KOH/g, more preferably about 10 to 100 mg KOH/g, and even more preferably about 15 to 80 mg KOH/g.

In addition to the film-forming resin, a crosslinking agent can also be used as the binder component (a1). When a crosslinking agent is used as a part of the binder component (a1), the film-forming resin may be generally a resin (base resin) that has a crosslinkable functional group, such as hydroxy, carboxy, or epoxy group, and that can react with the crosslinking agent to thereby form a crosslinked coating.

It is particularly preferable that the binder component (a1) contains a hydroxy-containing acrylic resin (a1-2(c)) and/or a hydroxy-containing polyester resin (a1-3(c)). It is more preferable to use the hydroxy-containing acrylic resin (a1-2(c)) and the hydroxy-containing polyester resin (a1-3(c)) in combination, in view of improving the smoothness and distinctness of image of the coating film. The proportion of the hydroxy-containing acrylic resin (a1-2(c)) to the hydroxy-containing polyester resin (a1-3(c)), when used in combination, is preferably in the range of about 10:90 to 90:10 by mass, and particularly preferably 20:80 to 80:20 by mass, relative to the total amount of the hydroxy-containing acrylic resin (a1-2(c)) and the hydroxy-containing polyester resin (a1-3(c)).

The type, amount, etc., of hydroxy-containing acrylic resin (a1-1(a)) described in the first embodiment can be used for the hydroxy-containing acrylic resin (a1-2(c)).

The type, production method, amount, etc., of hydroxy-containing acrylic resin (a1-1(a)) described in the first embodiment can be used for the hydroxy-containing polyester resin (a1-3(c)).

The type, amount, etc., of crosslinking agent described in the first embodiment can also be used in this embodiment.

Pigment (a2)

The type, amount, etc., of pigment (a2) described in the first embodiment can also be used in this embodiment.

If necessary, the aqueous colored coating composition (A) may contain additives for coating compositions, such as thickeners, curing catalysts, UV absorbers, light stabilizers, antifoaming agents, plasticizers, surface control agents, and antisettling agents. As for the type, amount, etc., of such additives for coating compositions, those described in the first embodiment can be used. The conditions of the preparation method and coating method of the aqueous colored coating composition (A) described in the first embodiment can also be used in this embodiment, except that the binder component (a1) contains the urethane resin emulsion (a1-1(c)) and optionally the hydroxy-containing acrylic resin (a1-2(c)) and/or hydroxy-containing polyester resin (a1-3(c)).

Steps (2) to (4)

As for the coating compositions, coating method, heating method, etc., used in steps (2) to (4), the conditions described in the first embodiment can also be used in this embodiment.

In the method for forming a multilayer coating film according to the present invention, even when the preheating process after application of the aqueous colored coating composition (A) is omitted, and the effect pigment-containing aqueous coating composition (B) is applied to a colored coating film containing a large amount of solvent, a multilayer coating film having excellent smoothness, distinctness of image, and water resistance can be formed. This is presumably because the use of the aqueous colored coating composition (A) comprising the above specific urethane resin emulsion inhibits swelling of the resulting colored coating film due to water and organic solvents. Moreover, the application of the effect pigment-containing aqueous coating composition (B) comprising a large amount of effect pigment to a thin film thickness results in the formation of a thin film, in which the resin component and effect pigment are present at a high density, on the colored coating film, making it difficult for the solvent in the colored coating film to move into the effect coating film. Furthermore, it is difficult for the water in the colored coating film to move into the effect coating film, because the effect pigment-containing aqueous coating composition (B) comprises a relatively large amount of hydrophobic solvent (b3). For these reasons, the formation of a mixed layer from the aqueous colored coating composition (A) and the effect pigment-containing aqueous coating composition (B) is prevented.

(IV) Embodiment in which the Aqueous Colored Coating Composition (A) Comprises a Specific Hydroxy-Containing Acrylic Resin Emulsion and a Specific Block Isocyanate Group-Containing Urethane Resin Emulsion In another preferable embodiment, the present invention provides a method for forming a multilayer coating film according to the following Items 1D to 5D:

Item 1D. A method for forming a multilayer coating film comprising the following steps (1) to (4):

(1) applying an aqueous colored coating composition (A) to a substrate to form an uncured colored coating film, the aqueous colored coating composition (A) comprising a binder component (a1) and a pigment (a2), the binder component (a1) comprising, as at least a part thereof, a hydroxy-containing acrylic resin emulsion (a1-1(d)) having an acid value of 25 mg KOH/g or less, and a blocked isocyanate-containing urethane resin emulsion (a1-2(d)) produced using, as starting materials, a polyisocyanate component that contains alicyclic diisocyanate and a polyol component that contains 50 mass % or more polycarbonate diol;

(2) applying an effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), to the uncured colored coating film formed in step (1), without preheating the uncured colored coating film, to form an uncured effect coating film having a film thickness of 7 to 13 μm when cured;

(3) applying a clear coating composition (C) to the uncured effect coating film formed in step (2) to form an uncured clear coating film; and (4) heating the uncured colored coating film, the uncured effect coating film, and the uncured clear coating film formed respectively in steps (1) to (3) to simultaneously cure these three coating films.

Item 2D. The method for forming a multilayer coating film according to Item 1D, wherein the hydroxy-containing acrylic resin emulsion (a1-1(d)) is a core-shell-type emulsion having a core portion that is a copolymer (I) comprising, as copolymer components, 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule, and a shell portion that is a copolymer (II) comprising, as copolymer components, 1 to 40 mass % of a hydroxy-containing polymerizable unsaturated monomer, 1 to 30 mass % of a carboxy-containing polymerizable unsaturated monomer, and 30 to 98 mass % of other polymerizable unsaturated monomers.

Item 3D. The method for forming a multilayer coating film according to Item 1D or 2D, wherein the blocked isocyanate-containing urethane resin emulsion (a1-2(d)) has a weight average molecular weight of 2,000 to 50,000.

Item 4D. The method for forming a multilayer coating film according to any one of Items 1D to 3D, wherein the polycarbonate diol is obtained by reacting a diol component and a carbonylating agent, the diol component comprises a diol having 6 or more carbon atoms in an amount of 90 mass % or more relative to the total amount of the diol component, and the diol having 6 or more carbon atoms comprises a cycloalkylene group-containing alicyclic diol having 6 or more carbon atoms.

Item 5D. The method for forming a multilayer coating film according to any one of Items 1D to 4D, wherein the pigment (a2) comprises titanium dioxide and/or barium sulfate, and the total content of the titanium dioxide and barium sulfate is 50 to 150 parts by mass relative to 100 parts by mass of the solids content of the binder component (a1).

The substrates mentioned in the "Substrate" item in the first embodiment described above can also be used in this embodiment.

Aqueous Colored Coating Composition (A)

The aqueous colored coating composition (A) to be applied to a substrate may be, for example, a coating composition comprising a binder component (a1), a pigment (a2), and optionally additives for coating compositions, etc.

Binder Component (a1)

In this embodiment, the binder component (a1) comprises, as at least a part thereof, a hydroxy-containing acrylic resin emulsion (a1-1(d)) having an acid value of 25 mgKOH/g or less and a blocked isocyanate-containing urethane resin emulsion (a1-2(d)) prepared using, as starting materials, a polyisocyanate component and a polyol component. Particularly in this embodiment, the polyisocyanate component contains alicyclic diisocyanate, and the polyol component contains polycarbonate diol in an amount of 50 mass % relative to the total amount of the polyol component.

As the binder component (a1), known film-forming resins that have been used as binder components of coating compositions can also be used, if necessary. Non-crosslinked type resin and crosslinked type resin both can be used.

Hydroxy-Containing Acrylic Resin Emulsion (a1-1(d))

The hydroxy-containing acrylic resin emulsion (a1-1(d)) can be produced by copolymerizing a hydroxy-containing polymerizable unsaturated monomer and another polymerizable unsaturated monomer copolymerizable with the hydroxy-containing polymerizable unsaturated monomer, using a known method, such as an emulsion polymerization method in water.

As the hydroxy-containing polymerizable unsaturated monomer and the other polymerizable unsaturated monomer copolymerizable with the hydroxy-containing polymerizable unsaturated monomer, those described in the first embodiment regarding the hydroxy-containing acrylic resin (a1-1(a)) can be used.

The amount of hydroxy-containing polymerizable unsaturated monomer used in the production of the hydroxy-containing acrylic resin emulsion (a1-1(d)) is preferably about 0.1 to 50 mass %, more preferably about 0.5 to 40 mass %, and even more preferably about 1 to 30 mass %, relative to the total amount of the monomer components.

The hydroxy-containing acrylic resin emulsion (a1-1(d)) preferably has an acid value of 25 mg KOH/g or less, more preferably about 0.1 to 20 mg KOH/g, and even more preferably about 1 to 15 mg KOH/g, in view of the storage stability of the coating composition, the water resistance of the resulting coating film, and the prevention of the formation of a mixed layer from the aqueous colored coating composition (A) and the effect pigment-containing aqueous coating composition (B).

Moreover, the hydroxy-containing acrylic resin emulsion (a1-1(d)) preferably has a hydroxy value of about 1 to 200 mg KOH/g, more preferably about 3 to 100 mg KOH/g, and even more preferably about 5 to 50 mg KOH/g, in view of the chipping resistance and water resistance of the resulting coating film, etc.

The amount of hydroxy-containing acrylic resin emulsion (a1-1(d)) in the aqueous colored coating composition (A) is preferably about 2 to 70 mass %, more preferably about 10 to 65 mass %, and even more preferably about 20 to 60 mass %, relative to the solids content of the binder component (a1).

The hydroxy-containing acrylic resin emulsion (a1-1(d)) is preferably a core/shell type emulsion in view of smoothness and water resistance.

A suitable example of the core-shell-type hydroxy-containing acrylic resin emulsion is a core-shell-type hydroxy-containing acrylic resin emulsion (a1-1'(d)) having a core portion that is a copolymer (I) comprising, as copolymer components, a polymerizable unsaturated monomer having two or more polymerizable unsaturated groups per molecule and a polymerizable unsaturated monomer having one polymerizable unsaturated group per molecule, and a shell portion that is a copolymer (II) comprising, as copolymer components, a hydroxy-containing polymerizable unsaturated monomer, a carboxy-containing polymerizable unsaturated monomer, and other polymerizable unsaturated monomers.

Examples of a polymerizable unsaturated monomer that has two or more polymerizable unsaturated groups per molecule, and that can be used as a monomer for the core copolymer (I) include allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-tris-hydroxymethylethane tri(meth)acrylate, 1,1,1-tris-hydroxymethylpropane tri(meth)acrylate, triallyl isocyanurate, diallyl terephthalate, divinylbenzene, etc. Such monomers can be used singly or in a combination of two or more.

The polymerizable unsaturated monomer having two or more polymerizable unsaturated groups per molecule functions to provide a crosslinked structure to the core copolymer (I). Although the amount of polymerizable unsaturated monomer having two or more polymerizable unsaturated groups per molecule can be suitably determined according to the desired degree of crosslinking of the core copolymer (I), the amount of polymerizable unsaturated monomer is generally preferably in a range of about 0.1 to 30 mass %, more preferably about 0.5 to 10 mass %, and even more preferably about 1 to 7 mass %, relative to the total mass of the monomers constituting the core copolymer (I).

To suppress metallic mottling of the resulting coating film, the polymerizable unsaturated monomer having two or more polymerizable unsaturated groups per molecule is preferably an amide-containing monomer, such as methylene bis(meth) acrylamide, and ethylene bis(meth)acrylamide. The amount of amide-containing monomer, when used, is preferably about 0.1 to 25 mass %, more preferably about 0.5 to 8 mass %, and even more preferably about 1 to 4 mass %, relative to the total mass of the monomers constituting the core copolymer (I).

The polymerizable unsaturated monomer having one polymerizable unsaturated group per molecule, which is used as a monomer for the core copolymer (I), is a polymerizable unsaturated monomer that can be copolymerized with the polymerizable unsaturated monomer having two or more polymerizable unsaturated groups per molecule.

Specific examples of the polymerizable unsaturated monomer having one polymerizable unsaturated group per molecule include the monomers (i) to (xi) and (xiii) to (xvii), which are polymerizable unsaturated monomers other than the polymerizable unsaturated monomers having two or more polymerizable unsaturated groups per molecule, among the polymerizable unsaturated monomers listed as other polymerizable unsaturated monomers that can be copolymerized with hydroxy-containing polymerizable unsaturated monomers in the explanation of the hydroxy-containing acrylic resin emulsion (a1-1(a)). Such monomers can be used singly or in a combination of two or more according to the required properties of the core-shell-type hydroxy-containing acrylic resin emulsion (a1-1'(d)).

The shell copolymer (II) comprises a hydroxy-containing unsaturated polymerizable monomer, an acid (e.g., carboxy)-containing polymerizable unsaturated monomer, and other polymerizable unsaturated monomers, as copolymer components.

The hydroxy-containing polymerizable unsaturated monomer used as a monomer for the shell copolymer (II) introduces a hydroxy group that can be crosslinked with a curing agent (B) into a water-dispersible acrylic resin, and thereby functions to enhance the water resistance of the coating film and to enhance the stability of the water-dispersible acrylic resin in an aqueous medium. Examples of the hydroxy-containing polymerizable unsaturated monomer include monoesterified products of (meth)acrylic acid with a dihydric alcohol containing 2 to 8 carbon atoms, such as 2-hydroxyethyl(meth)acrylate, 2-hydroxypropyl(meth)acrylate, 3-hydroxypropyl(meth)acrylate, and 4-hydroxybutyl(meth)acrylate; ε-caprolactone-modified products of the monoesterified products of (meth)acrylic acid with a dihydric alcohol containing 2 to 8 carbon atoms; N-hydroxymethyl(meth)acrylamide; allyl alcohol; (meth)acrylate having a polyoxyethylene chain with a terminal hydroxy group; etc. Such monomers can be used singly or in a combination of two or more. Preferable examples of the hydroxy-containing polymerizable unsaturated monomer include 2-hydroxyethyl(meth)acrylate, 2-hydroxypropyl(meth)acrylate, 3-hydroxypropyl(meth)acrylate, 4-hydroxybutyl(meth)acrylate, etc.

To provide a core-shell-type hydroxy-containing acrylic resin emulsion (a1-1'(d)) with excellent stability in an aqueous medium and provide a coating film with excellent water resistance, the amount of hydroxy-containing polymerizable unsaturated monomer is preferably about 1 to 40 mass %, more preferably about 4 to 25 mass %, and even more preferably about 7 to 19 mass %, relative to the total mass of the monomers constituting the shell copolymer (II).

Specific examples of the carboxy-containing polymerizable unsaturated monomer used as a monomer for the shell copolymer (II) are the same as mentioned above as examples of a monomer for the core copolymer (I). More specifically, among the polymerizable unsaturated monomers exemplified as other polymerizable unsaturated monomers copolymerizable with the hydroxy-containing polymerizable unsaturated monomer in the explanation of the hydroxy-containing acrylic resin emulsion (a1-1(a)), the carboxyl group polymerizable unsaturated monomer (x) can be used. Acrylic acid and/or methacrylic acid are particularly preferable as the carboxy-containing polymerizable unsaturated monomer. By using the carboxy-containing polymerizable unsaturated monomer in the shell, the resulting core-shell-type hydroxy-containing acrylic resin emulsion (a1-1'(d)) becomes stable in an aqueous medium.

To provide a core-shell-type hydroxy-containing acrylic resin emulsion (a1-1'(d)) with excellent stability in an aqueous medium and provide a coating film with excellent water resistance, the amount of carboxy-containing polymerizable unsaturated monomer, when used, is preferably about 1 to 30 mass %, more preferably about 5 to 25 mass %, and even more preferably about 7 to 19 mass %, relative to the total mass of the monomers constituting the shell copolymer (II).

The other polymerizable unsaturated monomers used as a monomer for the shell copolymer (II) are polymerizable unsaturated monomers other than hydroxy-containing polymerizable unsaturated monomers and carboxy-containing polymerizable unsaturated monomers. Examples of such monomers include alkyl or cycloalkyl(meth)acrylates, such as methyl(meth)acrylate, ethyl(meth)acrylate, n-propyl (meth)acrylate, iso-propyl(meth)acrylate, n-butyl(meth) acrylate, iso-butyl(meth)acrylate, and tert-butyl(meth)acrylate; alkyl or cycloalkyl(meth)acrylates, such as n-hexyl (meth)acrylate, octyl(meth)acrylate, 2-ethylhexyl(meth) acrylate, nonyl(meth)acrylate, tridecyl(meth)acrylate, lauryl (meth)acrylate, stearyl(meth)acrylate, isostearyl(meth) acrylate, cyclohexyl(meth)acrylate, methylcyclohexyl(meth) acrylate, tert-butylcyclohexyl(meth)acrylate, cyclododecyl (meth)acrylate, and tricyclodecanyl(meth)acrylate; isobornyl-containing polymerizable unsaturated compounds, such as isobornyl(meth)acrylate; adamantyl-containing polymerizable unsaturated compounds, such as adamantyl(meth) acrylate; and aromatic ring-containing polymerizable unsaturated monomers, such as benzyl(meth)acrylate, styrene, α-methylstyrene, and vinyltoluene. Such monomers can be used singly or in a combination of two or more. It is particularly preferable that at least one of the other polymerizable unsaturated monomers be a hydrophobic polymerizable unsaturated monomer.

In this specification, the hydrophobic polymerizable unsaturated monomer is a polymerizable unsaturated monomer having a linear, branched or cyclic saturated or unsaturated hydrocarbon group containing 6 or more carbon atoms, and preferably 6 to 18 carbon atoms, excluding monomers having a hydrophilic group, such as hydroxy-containing polymerizable unsaturated monomers. Examples of such monomers include alkyl or cycloalkyl(meth)acrylates, such as n-hexyl (meth)acrylate, octyl(meth)acrylate, 2-ethylhexyl(meth) acrylate, nonyl(meth)acrylate, tridecyl(meth)acrylate, lauryl (meth)acrylate, stearyl(meth)acrylate, isostearyl(meth) acrylate, cyclohexyl(meth)acrylate, methylcyclohexyl(meth) acrylate, tert-butylcyclohexyl(meth)acrylate, cyclododecyl (meth)acrylate, and tricyclodecanyl(meth)acrylate; isobornyl-containing polymerizable unsaturated compounds, such as isobornyl(meth)acrylate; adamantyl-containing polymerizable unsaturated compounds, such as adamantyl(meth) acrylate; and aromatic ring-containing polymerizable unsaturated monomers, such as benzyl(meth)acrylate, styrene, α-methylstyrene, and vinyltoluene. Such monomers can be used singly or in a combination of two or more.

To enhance the distinctness of image of the resulting coating film, the hydrophobic polymerizable unsaturated monomer is preferably a polymerizable unsaturated monomer having an alkyl group containing 6 to 18 carbon atoms and/or a polymerizable unsaturated monomer having an aromatic ring. Styrene is particularly preferable.

To provide a core-shell-type hydroxy-containing acrylic resin emulsion (a1-1'(d)) with excellent stability in an aqueous medium and provide a coating film with excellent water resistance, the amount of hydrophobic polymerizable unsaturated monomer, when used as a monomer for the shell copolymer (II), is preferably about 5 to 50 mass %, more preferably about 7 to 40 mass %, and even more preferably about 9 to 30 mass %, relative to the total mass of the monomers constituting the shell copolymer (II).

To enhance the effect (luster) of the resulting coating film, it is preferable not to use polymerizable unsaturated monomers having two or more polymerizable unsaturated groups per molecule as the other polymerizable unsaturated monomers for constituting the shell copolymer (II), thus forming an uncrosslinked copolymer (II).

To enhance the distinctness of image and effect (luster) of the resulting coating film, the ratio of the copolymer (I) to the copolymer (II) in the core-shell-type hydroxy-containing acrylic resin emulsion (a1-1'(d)) is preferably in the range of about 5/95 to 95/5, more preferably about 10/90 to 90/10, still more preferably about 50/50 to 85/15, and particularly preferably about 65/35 to 80/20, on a solids basis.

In view of the storage stability of the coating composition, the water resistance of the resulting coating film, and the excellent prevention of the formation of a mixed layer from the colored coating film of the aqueous colored coating composition (A) and the effect coating film of the effect pigment-containing aqueous coating composition (B), the core-shell-type hydroxy-containing acrylic resin emulsion (a1-1'(d)) preferably has an acid value of about 25 mg KOH/g or less, more preferably about 0.1 to 20 mg KOH/g, and even more preferably about 1 to 15 mg KOH/g.

In view of the excellent chipping resistance, water resistance, etc., of the resulting coating film, the core-shell-type hydroxy-containing acrylic resin emulsion (a1-1'(d)) preferably has a hydroxy value of about 1 to 200 mg KOH/g, more preferably about 3 to 100 mg KOH/g, and even more preferably about 5 to 50 mg KOH/g.

The amount of core-shell-type hydroxy-containing acrylic resin emulsion (a1-1'(d)) in the aqueous colored coating composition (A) is preferably about 2 to 70 mass %, more preferably about 10 to 65 mass %, and even more preferably about 20 to 60 mass %, relative to the solids content of the binder component (a1).

The core-shell-type hydroxy-containing acrylic resin emulsion (a1-1'(d)) can be prepared, for example, by subjecting to emulsion polymerization a monomer mixture of about 0.1 to 30 mass % of a polymerizable unsaturated monomer having two or more polymerizable unsaturated groups per molecule, and about 70 to 99.9 mass % of a polymerizable unsaturated monomer having one polymerizable unsaturated group per molecule to form an emulsion of a core copolymer (I); adding to this emulsion a monomer mixture of about 1 to 40 mass % of a hydroxy-containing polymerizable unsaturated monomer, about 1 to 30 mass % of a carboxy-containing hydrophobic polymerizable unsaturated monomer, about 5 to 50 mass % of a hydrophobic polymerizable unsaturated monomer, and about 10 to 93 mass % of other polymerizable unsaturated monomers; and further performing emulsion polymerization to form a shell copolymer (II).

The emulsion polymerization for preparing an emulsion of the core copolymer (I) can be carried out according to known methods. For example, the emulsion can be prepared by subjecting the monomer mixture to emulsion polymerization using a polymerization initiator in the presence of a surfactant.

For the above surfactant, anionic surfactants and nonionic surfactants are suitable. Examples of anionic surfactants include sodium salts and ammonium salts of alkylsulfonic acids, alkylbenzenesulfonic acids, alkylphosphoric acids, etc. Examples of nonionic surfactants include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.

Other examples of usable surfactants include polyoxyalkylene-containing anionic surfactants that have an anionic group and a polyoxyalkylene group, such as a polyoxyethylene group or a polyoxypropylene group, per molecule; and reactive anionic surfactants that have an anionic group and a radically polymerizable unsaturated group per molecule. Among these, reactive anionic surfactants are preferable.

Examples of reactive anionic surfactants include sodium salts of sulfonic acid compounds having a radically polymerizable unsaturated group, such as allyl, methallyl, (meth) acryloyl, propenyl, or butenyl; ammonium salts of such sulfonic acid compounds, etc. Among these, ammonium salts of sulfonic acid compounds having a radically polymerizable unsaturated group are preferable in view of the excellent water resistance of the resulting coating film. Examples of commercially available ammonium salts of such sulfonic acid compounds include LATEMUL S-180A (product name, produced by Kao Corporation).

Among the ammonium salts of sulfonic acid compounds having a radically polymerizable unsaturated group, ammonium salts of sulfonic acid compounds having a radically polymerizable unsaturated group and a polyoxyalkylene group are particularly preferable. Commercially available ammonium salts of sulfonic acid compounds having a radically polymerizable unsaturated group and a polyoxyalkylene group include Aqualon KH-10 (product name, produced by Dai-Ichi Kogyo Seiyaku Co., Ltd.), LATEMUL PD-104 (product name, produced by Kao Corporation), Adekaria Soap SR-1025 (product name, produced by ADEKA Co., Ltd.), etc. The amount of surfactant is preferably about 0.1 to 15 mass %, more preferably about 0.5 to 10 mass %, and even more preferably about 1 to 5 mass %, relative to the total mass of the monomers used.

Examples of polymerization initiators include organic peroxides such as benzoyl peroxide, octanoyl peroxide, lauroyl peroxide, stearoyl peroxide, cumene hydroperoxide, tert-butyl peroxide, di-tert-amyl peroxide, tert-butyl peroxi-2-ethylhexanoate, tert-butyl peroxylaurate, tert-butyl peroxyisopropylcarbonate, tert-butyl peroxyacetate, and diisopropylbenzene hydroperoxide; azo compounds such as azobisisobutyronitrile, azobis(2,4-dimethylvaleronitrile), azobis(2-methylpropionenitrile), azobis(2-methylbutyronitrile), 4,4'-azobis(4-cyanobutanoic acid), dimethyl azobis(2-methyl propionate), azobis[2-methyl-N-(2-hydroxyethyl)-propionamide], and azobis[2-methyl-N-[2-(1-hydroxy butyl)]-propionamide]; persulfates such as potassium persulfate, ammonium persulfate, and sodium persulfate; etc. Such polymerization initiators can be used singly or in a combination of two or more. Redox initiators prepared by combining a polymerization initiator as mentioned above with a reducing agent such as sugar, sodium formaldehyde sulfoxylate, iron complex, etc., may also be used.

Generally, the amount of polymerization initiator is preferably about 0.1 to 5 mass %, and more preferably about 0.2 to 3 mass, relative to the total mass of all of the monomers used. The method of adding the polymerization initiator is not particularly limited, and can be suitably selected according to the type and amount of polymerization initiator used. For example, the polymerization initiator may be incorporated into a monomer mixture or an aqueous medium beforehand, or may be added dropwise or all at once at the time of polymerization.

The monomer mixture for forming the shell copolymer (II) may optionally contain other components, such as polymerization initiators as mentioned above, chain transfer agents, reducing agents, and surfactants. The monomer mixture is preferably added dropwise as a monomer emulsion obtained by dispersing the monomer mixture into an aqueous medium, although it may be added dropwise as is. In this case, the particle size of the monomer emulsion is not particularly limited.

The method for polymerizing the monomer mixture for forming the shell copolymer (II) comprises, for example, adding the monomer mixture or emulsion thereof dropwise to the emulsion of the core copolymer (I) all at once or gradually, and heating the mixture to a suitable temperature while stirring. The core-shell-type hydroxy-containing acrylic resin emulsion (a1-1'(d)) thus obtained has a multiple-layer structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, a carboxy-containing hydrophobic polymerizable unsaturated monomer, a hydrophobic polymerizable unsaturated monomer, and other polymerizable unsaturated monomers.

The core-shell-type hydroxy-containing acrylic resin emulsion (a1-1'(d)) thus obtained usually has an average particle size of about 10 to 1,000 nm, and preferably about 20 to 500 nm.

In this specification, the average particle size of the core-shell-type hydroxy-containing acrylic resin emulsion (a1-1' (d)) refers to a value obtained by measurement at 20° C. using a submicron particle size distribution analyzer after dilution with deionized water according to a usual method. For example, a COULTER N4 (product name, produced by Beckman Coulter, Inc.) may be used as the submicron particle size distribution analyzer.

To improve the mechanical stability of the particles of the core-shell-type hydroxy-containing acrylic resin emulsion (a1-1'(d)), acid groups such as carboxy groups of the water-dispersible acrylic resin are preferably neutralized with a neutralizing agent. The neutralizing agent is not particularly limited, as long as it can neutralize acid groups. Examples of such neutralizing agents include sodium hydroxide, potassium hydroxide, trimethylamine, 2-(dimethylamino)ethanol, 2-amino-2-methyl-1-propanol, triethylamine, aqueous ammonia, etc. Such a neutralizing agent is preferably used in an amount such that the pH of the aqueous dispersion of the water-dispersible acrylic resin after neutralization is about 6.5 to about 9.0.

Blocked Isocyanate-Containing Urethane Resin Emulsion (a1-2(d))

The blocked isocyanate-containing urethane resin emulsion (a1-2(d)) has the following features: the emulsion is prepared by reacting a polyisocyanate component and a polyol component; the polyisocyanate component contains an alicyclic diisocyanate; and the polyol component contains a polycarbonate diol in an amount of 50 mass % or more relative to the total amount of the polyol component.

As for the type, amount, etc., of polyisocyanate component and polyol component, those described in Embodiment (III) as starting materials for the urethane resin emulsion (a1-1(c)) can be used.

The blocked isocyanate group of the blocked isocyanate-containing urethane resin emulsion (a1-2(d)) can be introduced by, for example, reacting an excessive amount of polyisocyanate component with a polyol component and an amine component, which is used if necessary, to form a terminal isocyanate-containing urethane polymer, and reacting the terminal isocyanate-containing urethane polymer with a blocking agent; or by reacting an excessive amount of polyisocyanate component with a blocking agent, and reacting the result with a diol component.

In the above method, the composition ratio is not particularly limited. The composition ratio can be expressed by the molar ratio of the functional groups in the polyol component and amine component reactive with isocyanate (referred to as isocyanate-reactive groups) to isocyanate groups in the polyisocyanate component at the time of the reaction. The molar ratio of the isocyanate-reactive groups to the isocyanate groups is preferably in the range of 0.3:1 to 1.0:1, and more preferably 0.5:1 to 0.9:1. This is because if the amount of unreacted isocyanate groups in the dispersed polyurethane molecules is insufficient, the adhesion and/or strength of the coating film may be reduced when the product is used as a coating composition; whereas if unreacted isocyanate groups are present in excess, the dispersion stability and/or properties of the coating composition may be affected by the isocyanate groups.

The amount of polyisocyanate component in the blocked isocyanate-containing urethane resin emulsion (a1-2(d)) is preferably 5 to 50 mass %, and more preferably 10 to 35 mass %, relative to the total amount of the polyisocyanate component and polyol component.

Examples of the blocking agent in the blocked isocyanate-containing urethane resin emulsion (a1-2(d)) include aliphatic polyisocyanates, alicyclic polyisocyanates, aliphatic-aromatic polyisocyanates, aromatic polyisocyantates, and derivatives thereof blocked with blocking agents.

Examples of the derivatives include isocyanurates, biurets, and adducts (e.g., TMP (trimethylolpropane) adducts).

A blocking agent is used for blocking free isocyanate groups. When a blocked polyisocyanate compound is heated at, for example, a temperature of 100° C. or higher, and preferably 130° C. or higher, isocyanate groups are regenerated and can readily react with hydroxy groups. Examples of such blocking agents include phenol, cresol, xylenol, nitrophenol, ethylphenol, hydroxydiphenyl, butylphenol, isopropylphenol, nonylphenol, octylphenol, methyl hydroxybenzoate, and like phenol compounds; ε-caprolactam, δ-valerolactam, γ-butyrolactam, β-propiolactam, and like lactam compounds; methanol, ethanol, propyl alcohol, butyl alcohol, amyl alcohol, lauryl alcohol, and like aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, and like ether compounds; benzyl alcohol; glycolic acid; methyl glycolate, ethyl glycolate, butyl glycolate, and like glycolates; lactic acid, methyl lactate, ethyl lactate, butyl lactate, and like lactates; methylol urea, methylol melamine, diacetone alcohol, 2-hydroxyethyl acrylate, 2-hydroxyethyl methacrylate, and like alcohol compounds; formamide oxime, acetamide oxime, acetoxime, methyl ethyl ketoxime, diacetyl monoxime, benzophenone oxime, cyclohexane oxime, and like oxime compounds; dimethyl malonate, diethyl malonate, ethyl acetoacetate, methyl acetoacetate, acetylacetone, and like active methylene compounds; butyl mercaptan, tert-butyl mercaptan, hexyl mercaptan, tert-dodecyl mercaptan, 2-mercaptobenzothiazole, thiophenol, methylthiophenol, ethylthiophenol, and like mercaptan compounds; acetanilide, acetanisidide, acetotoluide, acrylamide, methacrylamide, acetamide, stearamide, benzamide, and like acid amide compounds; succinimide, phthalimide, maleimide, and like imide compounds; diphenylamine, phenylnaphthylamine, xylidine, N-phenylxylidine, carbazole, aniline, naphthylamine, butylamine, dibutylamine, butylphenylamine, and like amine compounds; imidazole, 2-ethylimidazole, and like imidazole compounds; 3,5-dimethylpyrazole and like pyrazole compounds; urea, thiourea, ethylene urea, ethylenethiourea, diphenylurea, and like urea compounds; phenyl N-phenylcarbamate and like carbamate compounds; ethyleneimine, propyleneimine, and like imine compounds; and sodium bisulfite, potassium bisulfite, and like sulfite compounds.

Among these, oxime-, lactam-, and pyrazole-based blocking agents can be suitably used. Methylethylketoxime and pyrazole compounds can be particularly suitably used because they can be stored at room temperature, and baking at a relatively low temperature (130° C.) is possible.

A hydroxy carboxylic acid having one or more hydroxy groups and one or more carboxy groups per molecule may be used as a part of the blocking agent. Examples of the hydroxy carboxylic acid include hydroxy pivalic acid and dimethylol propionic acid.

Further, a polyethylene glycol having a hydroxy group at one end and a methoxy group at the other end may be used as a part of the blocking agent to introduce a nonionic hydrophilic group and thereby impart water dispersibility.

The amount of blocking agent is generally 1 equivalent or more and less than 2 equivalents, and preferably 1.05 to 1.5 equivalents, per mole of the isocyanate groups in the terminal isocyanate group-containing urethane polymer.

It is preferable to previously add a solvent as a viscosity-reducing agent because the viscosity increases during the reaction of isocyanate groups with the blocking agent. A solvent is added before or after the formation reaction of the terminal isocyanate group-containing urethane polymer.

Examples of the solvent that can be used as a viscosity-reducing agent include aromatic hydrocarbon solvents, ester solvents, ether solvents, ketone solvents, and mixtures of two or more of these solvents; however, solvents having a flash point of 70° C. or more are preferable in terms of safety and hygiene.

To stabilize the dispersibility of the blocked isocyanate-containing urethane resin emulsion (a1-2(d)), one or more emulsifiers, such as surfactants, may be used.

As for the type and amount of emulsifier, the particle size of the emulsion, etc., the conditions described in Embodiment (III) regarding the urethane resin emulsion (a1-1(c)) can be used.

The solids content of the blocked isocyanate-containing urethane resin emulsion (a1-2(d)) may be selected arbitrarily with no particular limitation. The solids content is preferably 10 to 50 mass % because dispersibility and coating performance are good in this range, with 20 to 40 mass % being more preferable.

The weight average molecular weight of the blocked isocyanate-containing urethane resin emulsion (a1-2(d)) is 2,000 to 50,000, preferably 3,000 to 40,000, and more preferably 5,000 to 30,000, in view of the chipping resistance of the resulting coating film and the paint-removability of spray guns (clean ability). Further, the hydroxy value may be selected arbitrarily with no particular limitation, and is generally 0 to 100 mg KOH/g. Moreover, the acid value is preferably 10 to 40 mg KOH/g, and more preferably 15 to 30 mg KOH/g.

The hydroxy value and acid value are each expressed in consumption (mg) of KOH per gram of resin.

The blocked isocyanate-containing urethane resin emulsion (a1-2(d)) has a comparatively lower molecular weight than general urethane resin emulsions, and therefore offers excellent paint-removability of spray guns, etc., compared with general urethane resin emulsions.

The amount of blocked isocyanate-containing urethane resin emulsion (a1-2(d)) in the binder component (a1) is preferably 10 to 98 mass %, more preferably 15 to 60 mass %, and even more preferably 15 to 55 mass %, relative to the solids content of the binder component (a1) in view of the smoothness and distinctness of image of the resulting multilayer coating film.

Other Film-Forming Resins

Examples of other film-forming resins that can be used as the binder component (a1) together with the hydroxy-containing acrylic resin emulsion (a1-1(d)) and the blocked isocyanate-containing urethane resin emulsion (a1-2(d)) include polyester resins, alkyd resins, and polyurethane resins other than the blocked isocyanate-containing urethane resin emulsion (a1-2(d)). These preferably have crosslinkable functional groups, such as hydroxy groups, carboxy groups, and epoxy groups. When the film-forming resin has a hydroxy group, its hydroxy value is preferably about 1 to 200 mg KOH/g, more preferably about 2 to 180 mg KOH/g, and even more preferably about 5 to 170 mg KOH/g. Moreover, when the film-forming resin has an acid group such as a carboxyl group, its acid value is preferably about 5 to 150 mg KOH/g, more preferably about 10 to 100 mg KOH/g, and even more preferably about 15 to 80 mg KOH/g.

It is particularly preferable that the binder component (a1) contain a hydroxy-containing polyester resin (a1-3(d)) in view of improving the smoothness and distinctness of image of the coating film. The proportion of the hydroxy-containing acrylic resin emulsion (a1-1(d)) to the hydroxy-containing polyester resin (a1-3(d)) in this case is in the range of about 10:90 to 90:10 by mass %, and preferably 20:80 to 80:20 by mass, relative to the total solids content of the hydroxy-containing acrylic resin emulsion (a1-1(d)) and the hydroxy-containing polyester resin (a1-3(d)).

Hydroxy-Containing Polyester Resin (a1-3(d))

The type, amount, etc., of hydroxy-containing polyester resin (a1-2) described in the first embodiment can be used for the hydroxy-containing polyester resin (a1-3(d)).

Crosslinking Agent

In addition to the film-forming resin, a crosslinking agent can also be used as the binder component (a1). When a crosslinking agent is used as a part of the binder component (a1), the film-forming resin may generally be a resin (base resin) that has a crosslinkable functional group, such as a hydroxy, carboxy, or epoxy group, and that can react with the crosslinking agent to thereby form a crosslinked coating.

As such crosslinking agents, those mentioned in the "Crosslinking agent" item in the first embodiment can be used, for example.

When the aqueous colored coating composition (A) contains a crosslinking agent, the amount thereof is preferably about 5 to 50 mass %, and more preferably about 10 to 40 mass %, relative to 100 parts by mass of the solids content of the binder component (a1), in view of improving the smoothness and water resistance of the resulting multilayer coating film.

Pigment (a2)

The type, amount, etc., of pigment (a2) described in the first embodiment can also be used in this embodiment.

Additives for Coating Compositions

The aqueous colored coating composition (A) may contain, if necessary, additives for coating compositions, such as thickeners, curing catalysts, UV absorbers, light stabilizers, antifoaming agents, plasticizers, surface control agents, and antisettling agents.

As for the type, amount, etc., of such additives for coating compositions, those described in the first embodiment can be used. The conditions of the preparation method and coating method of the aqueous colored coating composition (A) described in the first embodiment can also be used in this embodiment, except that the binder component (a1) contains the hydroxy-containing acrylic resin emulsion (a1-1(d)) and the blocked isocyanate-containing urethane resin emulsion (a1-2(d)).

Steps (2) to (4)

As for the coating compositions, coating method, heating method, etc., used in steps (2) to (4), the conditions described in the first embodiment can also be used in this embodiment.

In the method for forming a multilayer coating film according to the present invention, even when the preheating process after application of the aqueous colored coating composition (A) is omitted, and the effect pigment-containing aqueous coating composition (B) is applied to the colored coating film containing a large amount of solvent, a multilayer coating film having excellent smoothness, distinctness of image, and water resistance can be formed. This is presumably because the use of the aqueous colored coating composition (A) comprising the hydroxy-containing acrylic resin emulsion (a1-1 (d)) and the blocked isocyanate-containing urethane resin emulsion (a1-2 (d)) inhibits swelling of the resulting colored coating film due to water and organic solvents. Moreover, the application of the effect pigment-containing aqueous coating composition (B) comprising a large amount of effect pigment to a thin film thickness results in the formation of a thin film, in which the effect pigment is present at a high density, on the colored coating film, making it difficult for the solvent in the colored coating film to move into the effect coating film. Furthermore, it is difficult for the water in the colored coating film to move into the effect coating film, because the effect pigment-containing aqueous coating composition (B) comprises a relatively large amount of hydrophobic solvent (b3). For these reasons, the formation of a mixed layer from the aqueous colored coating composition (A) and the effect pigment-containing aqueous coating composition (B) is prevented. In addition, the reacted blocked isocyanate group in the blocked isocyanate-containing urethane resin emulsion (a1-2 (d)) enhances the curability of the colored coating film, and improves adhesion to the effect coating film, thus forming a multilayer coating film having excellent chipping resistance.

EXAMPLES

The present invention will be described in more detail below with reference to Examples and Comparative Examples. However, the present invention is not limited to these Examples. Note that "parts" and "%" are expressed on a mass basis.

Production of Hydroxy-Containing Acrylic Resin (a1-1 (a))

Production Example A1

128 parts of deionized water and 2 parts of Adekaria Soap SR-1025 (product name, produced by ADEKA, emulsifier, active ingredient 25%) were placed into a reaction vessel equipped with a thermometer, a thermostat, a stirring device, a reflux condenser, a nitrogen gas introducing pipe, and a dropping funnel, stirred and mixed in nitrogen flow, and heated to 80° C.

Subsequently, 1% of the total amount of a monomer emulsion (1(a)) described below, and 5.3 parts of a 6% ammonium persulfate aqueous solution were introduced into the reaction vessel, and maintained therein at 80° C. for 15 minutes. Thereafter, the remaining monomer emulsion (1(a)) was added dropwise over 3 hours to the reaction vessel maintained at the same temperature. After completion of the dropwise addition, the mixture was aged for 1 hour. Subsequently, a monomer emulsion (2(a)) described below was added dropwise to the reaction vessel over 1 hour, followed by aging for 1 hour. Thereafter, the mixture was cooled to 30° C. while gradually adding 40 parts of a 5% 2-(dimethylamino)ethanol aqueous solution thereto, and filtered through a 100-mesh nylon cloth, thereby obtaining a water-dispersible hydroxy-containing acrylic resin water dispersion (a1-1-1(a)) having an average particle size of 100 nm and a solids content of 30%. The obtained water-dispersible hydroxy-containing acrylic resin had an acid value of 33 mg KOH/g, and a hydroxy value of 25 mg KOH/g.

Monomer emulsion (1(a)): 40 parts of deionized water, 2.8 parts of Adekaria Soap SR-1025, 2.1 parts of methylene bisacrylamide, 2.8 parts of styrene, 16.1 parts of methyl methacrylate, 28 parts of ethyl acrylate, and 21 parts of n-butyl acrylate were mixed and stirred, thereby obtaining the monomer emulsion (1(a)).

Monomer emulsion (2(a)): 17 parts of deionized water, 1.2 parts of Adekaria Soap SR-1025, 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, thereby obtaining the monomer emulsion (2(a)).

Production Example A2

35 parts of propylene glycol monopropyl ether was placed into a reaction vessel equipped with a thermometer, a thermostat, a stirring device, a reflux condenser, a nitrogen gas introducing pipe, and a dropping funnel, and heated to 85° C. Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise thereto over 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over 1 hour. After completion of the dropwise addition, the mixture was aged for 1 hour. 7.4 parts of diethanolamine was further added thereto, thereby obtaining a hydroxy-containing acrylic resin solution (a1-1-2(a)) having a solids content of 55%. The obtained hydroxy-containing acrylic resin had an acid value of 47 mg KOH/g, and a hydroxy value of 72 mg KOH/g.

Production of Hydroxy-Containing Polyester Resin (a1-2)

Production Example A3

109 parts of trimethylolpropane, 141 parts of 1,6-hexanediol, 126 parts of 1,2-cyclohexanedicarboxylic acid anhydride, and 120 parts of adipic acid were placed into a reaction vessel equipped with a thermometer, a thermostat, a stirring device, a reflux condenser, and a water separator. The mixture was heated to a range of 160 to 230° C. over 3 hours, followed by a condensation reaction at 230° C. for 4 hours while distilling off the resulting condensation water via the water separator. Subsequently, to introduce a carboxy group to the obtained condensation reaction product, 38.3 parts of trimellitic anhydride was added to the product, followed by a reaction at 170° C. for 30 minutes. Thereafter, the product was diluted with ethylene glycol monobutyl ether, thereby obtaining a hydroxy-containing polyester resin solution (a1-2-1(a)) having a solids concentration of 70%. The obtained hydroxy-containing polyester resin had an acid value of 46 mg KOH/g, a hydroxy value of 150 mg KOH/g, and a number average molecular weight of 1,400. In the composition of raw materials, the total content of alicyclic polybasic acid in the acid component was 46 mol % relative to the total amount of the acid component.

Production of Pigment Dispersion

Production Example A4

18 parts (solids content of 10 parts) of the hydroxy-containing acrylic resin solution (a1-1-2(a)) obtained in Production Example A2, 50 parts of JR-806 (product name, produced by TAYCA CORP., rutile titanium dioxide), and 30 parts of deionized water were placed into a stirring and mixing container, and uniformly mixed. Further, 2-(dimethylamino)ethanol was added thereto, and the pH thereof was adjusted to 8.0. Subsequently, the obtained mixed solution was placed into a wide-mouthed glass bottle having a capacity of 225 cc. Glass beads having a diameter of about 1.3 mmϕ were added to the bottle as a dispersion medium, and the bottle was hermetically sealed. The mixture was dispersed for 4 hours by a paint shaker, thereby obtaining a pigment dispersion ((a2-1(a))).

Production Example A5

18 parts (solids content of 10 parts) of the hydroxy-containing acrylic resin solution (a1-1-2(a)) obtained in Production Example A2, 25 parts of Barifine BF-1 (product name, produced by Sakai Chemical Industry Co., Ltd., barium sulfate powder), and 36 parts of deionized water were placed into a stirring and mixing container, and uniformly mixed. Further, 2-(dimethylamino)ethanol was added thereto, and the pH thereof was adjusted to 8.0. Subsequently, the obtained mixed solution was placed into a wide-mouthed glass bottle having a capacity of 225 cc. Glass beads having a diameter of about 1.3 mmϕ were added to the bottle as a dispersion medium, and the bottle was hermetically sealed. The mixture was dispersed for 4 hours by a paint shaker, thereby obtaining a pigment dispersion (a2-2(a)).

Production Example A6

18 parts (solids content of 10 parts) of the hydroxy-containing acrylic resin solution (a1-1-2(a)) obtained in Production Example A2, 10 parts of Mitsubishi Carbon Black MA-100 (product name, produced by Mitsubishi Chemical Corporation, carbon black), and 50 parts of deionized water were placed into a stirring and mixing container, and uniformly mixed. Further, 2-(dimethylamino)ethanol was added thereto, and the pH thereof was adjusted to 8.0. Subsequently, the obtained mixed solution was placed into a wide-mouthed glass bottle having a capacity of 225 cc. Glass beads having a diameter of about 1.3 mmϕ were added to the bottle as a dispersion medium, and the bottle was hermetically sealed. The mixture was dispersed for 4 hours by a paint shaker, thereby obtaining a pigment dispersion (a2-3(a)).

Production of Aqueous Colored Coating Composition (A)

Production Example A7

80 parts of the water-dispersible hydroxy-containing acrylic resin water dispersion (a1-1-1(a)) obtained in Production Example A1, A2 parts of the hydroxy-containing polyester resin solution (a1-2-1(a)) obtained in Production Example A3, 37.5 of Cymel 325 (product name, produced by Japan Cytec Industries, Inc.; melamine resin; solids content: 80%), 157 parts of the pigment dispersion (a2-1(a)) obtained in Production Example A4, and 4 parts of the pigment dispersion (a2-3(a)) obtained in Production Example A6 were uniformly mixed. Further, ACRYSOL ASE-60 (product name, produced by Rohm & Haas Co., polyacrylic acid thickener), 2-(dimethylamino)ethanol, and deionized water were added thereto, thereby obtaining an aqueous colored coating composition (A-1(a)) having a pH of 8.0, a solids concentration of 45%, and a viscosity of 40 seconds as measured by Ford cup No. 4 at 20° C.

Production Examples A8 to 10

Aqueous colored coating compositions (A-2(a)) to (A-4 (a)) were obtained in the same manner as in Production Example A7, except that the formulations shown in Table 1 below were used.

TABLE 1

| | | | | Production Example | | | |
|---|---|---|---|---|---|---|---|
| | | | | A7 | A8 | A9 | A10 |
| | Aqueous colored coating composition (A) | | | A-1(a) | A-2(a) | A-3(a) | A-4(a) |
| Binder component (a1) | Substrate resin | Hydroxy-containing acrylic resin (a1-1(a)) | Water-dispersible hydroxy-containing acrylic resin water dispersion (a1-1-1(a)) | 80 | 80 | 80 | 80 |
| | | Hydroxy- | Hydroxy-containing | 42 | 48 | 31 | 25 |

TABLE 1-continued

|  |  |  | Production Example | | | |
|---|---|---|---|---|---|---|
|  |  |  | A7 | A8 | A9 | A10 |
|  |  | containing polyester resin (a1-2(a)) | polyester resin solution (a1-2-1(a)) | | | |
|  | Crosslinking agent | Melamine resin | Cymel 325 | 37.5 | 37.5 | 37.5 | 37.5 |
| Pigment (a2) | Pigment dispersion (a2-1(a)) | | 157 | 118 | 235 | 39 |
|  | Pigment dispersion (a2-2(a)) | | | | | 189.6 |
|  | Pigment dispersion (a2-3(a)) | | 4 | 4 | 4 | 4 |

Production of Hydroxy-Containing Polyester Resin (b1-2)

Production Example A11

111 parts of trimethylolpropane, 143 parts of 1,6-hexanediol, 50 parts of 1,2-cyclohexanedicarboxylic acid anhydride, 100 parts of isophthalic acid, and 106 parts of adipic acid were placed into a reaction vessel equipped with a thermometer, a thermostat, a stirring device, a reflux condenser, and a water separator. The mixture was heated to a range of 160 to 230° C. over 3 hours, followed by a condensation reaction at 230° C. for 4 hours, while distilling off the resulting condensation water via the water separator. Subsequently, to introduce a carboxy group to the obtained condensation reaction product, 38 parts of trimellitic anhydride was added to the product, followed by a reaction at 170° C. for 30 minutes. Thereafter, the product was diluted with ethylene glycol monobutyl ether, thereby obtaining a hydroxy-containing polyester resin solution (b1-2-1(a)) having a solids concentration of 70%. The obtained hydroxy-containing polyester resins had an acid value of 46 mg KOH/g, a hydroxy value of 151 mg KOH/g, and a number average molecular weight of 1,350. In the composition of raw materials, the total content of alicyclic polybasic acid in the acid component was 17 mol % relative to the total amount of the acid component.

Production of Effect Pigment Dispersion

Production Example A12

In a stirring and mixing container, 22 parts (solids content of 16 parts) of GX-180A (product name, produced by Asahi Kasei Metals Co., Ltd.; aluminium pigment paste; metal content: 74%), 40 parts of 2-ethyl-1-hexanol, 8 parts (solids content of 4 parts) of a phosphoric acid-containing resin solution (see Note 1), and 0.2 parts of 2-(dimethylamino) ethanol were uniformly mixed, thereby obtaining an effect pigment dispersion (b2-1(a)). (Note 1) Phosphoric acid-containing resin solution: A mixed solvent comprising 27.5 parts of methoxypropanol and 27.5 parts of isobutanol was placed into a reaction vessel equipped with a thermometer, a thermostat, a stirrer, a reflux condenser, a nitrogen inlet tube and a dropping funnel, and heated to 110° C. Subsequently, 121.5 parts of a mixture comprising 25 parts of styrene, 27.5 parts of n-butyl methacrylate, 20 parts of branched higher alkyl acrylate (product name: Isostearyl Acrylate, produced by Osaka Organic Chemical Industry, Ltd.), 7.5 parts of 4-hydroxybutyl acrylate, 15 parts of a phosphoric acid-containing polymerizable monomer (see Note 2), 12.5 parts of 2-methacryloyloxy ethyl acid phosphate, 10 parts of isobutanol, and 4 parts of tert-butyl peroxyoctanoate were added to the above mixed solvent over 4 hours. Further, a mixture comprising 0.5 parts of tert-butyl peroxyoctanoate and 20 parts of isopropanol was added dropwise thereto over 1 hour, followed by aging with stirring for 1 hour, thereby obtaining a phosphoric acid-containing resin solution having a solids concentration of 50%. The phosphoric acid-containing resin had an acid value of 83 mg KOH/g based on the phosphoric acid group, a hydroxy value of 29 mg KOH/g, and a weight average molecular weight of 10,000. (Note 2) Phosphoric acid-containing polymerizable monomer: 57.5 parts of monobutyl phosphate and 41 parts of isobutanol were placed into a reaction vessel equipped with a thermometer, a thermostat, a stirrer, a reflux condenser, a nitrogen inlet tube and a dropping funnel, and were heated to 90° C. Subsequently, 42.5 parts of glycidyl methacrylate was added dropwise over 2 hours. After aging for 1 hour with stirring, 59 parts of isopropanol was added thereto, thereby obtaining a phosphoric acid-containing polymerizable monomer solution with a solids concentration of 50%. The resulting monomer had an acid value of 285 mg KOH/g based on the phosphoric acid group.

Production Examples A13 to A21

Effect pigment dispersions (b2-2(a)) to (b2-10(a)) were obtained in the same manner as in Production Example A12 except that the formulations shown in Table 2 below were used.

TABLE 2

|  |  | Production Example | | | | | | | | | |
|---|---|---|---|---|---|---|---|---|---|---|---|
|  |  | A12 | A13 | A14 | A15 | A16 | A17 | A18 | A19 | A20 | A21 |
| Effect pigment dispersion | | b2-1(a) | b2-2(a) | b2-3(a) | b2-4(a) | b2-5(a) | b2-6(a) | b2-7(a) | b2-8(a) | b2-9(a) | b2-10(a) |
| Effect pigment (b2) | GX-180A | 22 | 26 | 30 | 30 | 36 | 17 | 45 | 26 | 26 | 26 |

TABLE 2-continued

| | | Production Example | | | | | | | | | |
|---|---|---|---|---|---|---|---|---|---|---|
| | | A12 | A13 | A14 | A15 | A16 | A17 | A18 | A19 | A20 | A21 |
| Hydrophobic solvent (b3) | 2-Ethyl-1-hexanol | 40 | 40 | 30 | 20 | 40 | 40 | 40 | 20 | 65 | |
| | Ethylene glycol mono-2-ethylhexyl ether | | | | 30 | | | | | | |
| | Ethylene glycol monobutyl ether | | | | | | | | | | 40 |
| Phosphoric acid-containing resin solution | | 8 | 8 | 8 | 8 | 8 | 8 | 8 | 8 | 8 | 8 |
| 2-(Dimethylamino)ethanol | | 0.2 | 0.2 | 0.2 | 0.2 | 0.2 | 0.2 | 0.2 | 0.2 | 0.2 | 0.2 |

Production of Effect Pigment-Containing Aqueous Coating Composition (B)

Production Example A22

100 parts of the water-dispersible hydroxy-containing acrylic resin water dispersion (a1-1-1(a)) obtained in Production Example A1, 51 parts of the polyester resin solution (a1-2-1(a)) obtained in Production Example A3, 70 parts of the effect pigment dispersion (b2-1(a)) obtained in Production Example A12, and 37.5 of Cymel 325 (product name, produced by Japan Cytec Industries, Inc.; melamine resin; solids content: 80%) were uniformly mixed. Further, ACRYSOL ASE-60 (product name, produced by Rohm & Haas Co., polyacrylic acid thickener), 2-(dimethylamino)ethanol, and deionized water were added thereto, thereby obtaining an effect pigment-containing aqueous coating composition (B-1(a)) having a pH of 8.0, a solids concentration of 25%, and a viscosity of 40 seconds as measured by Ford cup No. 4 at 20° C.

Production Examples A23 to A36

Effect pigment-containing aqueous coating compositions (B-2(a)) to (B-15(a)) were obtained in the same manner as in Production Example A22, except that the formulations and the solids concentrations were as shown in Table 3 below.

TABLE 3

| | | | | Production Example | | | | | | | |
|---|---|---|---|---|---|---|---|---|---|---|---|
| | | | | A22 | A23 | A24 | A25 | A26 | A27 | A28 | A29 |
| | Effect pigment-containing aqueous coating composition (B) | | | B-1(a) | B-2(a) | B-3(a) | B-4(a) | B-5(a) | B-6(a) | B-7(a) | B-8(a) |
| Binder component (b1) | Substrate resin | Hydroxy-containing acrylic resin (b1-1(a)) | Water-dispersible hydroxy-containing acrylic resin water dispersion (a1-1-1(a)) | 100 | 100 | 100 | 100 | 100 | 100 | 100 | 100 |
| | | Hydroxy-containing polyester resin (b1-2(a)) | Hydroxy-containing polyester resin solution (a1-2-1(a)) | 51 | 51 | 51 | 51 | | 51 | 51 | 51 |
| | | | Hydroxy-containing polyester resin solution (b1-2-1(a)) | | | | | 51 | | | |
| | Crosslinking agent | Melamine resin | Cymel 325 | 37.5 | 37.5 | 37.5 | 37.5 | 37.5 | 37.5 | 37.5 | 37.5 |
| Effect pigment (b2) | Effect pigment dispersion | | Type | b2-1(a) | b2-2(a) | b2-2(a) | b2-2(a) | b2-2(a) | b2-2(a) | b2-2(a) | b2-3(a) |
| | | | Amount | 70 | 74 | 74 | 74 | 74 | 74 | 74 | 68 |
| Solids concentration [%] | | | | 25 | 19 | 22 | 25 | 25 | 28 | 32 | 26 |

| | | | | Production Example | | | | | | |
|---|---|---|---|---|---|---|---|---|---|---|
| | | | | A30 | A31 | A32 | A33 | A34 | A35 | A36 |
| | Effect pigment-containing aqueous coating composition (B) | | | B-9(a) | B-10(a) | B-11(a) | B-12(a) | B-13(a) | B-14(a) | B-15(a) |
| Binder component (b1) | Substrate resin | Hydroxy-containing | Water-dispersible | 100 | 100 | 100 | 100 | 100 | 100 | 100 |

TABLE 3-continued

| | | | | | | | | | | |
|---|---|---|---|---|---|---|---|---|---|---|
| | | acrylic resin (b1-1(a)) | hydroxy-containing acrylic resin water dispersion (a1-1-1(a)) | | | | | | | |
| | | Hydroxy-containing polyester resin (b1-2(a)) | Hydroxy-containing polyester resin solution (a1-2-1(a)) | 51 | 51 | 51 | 51 | 51 | 51 | 51 |
| | | | Hydroxy-containing polyester resin solution (b1-2-1(a)) | | | | | | | |
| | Crosslinking agent | Melamine resin | Cymel 325 | 37.5 | 37.5 | 37.5 | 37.5 | 37.5 | 37.5 | 37.5 |
| Effect pigment (b2) | Effect pigment dispersion | | Type | b2-4(a) | b2-5(a) | b2-6(a) | b2-7(a) | b2-8(a) | b2-9(a) | b2-10(a) |
| | | | Amount | 88 | 84 | 65 | 93 | 54 | 99 | 74 |
| | | Solids concentration [%] | | 24 | 25 | 25 | 25 | 25 | 25 | 25 |

Preparation of Test Plate 1

The aqueous colored coating compositions (A-1(a)) to (A-4(a)) obtained in Production Examples A7 to A10, and the effect pigment-containing aqueous coating compositions (B-1(a)) to (B-15(a)) obtained in Production Examples A22 to A36 were used in the following manner to prepare test plates. Evaluation tests were then performed.

Preparation of Test Substrate to be Coated 1

A cationic electrodeposition coating composition (product name Electron GT-10, produced by Kansai Paint Co., Ltd.) was applied to a cold-rolled steel plate treated with zinc phosphate by electrodeposition to a film thickness of 20 μm when cured, and cured by heating at 170° C. for 30 minutes, thereby preparing a test substrate to be coated.

Example A1

The aqueous colored coating composition (A-1(a)) obtained in Production Example A7 was electrostatically applied to the test substrate to a film thickness of 20 μm when cured using a rotary atomizing electrostatic coating machine, and then allowed to stand for 3 minutes. Next, the effect pigment-containing aqueous coating composition (B-1(a)) obtained in Production Example A22 was electrostatically applied to the uncured colored coating film to a film thickness of 12 μm when cured using a rotary atomizing electrostatic coating machine, then allowed to stand for 2 minutes, and preheated at 80° C. for 3 minutes. Next, an acrylic resin solvent-based top clear coating composition (product name Magicron KINO-1210, produced by Kansai Paint Co., Ltd.; hereinafter sometimes referred to as "clear coating composition (C-1)") was electrostatically applied to the uncured effect coating film to a film thickness of 35 μm when cured, then allowed to stand for 7 minutes, and heated at 140° C. for 30 minutes to simultaneously cure the colored coating film, effect coating film and clear coating film, thereby preparing a test plate.

Examples A2 to A12 and Comparative Examples A1 to A5

Test plates were prepared in the same manner as in Example A1, except that any one of the aqueous colored coating compositions (A-1(a)) to (A-4(a)) shown in Table 4 below was used in place of the aqueous colored coating composition (A-1(a)) obtained in Production Example A7; any one of the effect pigment-containing aqueous coating compositions (B-2(a)) to (B-17(a)) shown in Table 4 below was used in place of the effect pigment-containing aqueous coating composition (B-1(a)) obtained in Production Example A22; and the coating compositions were applied in such a manner that the film thickness, when cured, was as shown in Table 4 below.

Evaluation Test 1

The test plates obtained in Examples A1 to A12 and Comparative Examples A1 to A5 were evaluated according to the following test method. Table 4 shows the evaluation results.

Test Method 1

Smoothness: Smoothness was evaluated based on the Wc values measured by a Wave Scan DOI (product name, produced by BYK Gardner). The smaller the Wc value, the higher the smoothness of the coating surface.

Distinctness of image: Distinctness of image was evaluated based on the Wb values measured by the Wave Scan DOI (product name, produced by BYK Gardner). The smaller the Wb value, the higher the distinctness of image on the coating surface.

Water resistance: The test plates were immersed in water at 40° C. for 240 hours, removed, and dried at 20° C. for 12 hours. Subsequently, cross-cuts reaching the substrate were made in the multilayer coating film on the test plates using a cutter knife to form a grid of 100 squares (2 mm×2 mm). Afterwards, an adhesive cellophane tape was applied to the surface of the grid portion, and abruptly peeled off at 20° C. The condition of the remaining coating film squares was then checked.

A: 100 squares remained, and no small edge chipping of the coating film occurred at the edge of the cut made by the cutter.

B: 100 squares remained, but small edge chipping of the coating film occurred at the edge of the cut made by the cutter.

C: 90 to 99 squares remained.

D: The number of remaining squares was 89 or less.

TABLE 4

| | | Aqueous colored coating composition (A) | | Effect pigment-containing aqueous coating composition (B) | | | | Clear coating composition (C) | | Evaluation result | | |
|---|---|---|---|---|---|---|---|---|---|---|---|---|
| | | | | Content of each component relative to 100 mass parts of binder component (b1) on a solids basis [parts] | | | | | | | | |
| | | Type | Film thickness when cured [μm] | Type | Effect pigment (b2) | Hydrophobic solvent (b3) | Solids concentration [%] | Film thickness when cured [μm] | Type | Film thickness when cured [μm] | Smoothness | Distinctness of image | Water resistance |
| Example | A1 | A-1(a) | 20 | B-1(a) | 16 | 40 | 25 | 12 | C-1(a) | 35 | 7 | 16 | A |
| | A2 | A-1(a) | 20 | B-2(a) | 19 | 40 | 19 | 10 | C-1(a) | 35 | 8 | 14 | A |
| | A3 | A-1(a) | 20 | B-3(a) | 19 | 40 | 22 | 10 | C-1(a) | 35 | 7 | 14 | A |
| | A4 | A-1(a) | 20 | B-4(a) | 19 | 40 | 25 | 10 | C-1(a) | 35 | 6 | 12 | A |
| | A5 | A-1(a) | 20 | B-5(a) | 19 | 40 | 25 | 10 | C-1(a) | 35 | 7 | 14 | A |
| | A6 | A-2(a) | 20 | B-4(a) | 19 | 40 | 25 | 10 | C-1(a) | 35 | 7 | 15 | A |
| | A7 | A-3(a) | 20 | B-4(a) | 19 | 40 | 25 | 10 | C-1(a) | 35 | 7 | 15 | A |
| | A8 | A-1(a) | 20 | B-6(a) | 19 | 40 | 28 | 10 | C-1(a) | 35 | 8 | 15 | A |
| | A9 | A-1(a) | 20 | B-7(a) | 19 | 40 | 32 | 10 | C-1(a) | 35 | 9 | 15 | A |
| | A10 | A-1(a) | 20 | B-8(a) | 22 | 30 | 26 | 9 | C-1(a) | 35 | 6 | 11 | A |
| | A11 | A-4(a) | 20 | B-9(a) | 22 | 50 | 24 | 9 | C-1(a) | 35 | 7 | 14 | A |
| | A12 | A-1(a) | 20 | B-10(a) | 27 | 40 | 25 | 7 | C-1(a) | 35 | 7 | 12 | B |
| Comparative Example | A1 | A-1(a) | 20 | B-11(a) | 13 | 40 | 25 | 15 | C-1(a) | 35 | 10 | 30 | A |
| | A2 | A-1(a) | 20 | B-12(a) | 33 | 40 | 25 | 5 | C-1(a) | 35 | 12 | 25 | D |
| | A3 | A-1(a) | 20 | B-13(a) | 19 | 20 | 25 | 10 | C-1(a) | 35 | 10 | 28 | A |
| | A4 | A-1(a) | 20 | B-14(a) | 19 | 65 | 25 | 10 | C-1(a) | 35 | 12 | 22 | A |
| | A5 | A-1(a) | 20 | B-15(a) | 19 | 0 | 25 | 10 | C-1(a) | 35 | 10 | 30 | A |

Production of Acrylic Resin Emulsion

Production Example B1

130 mass parts of deionized water and 0.52 mass parts of Aqualon KH-10 (product name, surfactant, produced by Dai-Ichi Kogyo Seiyaku Co., Ltd.) were placed into a reaction vessel equipped with a thermometer, a thermostat, a stirrer, a reflux condenser, and a dropping funnel, stirred and mixed in a nitrogen flow, and heated to 80° C. Subsequently, 1% of the total amount of the monomer emulsion (1(b)) described below and 5.3 mass parts of 6% ammonium persulfate solution were introduced into the reaction vessel, and maintained therein at 80° C. for 15 minutes. The remaining monomer emulsion (1(b)) was then added dropwise over 3 hours to the reaction vessel maintained at the same temperature. After completion of the dropwise addition, the mixture was aged for 1 hour. Subsequently, the below-described monomer emulsion (2(b)) was added dropwise to the reaction vessel over 1 hour, followed by aging for 1 hour. Thereafter, the mixture was cooled to 30° C. while gradually adding 40 mass parts of a 5% dimethylethanolamine aqueous solution thereto, and filtered through a 100-mesh nylon cloth, thereby obtaining an acrylic resin emulsion (A) having an average particle size of 100 nm (measured at 20° C. by diluting the mixture with deionized water, using a COULTER N4 submicron particle size distribution analyzer (produced by Beckman Coulter, Inc.)) and a solids concentration of 30%. The obtained acrylic resin had an acid value of 33 mg KOH/g, and a hydroxy value of 25 mg KOH/g.

Monomer emulsion (1(b)): 42 mass parts of deionized water, 0.72 mass parts of Aqualon KH-10, 2.1 mass parts of methylene bisacrylamide, 2.8 mass parts of styrene, 16.1 mass parts of methyl methacrylate, 28 mass parts of ethyl acrylate, and 21 mass parts of n-butyl acrylate were mixed and stirred, thereby obtaining the monomer emulsion (1(b)).

Monomer emulsion (2(b)): 18 mass parts of deionized water, 0.31 mass parts of Aqualon KH-10, 0.03 parts of ammonium persulfate, 5.1 mass parts of methacrylic acid, 5.1 mass parts of 2-hydroxyethyl acrylate, 3 mass parts of styrene, 6 mass parts of methyl methacrylate, 1.8 mass parts of ethyl acrylate, and 9 mass parts of n-butyl acrylate were mixed and stirred, thereby obtaining the monomer emulsion (2(b)).

Production of Polyester Resin Solution

Production Example B2

109 mass parts of trimethylolpropane, 141 mass parts of 1,6-hexanediol, 126 mass parts of 1,2-hexahydrophthalic acid, and 120 mass parts of adipic acid were placed into a reaction vessel equipped with a thermometer, a thermostat, a stirring device, a reflux condenser, and a water separator. The mixture was heated to a range of 160 to 230° C. over 3 hours, followed by a condensation reaction at 230° C. for 4 hours. Subsequently, to introduce a carboxy group to the obtained condensation reaction product, 38.3 mass parts of trimellitic anhydride was added to the product, followed by a reaction at 170° C. for 30 minutes. Thereafter, the product was diluted with ethylene glycol monobutyl ether, thereby obtaining a polyester resin solution having a solids concentration of 70%. The obtained polyester resin had an acid value of 46 mg KOH/g, a hydroxy value of 150 mg KOH/g, and a weight average molecular weight of 6,400. In this specification, the term "weight average molecular weight" refers to a value as determined by gel permeation chromatography (GPC) from the calibration curve of standard polystyrene.

Production of Aqueous Urethane Resin Dispersion

Production Example B3

115.5 parts of polybutylene adipate with a number average molecular weight of 2,000, 115.5 parts of polycaprolactone diol with a number average molecular weight of 2,000, 23.2 parts of dimethylolpropionic acid, 6.5 parts of 1,4-butanediol, and 120.1 parts of isophorone diisocyanate were placed into a reaction vessel equipped with a thermometer, a thermostat, a stirring device, a reflux condenser, and a dropping funnel, stirred and mixed in nitrogen flow, and heated to 85° C. The reaction was carried out for 7 hours, thereby obtaining prepolymer with an NCO content of 4.0%. The prepolymer was then cooled to 50° C., and 165 parts of acetone was added to the mixture and uniformly dissolved. Subsequently, while stirring, 15.7 parts of triethylamine was added to the mixture, and then 600 parts of deionized water was added to the mixture while maintaining the temperature at 50° C. or lower. After maintaining the resulting water dispersion at 50° C. for 2 hours to complete the water extension reaction, the acetone was distilled off under reduced pressure at 70° C.; and the solids content and pH were adjusted to 30% and 8.0, respectively, using triethylamine and deionized water, thereby obtaining an aqueous polyurethane resin dispersion having an acid value of 26 mg KOH/g and an average particle size of 140 nm.

Production of Color Pigment Dispersion

Production Example B4

350 parts of propylene glycol monopropyl ether was placed into a reaction vessel equipped with a thermometer, a thermostat, a stirring device, a reflux condenser, and a dropping funnel, and heated to 115° C. in a nitrogen flow. Subsequently, a solution comprising a mixture obtained by dissolving, in advance, 10 parts of azobisisobutyronitrile in 10 parts of Light Ester PM (product name, produced by Kyoeisha Chemical, Co., Ltd., (2-methacryloyloxy ethyl)acid phosphate) was added dropwise to the below-described monomer mixture over 3 hours. The resulting mixture was further aged for 2 hours while maintaining the temperature. Subsequently, the resulting mixture was neutralized with an equivalent amount of dimethylethanolamine, 450 parts of propylene glycol monopropyl ether was added thereto, and the pH was adjusted to 7.5 using dimethylethanolamine; thereby obtaining an acrylic resin solution having an acid value of 50 mg KOH/g, a hydroxy value of 50 mg KOH/g, a glass transition temperature of 50° C., a weight average molecular weight of 45,000, and a solids content of 55 mass %.
Monomer Mixture

| | |
|---|---|
| Methyl methacrylate | 350 parts |
| N-butyl acrylate | 200 parts |
| 2-Ethylhexyl methacrylate | 250 parts |
| 4-Hydroxybutyl methacrylate | 130 parts |
| Acrylic acid | 2.5 parts |

50 mass parts of TITANIX JR-903 (product name, produced by TAYCA Co., Ltd.; rutile titanium dioxide whose surface has been treated with oxidized aluminum and oxidized zirconium), 9 mass parts of the acrylic resin solution, 45 mass parts of deionized water, and 3.9 parts of AMP-95 (product name, produced by Dow Chemical Co.; 2-amino-2-methyl-1-propanol; active ingredient: 95%) were placed into a 225 ml mayonnaise bottle. Further, 130 mass parts of glass beads having a diameter of 1.5 mm were placed therein, and the bottle was hermetically sealed. The mixture was dispersed for 120 minutes using a shaker-type paint conditioner. After dispersion, the mixture was filtered through a 100-mesh wire screen to remove glass beads, thereby obtaining a color pigment dispersion. The obtained color pigment dispersion was inspected using a grind gauge (method A) to confirm that there were no coarse particles of 10 or more in size.

Preparation of Concentrated Scale-Like Aluminum Pigment Solution

Production Example B7

In a stainless steel beaker, 135 parts of aluminum paste GX-180A (product name, produced by Asahi Kasei Metals, Ltd.; scale-like aluminum pigment paste; solids content: 74 mass %) and 130 mass parts of ethylene glycol monobutyl ether were stirred and mixed, thereby obtaining a concentrated scale-like aluminum pigment solution.

Production of Base Coating Composition 1

Production Example B8

In a stainless steel mixing container equipped with a stirring device, 100 parts of the acrylic resin emulsion obtained in Production Example B1, 50 parts of the polyester resin solution obtained in Production Example B2, 100 parts of the aqueous urethane resin obtained in Production Example B3, 182.5 parts of the color pigment dispersion 1 obtained in Production Example B4, and 37.5 parts of Cymel 325 (product name, produced by Japan Cytec Industries, Inc.; melamine resin; solids content: 80%) were uniformly mixed. Further, Primal ASE-60 (product name, produced by Rohm & Haas Co.; polyacrylic acid thickener), 2-(dimethylamino) ethanol, and deionized water were added thereto, thereby preparing a base coating composition 1 having a pH of 8.0, a coating composition solids content of 25%, and a viscosity of 40 seconds as measured by Ford cup No. 4 at 20° C.; and comprising 65 mass parts of oxide titanium pigment relative to 100 mass parts of resin solids content.

The obtained base coating composition 1 was electrostatically applied to a flat tin plate that has been degreased in advance to a film thickness of 20 μm when cured using a rotary atomizing electrostatic coating machine under the conditions of a temperature of 20° C. and a humidity of 65%. 30 seconds after application, a portion of the coated film was removed by scratching, weighed, and dried at 110° C. for 1 hour. The solids content 30 seconds after application, which was determined by calculating the heating residue, was 55%. Further, the viscosity 30 seconds after application was 70,000 mPa·s when measured under the conditions of a shear rate of 0.1 sec-1 and a temperature of 23° C.

Production of Base Coating Composition 2

Production Example B9

In a stainless steel mixing container equipped with a stirring device, 70 parts of the acrylic resin emulsion obtained in Production Example B1, 35 parts of the polyester resin solution obtained in Production Example B2, 100 parts of the aqueous urethane resin dispersion obtained in Production Example B3, 182.5 parts of the color pigment dispersion 1 obtained in Production Example B4, and 25 parts of Cymel 325 (product name, produced by Japan Cytec Industries, Inc.; melamine resin; solids content: 80%) were uniformly mixed. Further, Primal ASE-60 (product name, produced by Rohm & Haas Co.; polyacrylic acid thickener), 2-(dimethylamino) ethanol, and deionized water were added thereto, thereby preparing a base coating composition 2 having a pH of 8.0, a coating composition solids content of 25%, and a viscosity of 40 seconds as measured by Ford cup No. 4 at 20° C.; and comprising 65 mass parts of oxide titanium pigment relative to 100 mass parts of resin solids content.

The obtained base coating composition 2 was electrostatically applied to a flat tin plate that has been degreased in advance to a film thickness of 20 μm when cured using a rotary atomizing electrostatic coating machine under the conditions of a temperature of 20° C. and a humidity of 65%. 30 seconds after application, a portion of the coated film was removed by scratching, weighed, and dried at 110° C. for 1 hour. The solids content 30 seconds after application, which was determined by calculating the heating residue, was 55%. Further, the viscosity 30 seconds after application was 200,000 mPa·s when measured under the conditions of a shear rate of 0.1 sec-1 and a temperature of 23° C.

Production of Base Coating Composition 3

Production Example B10

In a stainless steel mixing container equipped with a stirring device, 70 parts of the acrylic resin emulsion obtained in Production Example B1, 35 parts of the polyester resin solution obtained in Production Example B2, 100 parts of the aqueous urethane resin dispersion obtained in Production Example B3, 182.5 parts of the color pigment dispersion 1 obtained in Production Example B4, 6 parts of Cymel 325 (product name, produced by Japan Cytec Industries, Inc.; melamine resin; solids content: 80%), and 52 parts of blocked polyisocyanate compound (B3-1) (product name Bayhydrol VPLS 2310, produced by Sumika Bayel Urethane Co., Ltd.; solids content: 38%) were uniformly mixed. Further, Primal ASE-60 (product name, produced by Rohm & Haas Co.; polyacrylic acid thickener), 2-(dimethylamino)ethanol, and deionized water were added thereto, thereby preparing a base coating composition A having a pH of 8.0, a coating composition solids content of 25%, and a viscosity of 40 seconds as measured by Ford cup No. 4 at 20° C.; and comprising 65 mass parts of oxide titanium pigment relative to 100 mass parts of resin solids content.

The obtained base coating composition 3 was electrostatically applied to a flat tin plate that has been degreased in advance to a film thickness of 20 μm when cured using a rotary atomizing electrostatic coating machine under the conditions of a temperature of 20° C. and a humidity of 65%. 30 seconds after application, a portion of the coated film was removed by scratching, weighed, and dried at 110° C. for 1 hour. The solids content 30 seconds after application, which was determined by calculating the heating residue, was 56%. Further, the viscosity 30 seconds after application was 210,000 mPa·s when measured under the conditions of a shear rate of 0.1 sec-1 and a temperature of 23° C.

Production of Base Coating Composition 4

Production Example B11

In a stainless steel mixing container equipped with a stirring device, 75 parts of the acrylic resin emulsion obtained in Production Example B1, 40 parts of the polyester resin solution obtained in Production Example B2, 53.1 mass parts of the concentrated scale-like aluminum pigment solution obtained in Production Example B5, and 37.5 parts of Cymel 325 (product name, produced by Japan Cytec Industries, Inc.; melamine resin; solids content: 80%) were uniformly mixed. Further, Primal ASE-60 (product name, produced by Rohm & Haas Co., polyacrylic acid thickener), 2-(dimethylamino)ethanol, and deionized water were added thereto, thereby preparing a base coating composition 4 having a pH of 8.0, a coating composition solids content of 25%, and a viscosity of 40 seconds as measured by Ford cup No. 4 at 20° C., and comprising 20 mass parts of scale-like aluminum pigment, on a solids basis, relative to 100 mass parts of resin solids content.

Production of Base Coating Composition 5

Production Example B12

In a stainless steel mixing container equipped with a stirring device, 100 parts of the acrylic resin emulsion obtained in Production Example B1, 50 parts of the polyester resin solution obtained in Production Example B2, 31.8 mass parts of the concentrated scale-like aluminum pigment solution obtained in Production Example B5, and 37.5 parts of Cymel 325 (product name, produced by Japan Cytec Industries, Inc.; melamine resin; solids content: 80%) were uniformly mixed. Further, Primal ASE-60 (product name, produced by Rohm & Haas Co., polyacrylic acid thickener), 2-(dimethylamino)ethanol, and deionized water were added thereto, thereby preparing a base coating composition 5 having a pH of 8.0, a coating composition solids content of 25%, and a viscosity of 40 seconds as measured by Ford cup No. 4 at 20° C.; and comprising 12 mass parts of scale-like aluminum pigment, on a solids basis, relative to 100 mass parts of resin solids content.

Preparation of Test Substrate 2

A cationic electrodeposition coating composition (product name Elecron 9400HB, produced by Kansai Paint Co., Ltd., containing an epoxy resin/polyamine-based cationic resin and a blocked polyisocyanate compound as a curing agent) was applied by electrodeposition to a degreased and zinc phosphate-treated steel plate (JIS G 3141, sized 400×300×0.8 mm) to a film thickness of 20 μm when cured, heated at 170° C. for 20 minutes, and cured by crosslinking. The resulting product having an electrodeposition coating film formed thereon was used as a test substrate.

Example B1

The base coating composition 1(b) obtained in Production Example B8 was electrostatically applied to the test substrate prepared in "Preparation of Test Substrate 2" above to a film thickness of 20 μm when cured using a rotary atomizing electrostatic coating machine, and then allowed to stand for 3 minutes. Next, the base coating composition 4(b) obtained in Production Example B11 was electrostatically applied to the uncured base coating composition 1(b) to a film thickness of 7 μm when cured using a rotary atomizing electrostatic coating machine, allowed to stand for 2 minutes, and preheated at 80° C. for 3 minutes. Subsequently, Magicron KINO-1210 (product name, produced by Kansai Paint Co., Ltd.; an acrylic resin solvent-based top clear coating composition) was electrostatically applied to the coating film formed by the uncured base coating composition 4(b) to a film thickness of 35 μm when cured, then allowed to stand for 7 minutes, and heated at 140° C. for 30 minutes to simultaneously cure the coating film formed by the base coating composition 1, the coating film formed by the base coating composition 4, and the clear coating film, thereby preparing a test plate.

Examples B2 to B9 and Comparative Example B1

Test plates were prepared in the same manner as in Example B1, except that the compositions shown in Table 5 were used.

TABLE 5

| | First base coating composition | | | | Second base coating composition | | | | Evaluation | |
|---|---|---|---|---|---|---|---|---|---|---|
| | Coating composition type | Film thickness | Solids content 30 seconds after application (wt %) | Viscosity 30 seconds after application (mpa · s) | Coating composition type | Film thickness | Solids content 30 seconds after application (wt %) | Viscosity 30 seconds after application (mpa · s) | Distinctness of image | Water resistance |
| Example B1 | Base coating composition 1(b) | 20 μm | 55% | 70000 | Base coating composition 4(b) | 10 μm | 29% | 80000 | 14.8 | A |
| Example B2 | Base coating composition 1(b) | 20 μm | 55% | 70000 | Base coating composition 4(b) | 13 μm | 29% | 70000 | 14.7 | A |
| Example B3 | Base coating composition 1(b) | 20 μm | 55% | 70000 | Base coating composition 4(b) | 7 μm | 32% | 90000 | 14.1 | A |
| Example B4 | Base coating composition 2(b) | 20 μm | 55% | 200000 | Base coating composition 4(b) | 10 μm | 29% | 80000 | 13.8 | A |
| Example B5 | Base coating composition 2(b) | 20 μm | 55% | 200000 | Base coating composition 4(b) | 13 μm | 29% | 70000 | 13.6 | A |
| Example B6 | Base coating composition 2(b) | 20 μm | 55% | 200000 | Base coating composition 4(b) | 7 μm | 32% | 90000 | 13.1 | A |
| Example B7 | Base coating composition 3(b) | 20 μm | 55% | 210000 | Base coating composition 4(b) | 10 μm | 29% | 80000 | 13.7 | A |
| Example B8 | Base coating composition 3(b) | 20 μm | 55% | 210000 | Base coating composition 4(b) | 13 μm | 29% | 70000 | 13.5 | A |
| Example B9 | Base coating composition 3(b) | 20 μm | 55% | 210000 | Base coating composition 4(b) | 7 μm | 32% | 90000 | 13.3 | A |
| Comparative Example B1 | Base coating composition 1(b) | 20 μm | 55% | 70000 | Base coating composition 5(b) | 15 μm | 28% | 35000 | 21.2 | A |
| Comparative Example B2 | Base coating composition 1(b) | 20 μm | 55% | 70000 | Base coating composition 5(b) | 15 μm | 28% | 35000 | 22.2 | C |

Comparative Example B2

The base coating composition 1(b) obtained in Production Example B8 was electrostatically applied to the test substrate prepared in "Preparation of Test Substrate 2" above to a film thickness of 20 μm when cured using a rotary atomizing electrostatic coating machine, allowed to stand for 3 minutes, and preheated at 80° C. for 3 minutes. Next, the base coating composition 5(b) obtained in Production Example B12 was electrostatically applied to the coating film formed by the uncured base coating composition 1 to a film thickness of 15 μm when cured using a rotary atomizing electrostatic coating machine, allowed to stand for 2 minutes, and preheated at 80° C. for 3 minutes. Next, Magicron KINO-1210 (product name, produced by Kansai Paint Co., Ltd.; an acrylic resin solvent-based top clear coating composition) was electrostatically applied to the coating film formed by the uncured base coating composition 2 to a film thickness of 35 μm when cured, then allowed to stand for 7 minutes, and heated at 140° C. for 30 minutes to simultaneously cure the coating film formed by the base coating composition 1, the coating film formed by the base coating composition 5, and the clear coating film, thereby preparing a test plate.

Evaluation Test 2

Solids Content and Viscosity 30 Seconds After Application

Table 5 shows the solids content and viscosity 30 seconds after application of the compositions in the preparation of the test plates in Examples B1 to B9 and Comparative Examples B1 and B2.

Test Method 2

Distinctness of image: Distinctness of image was evaluated based on the Wb values measured by a Wave Scan DOI (product name, produced by BYK Gardner). The Wb value is an index of the amplitude of surface roughness at a wavelength of about 0.3 to 1 mm. The smaller the Wb value, the higher the distinctness of image of the coating surface.

Water resistance: The test substrate prepared in "Preparation of Test Substrate 2" was used and tested for water resistance by the same method and evaluation criteria as in the above-described Test Method 1.

Production of Urethane Resin Emulsion (a1-1)

Production Example C1

67.2 parts of UMC (1/1) (produced by Ube Industries, Ltd.; polycarbonate diol comprising 1,6-hexanediol and 1,4-cyclohexanedimethanol as diol components, at a mass ratio of 1,6-hexanediol to 1,4-cyclohexanedimethanol of 1:1) and 4.5 parts of dimethylolbutanoic acid were placed into a reaction vessel equipped with a thermometer, a thermostat, a stirring device, a reflux condenser, and a water separator, and heated to 80° C. while stirring the content. When the temperature reached 80° C., 28.3 parts of dicyclohexylmethane-4,4'-diisocyanate was added dropwise thereto over 1 hour. Subsequently, 29.9 parts of N-methylpyrrolidone was added thereto, and the resulting mixture was then further aged at 80° C. to carry out a urethane-forming reaction. Heating was stopped when the isocyanate value reached 3.0 or less, and 3.27 parts of triethylamine was added to the mixture at 70° C. Subsequently, while maintaining the temperature at 50° C., 200 parts of deionized water was added dropwise to the mixture over 1 hour to disperse the mixture in water, thereby obtaining a urethane resin emulsion (a1-1-1(c)). The obtained urethane resin emulsion (a1-1-1(c)) had a solids content of 30%, a weight average molecular weight of 29,000, an acid value of 21 mg KOH/g, and an average particle size of 100 nm.

Production Examples C2 to C10

Urethane resin emulsions (a1-1-2(c)) to (a1-1-10(c)) were obtained by synthesis in the same manner as in Production Example C1 using the compositions shown in Table 6. Note that (*1) to (*10) in Table 6 refer to the following:
- (*1) UMC (1/1): polycarbonate diol comprising 1,6-hexanediol and 1,4-cyclohexanedimethanol as diol components, at a mass ratio of 1,6-hexanediol to 1,4-cyclohexanedimethanol of 1:1; produced by Ube Industries, Ltd.
- (*2) UMC (3/1): polycarbonate diol comprising 1,6-hexanediol and 1,4-cyclohexanedimethanol as diol components, at a mass ratio of 1,6-hexanediol to 1,4-cyclohexanedimethanol of 3:1; produced by Ube Industries, Ltd.
- (*3) UMC (1/3): polycarbonate diol comprising 1,6-hexanediol and 1,4-cyclohexanedimethanol as diol components, at a mass ratio of 1,6-hexanediol to 1,4-cyclohexanedimethanol of 1:3; produced by Ube Industries, Ltd.
- (*4) UH100: polycarbonate diol comprising 1,6-hexanediol as a diol component; produced by Ube Industries, Ltd.
- (*5) UC100: polycarbonate diol comprising 1,4-cyclohexanedimethanol as a diol component; produced by Ube Industries, Ltd.
- (*6) PEG1000: polyethylene glycol; molecular weight: 1,000; produced by Sanyo Chemical Industries, Ltd.
- (*7) DMPA: dimethylol propionic acid
- (*8) 1,4BD: 1,4-butanediol
- (*9) IPDI: isophorone diisocyanate
- (*10) Hydrogenated MDI: 4,4'-dicyclohexylmethane diisocyanate Production Example C12

The hydroxy-containing acrylic resin solution (a1-1-2(a)) obtained by the method described in Production Example A2 was used as a hydroxy-containing acrylic resin solution (a1-2-2(c)) below.

Production of Hydroxy-Containing Polyester Resin (a1-3(c))

Production Example C13

The hydroxy-containing polyester resin solution (a1-3-1(a)) obtained by the method described in Production Example A3 was used as a hydroxy-containing polyester resin solution (a1-3-1(c)) below.

Production of Pigment Dispersion

Production Example C14

The pigment dispersion (a2-1(a)) obtained in the method described in Production Example A4 was used as a pigment dispersion (a2-1(c)) below.

Production Example C15

The pigment dispersion (a2-2(a)) obtained in the method described in Production Example A5 was used as a pigment dispersion (a2-2(c)) below.

Production Example C16

The pigment dispersion (a2-3(a)) obtained in the method described in Production Example A6 was used as a pigment dispersion (a2-3(c)) below.

TABLE 6

| Production Example | Urethane resin emulsion | UMC (1/1)*1 | UMC (3/1)*2 | UMC (1/3)*3 | UH100 *4 | UC100 *5 | PEG1000 *6 | DMPA *7 | 1,4BD *8 | IPDI *9 | Hydrogenated MDI*10 | Mw | Acid value mg KOH/g | Average particle size nm |
|---|---|---|---|---|---|---|---|---|---|---|---|---|---|---|
| C1 | a1-1-1(c) | 67.2 | | | | | | 4.5 | | | 28.3 | 29000 | 21 | 100 |
| C2 | a1-1-2(c) | 67.0 | | | | | | 4.4 | | | 28.6 | 49000 | 21 | 100 |
| C3 | a1-1-3(c) | 73.1 | | | | | | 4.8 | | | 22.1 | 2700 | 23 | 92 |
| C4 | a1-1-4(c) | | 67.2 | | | | | 4.5 | | | 28.3 | 30000 | 21 | 100 |
| C5 | a1-1-5(c) | | | 67.2 | | | | 4.5 | | | 28.3 | 28000 | 21 | 100 |
| C6 | a1-1-6(c) | | | | 67.2 | | | 4.5 | | | 28.3 | 32000 | 21 | 100 |
| C7 | a1-1-7(c) | | | | | 67.2 | | 4.5 | | | 28.3 | 31000 | 21 | 100 |
| C8 | a1-1-8(c) | 58.5 | | | | | | 4.5 | 7.7 | | 29.3 | 31000 | 21 | 100 |
| C9 | a1-1-9(c) | 37.0 | | | | | 30.2 | 4.5 | | | 28.3 | 27000 | 21 | 100 |
| C10 | a1-1-10(c) | 70.3 | | | | | | 4.7 | | 25.0 | | 25000 | 22 | 95 |

Production of Hydroxy-Containing Acrylic Resin (a1-2(c))

Production Example C11

The water-dispersible hydroxy-containing acrylic resin water dispersion (a1-1-1(a)) produced by the method described in Production Example A1 was used as (a1-2(c)) below.

Production of Aqueous Colored Coating Composition (A)

Production Example C17

100 parts of the urethane resin emulsion (a1-1-1(c)) obtained in Production Example C1, 80 parts of the water-dispersible hydroxy-containing acrylic resin water dispersion (a1-2-1(c)) obtained in Production Example C11, 20 parts of the hydroxy-containing polyester resin solution (a1-3-1(c)) obtained in Production Example C13, 25 parts of Cymel 325

(product name, produced by Japan Cytec Industries, Inc.; melamine resin; solids content: 80%), 157 parts of the pigment dispersion (a2-1(c)) obtained in Production Example C14, and 4 parts of the pigment dispersion (a2-3(c)) obtained in Production Example C16 were uniformly mixed. Further, ACRYSOL ASE-60 (product name, produced by Rohm & Haas Co.; polyacrylic acid thickener), 2-(dimethylamino) ethanol, and deionized water were added thereto, thereby obtaining an aqueous colored coating composition (A-1(c)) having a pH of 8.0, a solids concentration of 45%, and a viscosity of 40 seconds as measured by Ford cup No. 4 at 20° C.

Production Examples C18 to C28

Aqueous colored coating compositions (A-2(c)) to (A-12(c)) were obtained in the same manner as in Production Example C17, except that the formulations shown in Table 7 were used.

Production of Effect Pigment Dispersion

Production Examples C30 to C39

The effect pigment dispersions (b2-1(a)) to (b2-10(a)) obtained by the method described in Production Examples A12 to A21 were used as effect pigment dispersions (b2-1(c)) to (b2-10(c)) below.

Production of Effect Pigment-Containing Aqueous Coating Composition (B)

Production Examples C40 to C54

The effect pigment-containing aqueous coating compositions (B-1(a)) to (B-15(a)) obtained by the method described in Production Examples A22 to A36 were used as effect pigment-containing aqueous coating compositions (B-1(c)) to (B-15(c)) below.

TABLE 7

| | Production Example | | | | | | | | | | | |
|---|---|---|---|---|---|---|---|---|---|---|---|---|
| | C17 | C18 | C19 | C20 | C21 | C22 | C23 | C24 | C25 | C26 | C27 | C28 |
| Aqueous colored coating compositions (A) | A-1(c) | A-2(c) | A-3(c) | A-4(c) | A-5(c) | A-6(c) | A-7(c) | A-8(c) | A-9(c) | A-10(c) | A-11(c) | A-12(c) |
| Urethane resin emulsion (a1-1-1(c)) | 100 | | | | | | | | | | 100 | 67 |
| Urethane resin emulsion (a1-1-2(c)) | | 100 | | | | | | | | | | |
| Urethane resin emulsion (a1-1-3(c)) | | | 100 | | | | | | | | | |
| Urethane resin emulsion (a1-1-4(c)) | | | | 100 | | | | | | | | |
| Urethane resin emulsion (a1-1-5(c)) | | | | | 100 | | | | | | | |
| Urethane resin emulsion (a1-1-6(c)) | | | | | | 100 | | | | | | |
| Urethane resin emulsion (a1-1-7(c)) | | | | | | | 100 | | | | | |
| Urethane resin emulsion (a1-1-8(c)) | | | | | | | | 100 | | | | |
| Urethane resin emulsion (a1-1-9(c)) | | | | | | | | | 100 | | | |
| Urethane resin emulsion (a1-1-10(c)) | | | | | | | | | | 100 | | |
| Hydroxy-containing acrylic resin water dispersion (a1-2-1(c)) | 80 | 80 | 80 | 80 | 80 | 80 | 80 | 80 | 80 | 80 | 80 | 100 |
| Hydroxy-containing polyester resin solution (a1-3-1(c)) | 20 | 20 | 20 | 20 | 20 | 20 | 20 | 20 | 20 | 20 | 20 | 20 |
| Cymel 325 | 25 | 25 | 25 | 25 | 25 | 25 | 25 | 25 | 25 | 25 | 25 | 30 |
| Pigment dispersion (a2-1(c)) | 157 | 157 | 157 | 157 | 157 | 157 | 157 | 157 | 157 | 157 | 39 | 157 |
| Pigment dispersion (a2-2(c)) | | | | | | | | | | | 190 | |
| Pigment dispersion (a2-3(c)) | 4 | 4 | 4 | 4 | 4 | 4 | 4 | 4 | 4 | 4 | 4 | 4 |

Production of Hydroxy-Containing Polyester Resin (b1-2)

Production Example C29

The hydroxy-containing polyester resin solution (b1-2-1(a)) obtained by the method described in Production Example A11 was used as a hydroxy-containing polyester resin solution (b1-2-1(c)) below.

Preparation of Test Plate 3

The aqueous colored coating composition (A-1(c)) to (A-12(c)) obtained in Production Examples C17 to C28 and the effect pigment-containing aqueous coating compositions (B-1(c)) to (B-15(c)) obtained in Production Examples C40 to C54 were used to prepare test plates. Evaluation tests were then performed.

Examples C1 to C21 and Comparative Examples C1 to C9

Test plates were prepared in the same manner as in "Preparation of Test Substrate to be Coated 1" and Example A1 described above, except that the aqueous colored coating compositions (A-1(c)) to (A-12(c)) obtained in Production Examples C17 to C28, and the effect pigment-containing aqueous coating compositions (B-1(c)) to (B-15(c)) obtained in Production Examples C40 to C54 were used; and that the coating compositions were applied in such a manner that the film thickness when cured was as shown in Table 8 below.

Evaluation Test 3 and Test Method 3

The test plates obtained in the above Examples C1 to C21 and Comparative Examples C1 to C5 were evaluated for smoothness, distinctness of image, and water resistance by the method described in Test Method 1 above. Table 8 shows the evaluation results.

a reflux condenser, a nitrogen gas introducing pipe, and a dropping funnel, stirred and mixed in nitrogen flow, and then heated to 80° C. Subsequently, 5% of the total amount of a monomer emulsion (1-1(d)) described below, and 2.5 parts of a 6% ammonium persulfate aqueous solution were introduced into the reaction vessel, and maintained therein at 80° C. for 15 minutes. Thereafter, the remaining monomer emulsion (1-1(d)) was added dropwise over 3 hours to the reaction vessel maintained at the same temperature. After completion of the dropwise addition, the mixture was aged for 1 hour. Subsequently, the below-described monomer emulsion (2-1(d)) was added dropwise to the reaction vessel over 1 hour, followed by aging for 1 hour. Thereafter, the mixture was cooled to 30° C. while gradually adding 3.8 parts of a 5% 2-(dimethylamino)ethanol aqueous solution thereto, and filtered through a 100-mesh nylon cloth, thereby obtaining a hydroxy-containing acrylic resin emulsion (a1-1-1(d)) having an average particle size of 100 nm and a solids content of

TABLE 8

| | | Aqueous colored coating composition (A) | | Effect pigment-containing aqueous coating composition (B) | | | | | Clear coating composition (C) | | Evaluation result | | |
|---|---|---|---|---|---|---|---|---|---|---|---|---|---|
| | | | | | Content of each component relative to 100 mass parts of binder component (b1) on a solids basis [parts] | | | | | | | | |
| | | Type | Film thickness when cured [μm] | Type | Effect pigment (b2) | Hydrophobic solvent (b3) | Solids concentration [%] | Film thickness when cured [μm] | Type | Film thickness when cured [μm] | Smoothness | Distinctness of image | Water resistance |
| Example | C1 | A-1(c) | 20 | B-1(c) | 16 | 40 | 25 | 12 | C-1(c) | 35 | 6 | 15 | A |
| | C2 | A-1(c) | 20 | B-2(c) | 19 | 40 | 19 | 10 | C-1(c) | 35 | 7 | 14 | A |
| | C3 | A-1(c) | 20 | B-3(c) | 19 | 40 | 22 | 10 | C-1(c) | 35 | 6 | 13 | A |
| | C4 | A-1(c) | 20 | B-4(c) | 19 | 40 | 25 | 10 | C-1(c) | 35 | 5 | 12 | A |
| | C5 | A-1(c) | 20 | B-5(c) | 19 | 40 | 25 | 10 | C-1(c) | 35 | 6 | 13 | A |
| | C6 | A-1(c) | 20 | B-6(c) | 19 | 40 | 28 | 10 | C-1(c) | 35 | 7 | 14 | A |
| | C7 | A-1(c) | 20 | B-7(c) | 19 | 40 | 32 | 10 | C-1(c) | 35 | 8 | 14 | A |
| | C8 | A-1(c) | 20 | B-8(c) | 22 | 30 | 26 | 9 | C-1(c) | 35 | 5 | 11 | A |
| | C9 | A-1(c) | 20 | B-9(c) | 22 | 50 | 24 | 9 | C-1(c) | 35 | 6 | 13 | A |
| | C10 | A-1(c) | 20 | B-10(c) | 27 | 40 | 25 | 7 | C-1(c) | 35 | 6 | 12 | B |
| | C11 | A-2(c) | 20 | B-4(c) | 19 | 40 | 25 | 10 | C-1(c) | 35 | 5 | 12 | A |
| | C12 | A-3(c) | 20 | B-4(c) | 19 | 40 | 25 | 10 | C-1(c) | 35 | 6 | 14 | A |
| | C13 | A-4(c) | 20 | B-4(c) | 19 | 40 | 25 | 10 | C-1(c) | 35 | 5 | 12 | A |
| | C14 | A-5(c) | 20 | B-4(c) | 19 | 40 | 25 | 10 | C-1(c) | 35 | 6 | 13 | A |
| | C15 | A-6(c) | 20 | B-4(c) | 19 | 40 | 25 | 10 | C-1(c) | 35 | 6 | 13 | A |
| | C16 | A-7(c) | 20 | B-4(c) | 19 | 40 | 25 | 10 | C-1(c) | 35 | 7 | 13 | A |
| | C17 | A-8(c) | 20 | B-4(c) | 19 | 40 | 25 | 10 | C-1(c) | 35 | 5 | 12 | A |
| | C18 | A-9(c) | 20 | B-4(c) | 19 | 40 | 25 | 10 | C-1(c) | 35 | 6 | 13 | A |
| | C19 | A-10(c) | 20 | B-4(c) | 19 | 40 | 25 | 10 | C-1(c) | 35 | 6 | 13 | A |
| | C20 | A-11(c) | 20 | B-4(c) | 19 | 40 | 25 | 10 | C-1(c) | 35 | 5 | 12 | A |
| | C21 | A-12(c) | 20 | B-4(c) | 19 | 40 | 25 | 10 | C-1(c) | 35 | 5 | 12 | A |
| Comparative example | C1 | A-1(c) | 20 | B-11(c) | 13 | 40 | 25 | 15 | C-1(c) | 35 | 10 | 30 | A |
| | C2 | A-1(c) | 20 | B-12(c) | 33 | 40 | 25 | 5 | C-1(c) | 35 | 12 | 25 | D |
| | C3 | A-1(c) | 20 | B-13(c) | 19 | 20 | 25 | 10 | C-1(c) | 35 | 10 | 28 | A |
| | C4 | A-1(c) | 20 | B-14(c) | 19 | 65 | 25 | 10 | C-1(c) | 35 | 12 | 22 | A |
| | C5 | A-1(c) | 20 | B-15(c) | 19 | 0 | 25 | 10 | C-1(c) | 35 | 10 | 30 | A |

Production of Hydroxy-Containing Acrylic Resin Emulsion (a1-1(d))

Production Example D1

120 parts of deionized water and 0.8 parts of Adekaria Soap SR-1025 (product name, produced by ADEKA; emulsifier; active ingredient: 25%) were placed into a reaction vessel equipped with a thermometer, a thermostat, a stirring device, 30%. The obtained hydroxy-containing acrylic resin emulsion had an acid value of 24 mg KOH/g, and a hydroxy value of 11 mg KOH/g.

Monomer emulsion (1-1(d)): 54.0 parts of deionized water, 3.1 parts of Adekaria Soap SR-1025, 31.2 parts of n-butyl acrylate, 31.2 parts of methyl methacrylate, 12.3 parts of styrene, and 2.3 parts of allyl methacrylate were mixed and stirred, thereby obtaining the monomer emulsion (1-1(d)).

Monomer emulsion (2-1(d)): 50.0 parts of deionized water, 1.8 parts of Adekaria Soap SR-1025, 0.04 parts of ammonium persulfate, 9.2 parts of n-butyl acrylate, 4.0 parts of methyl methacrylate, 3.7 parts of styrene, 2.3 parts of 2-hydroxyethyl acrylate, and 3.7 parts of methacrylic acid were mixed and stirred, thereby obtaining the monomer emulsion (2-1(d)).

Production Example D2

An acrylic emulsion (a1-1-2(d)) was synthesized in the same mass as in Production Example D1, except that a monomer emulsion (2-2(d)) was used in place of the monomer emulsion (2-1(d)). A hydroxy-containing acrylic resin emulsion (a1-1-2(d)) having an average particle size of 100 nm, a solids content of 30%, an acid value of 10 mg KOH/g, and a hydroxy value 10.5 mg KOH/g was obtained.

Monomer emulsion (2-2(d)): 50.0 parts of deionized water, 1.8 parts of Adekaria Soap SR-1025, 0.04 parts of ammonium persulfate, 9.2 parts of n-butyl acrylate, 6.1 parts of methyl methacrylate, 3.7 parts of styrene, 2.3 parts of 2-hydroxyethyl acrylate, and 1.6 parts of methacrylic acid were mixed and stirred, thereby obtaining the monomer emulsion (2-2(d)).

Production Example D3

An acrylic emulsion (a1-1-3(d)) was synthesized in the same mass as in Production Example D1, except that a monomer emulsion (2-3(d)) was used in place of the monomer emulsion (2-1(d)). A hydroxy-containing acrylic resin emulsion (a1-1-3(d)) having an average particle size of 100 nm, a solids content of 30%, an acid value of 0.65 mg KOH/g, and a hydroxy value of 11 mg KOH/g was obtained.

Monomer emulsion (2-3(d)): 50.0 parts of deionized water, 1.8 parts of Adekaria Soap SR-1025, 0.04 parts of ammonium persulfate, 9.2 parts of n-butyl acrylate, 7.7 parts of methyl methacrylate, 3.7 parts of styrene, 2.3 parts of 2-hydroxyethyl acrylate, and 0.1 parts of methacrylic acid were mixed and stirred, thereby obtaining the monomer emulsion (2-3(d)).

Production Example D4

120 parts of deionized water and 0.8 parts of Adekaria Soap SR-1025 (product name, produced by ADEKA; emulsifier; active ingredient: 25%) were placed into a reaction vessel equipped with a thermometer, a thermostat, a stirring device, a reflux condenser, a nitrogen gas introducing pipe, and a dropping funnel, stirred and mixed in nitrogen flow, and heated to 80° C. Subsequently, 5% of the total amount of a monomer emulsion (1-2(d)) described below, and 2.5 parts of a 6% ammonium persulfate aqueous solution were introduced into the reaction vessel, and maintained therein at 80° C. for 15 minutes. Afterward, the remaining monomer emulsion (1-2(d)) was added dropwise over 3 hours to the reaction vessel maintained at the same temperature. After completion of the dropwise addition, the mixture was aged for 1 hour. Thereafter, the mixture was cooled to 30° C. while gradually adding 3.8 parts of a 5% 2-(dimethylamino)ethanol aqueous solution thereto, and filtered through a 100-mesh nylon cloth, thereby obtaining a hydroxy-containing acrylic resin emulsion (a1-1-4(d)) having an average particle size of 100 nm and a solids content of 30%. The obtained water-dispersible hydroxy-containing acrylic resin had an acid value of 24 mg KOH/g and a hydroxy value of 11 mg KOH/g.

Monomer emulsion (1-2(d)): 104.2 parts of deionized water, 4.9 parts of Adekaria Soap SR-1025, 0.04 parts of ammonium persulfate, 37.8 parts of n-butyl acrylate, 37.9 parts of methyl methacrylate, 16.0 parts of styrene, 2.3 parts of allyl methacrylate, 2.3 parts of 2-hydroxyethyl acrylate, and 3.68 parts of methacrylic acid were mixed and stirred, thereby obtaining the monomer emulsion (1-2(d)).

Production of Urethane Resin Emulsion (a1-2(d))

Production Example D5

30.1 parts of hydrogenated MDI and 1.5 parts of methylethylketoxim were placed into a reaction vessel equipped with a thermometer, a thermostat, a stirring device, a reflux condenser, and a water separator, heated to 80° C., and stirred for 1 hour, thereby obtaining an isocyanate reaction product. 64/1 parts of UM90 (1/1) (see (*1) below) and 4.2 parts of dimethylol propionic were placed into a separate vessel, and heated to 80° C. while stirring the content. When the temperature reached 80° C., the isocyanate reaction product was added dropwise thereto over 1 hour. Subsequently, 29.9 parts of N-methylpyrrolidone was added thereto, and the resulting mixture was then further aged at 80° C. to carry out a urethane-forming reaction. Heating was stopped when the isocyanate value reached 3.0 or less, and 2.75 parts of triethylamine was added to the mixture at 70° C. Afterward, while maintaining the temperature at 50° C., 200 parts of deionized water was added dropwise to the mixture over 1 hour to disperse the mixture in water, thereby obtaining a urethane resin emulsion (a1-2-1(d)). The obtained urethane resin emulsion (a1-2-1(d)) had a solids content of 30%, an acid value of 19.9 mg KOH/g, a weight average molecular weight of 11,300, and a particle size of 77 nm as measured by a dynamic light-scattering method.

Production Examples D6 to D18

Urethane resin emulsions (a1-2-2(d)) to (a1-2-14(d)) were obtained by synthesis in the same manner as in Production Example D5 using the compositions shown in Table 9.

Note that (*4) to (*7), (*9) and (*10) in the table are as described above. (*11) to (*14) refer to the following:

(*11) UM90 (1/1): polycarbonate diol comprising 1,4-cyclohexanedimethanol and 1,6-hexanediol as diol components, at a mass ratio of 1,4-cyclohexanedimethanol to 1,6-hexanediol of 1:1; produced by Ube Industries, Ltd.

(*12) UM90 (3/1): polycarbonate diol comprising 1,4-cyclohexanedimethanol and 1,6-hexanediol as diol components, at a mass ratio of 1,4-cyclohexanedimethanol to 1,6-hexanediol of 3:1; produced by Ube Industries, Ltd.

(*13) UM90 (1/3): polycarbonate diol comprising 1,4-cyclohexanedimethanol and 1,6-hexanediol as diol components, at a mass ratio of 1,4-cyclohexanedimethanol to 1,6-hexanediol of 1:3; produced by Ube Industries, Ltd.

(*14) Aminosilane: N-β(aminoethyl)γ-aminopropyltrimethoxysilane

TABLE 9

| Production Example | Urethane resin emulsion (a1-2) | UM90 (1/1) *11 | UM90 (3/1) *12 | UM90 (1/3) *13 | UH 100 *4 | UC 100 *5 | PEG 1000 *6 | DMPA *7 | Hydrogenated MDI *10 |
|---|---|---|---|---|---|---|---|---|---|
| D5  | a1-2-1(d)  | 64.1 |      |      |      |      |      | 4.2 | 30.1 |
| D6  | a1-2-2(d)  | 34.3 |      |      |      |      | 29.8 | 4.2 | 30.1 |
| D7  | a1-2-3(d)  | 55.5 |      |      |      |      |      | 3.7 | 34.2 |
| D8  | a1-2-4(d)  | 66.0 |      |      |      |      |      | 4.4 | 29.2 |
| D9  | a1-2-5(d)  | 64.3 |      |      |      |      |      | 4.3 | 30.2 |
| D10 | a1-2-6(d)  | 63.2 |      |      |      |      |      | 4.2 | 29.8 |
| D11 | a1-2-7(d)  | 62.7 |      |      |      |      |      | 4.2 | 29.5 |
| D12 | a1-2-8(d)  |      | 64.1 |      |      |      |      | 4.2 | 30.1 |
| D13 | a1-2-9(d)  |      |      | 64.1 |      |      |      | 4.2 | 30.1 |
| D14 | a1-2-10(d) |      |      |      | 64.1 |      |      | 4.2 | 30.1 |
| D15 | a1-2-11(d) |      |      |      |      | 64.1 |      | 4.2 | 30.1 |
| D16 | a1-2-12(d) | 67.2 |      |      |      |      |      | 4.5 |      |
| D17 | a1-2-13(d) | 44.4 |      |      |      |      |      | 2.9 | 39.4 |
| D18 | a1-2-14(d) | 66.1 |      |      |      |      |      | 4.4 | 29.2 |

| Production Example | IPDI *9 | Methyl-ethyl-ketoxim | Pyrazole | Diethyl malonate | Amino-silane *14 | Weight average molecular weight | Acid value mg KOH/g |
|---|---|---|---|---|---|---|---|
| D5  |      | 1.5  |     |     |     | 11.3 | 19.9 |
| D6  |      | 1.5  |     |     |     | 12.0 | 19.9 |
| D7  |      | 6.7  |     |     |     | 2.6  | 17.2 |
| D8  |      | 0.4  |     |     |     | 49.3 | 20.5 |
| D9  |      |      | 1.2 |     |     | 11.3 | 19.9 |
| D10 |      |      |     | 2.8 |     | 11.4 | 19.6 |
| D11 |      | 0.0  |     |     | 3.6 | 11.5 | 19.4 |
| D12 |      | 1.5  |     |     |     | 11.3 | 19.9 |
| D13 |      | 1.5  |     |     |     | 11.3 | 19.9 |
| D14 |      | 1.5  |     |     |     | 11.3 | 19.9 |
| D15 |      | 1.5  |     |     |     | 11.3 | 19.9 |
| D16 | 26.8 | 1.6  |     |     |     | 10.8 | 20.8 |
| D17 |      | 13.3 |     |     |     | 1.3  | 13.8 |
| D18 |      | 0.3  |     |     |     | 58.4 | 20.5 |

Production of Hydroxy-Containing Polyester Resin (a1-3)

Production Example D19

The hydroxy-containing polyester resin solution (a1-2-1(a)) obtained in the method described in Production Example A3 above was used as a hydroxy-containing polyester resin solution (a1-3-1(d)) below.

Production of Pigment Dispersion

Production Example D20

The pigment dispersion (a2-1(a)) obtained in the method described in Production Example A4 above was used as a pigment dispersion (a2-1(d)) below.

Production Example D21

The pigment dispersion (a2-2(a)) obtained in the method described in Production Example A5 above was used as a pigment dispersion (a2-2(d)) below.

Production Example D22

The pigment dispersion (a2-3(a)) obtained in the method described in Production Example A6 above was used as a pigment dispersion (a2-3(d)) below.

Production of Aqueous Colored Coating Composition (A)

Production Example D23

100 parts of the urethane resin emulsion (a1-2-1(d)) obtained in Production Example D5, 80 parts of the hydroxy-containing polyester resin emulsion (a1-1-2(d)) obtained in Production Example D2, 20 parts of the hydroxy-containing polyester resin solution (a1-3-1(d)) obtained in Production Example D19, 25 parts of Cymel 325 (product name, produced by Japan Cytec Industries, Inc.; melamine resin; solids content: 80%), 157 parts of the pigment dispersion (a2-1(a)) obtained in Production Example D20, and 4 parts of the pigment dispersion (a2-3(d)) obtained in Production Example D22 were uniformly mixed. Further, ACRYSOL ASE-60 (product name, produced by Rohm & Haas Co.; polyacrylic acid thickener), 2-(dimethylamino)ethanol, and deionized water were added thereto, thereby obtaining an aqueous colored coating composition (A-1(d)) having a pH of 8.0, a solids concentration of 45%, and a viscosity of 40 seconds as measured by Ford cup No. 4 at 20° C.

Production Examples D24 to D42

Aqueous colored coating compositions (A-2(d)) to (A-20 (d)) were obtained in the same manner as in Production Example D23, except that the formulations shown in Table 10 were used.

TABLE 10

| | Production Example | | | | | | | | | |
|---|---|---|---|---|---|---|---|---|---|---|
| | D23 | D24 | D25 | D26 | D27 | D28 | D29 | D30 | D31 | D32 |
| Aqueous colored coating compositions (A) | A-1(d) | A-2(d) | A-3(d) | A-4(d) | A-5(d) | A-6(d) | A-7(d) | A-8(d) | A-9(d) | A-10(d) |
| Urethane resin emulsion (a1-2-1(d)) | 100 | | | | | | | | | |
| Urethane resin emulsion (a1-2-2(d)) | | 100 | | | | | | | | |
| Urethane resin emulsion (a1-2-3(d)) | | | 100 | | | | | | | |
| Urethane resin emulsion (a1-2-4(d)) | | | | 100 | | | | | | |
| Urethane resin emulsion (a1-2-5(d)) | | | | | 100 | | | | | |
| Urethane resin emulsion (a1-2-6(d)) | | | | | | 100 | | | | |
| Urethane resin emulsion (a1-2-7(d)) | | | | | | | 100 | | | |
| Urethane resin emulsion (a1-2-8(d)) | | | | | | | | 100 | | |
| Urethane resin emulsion (a1-2-9(d)) | | | | | | | | | 100 | |
| Urethane resin emulsion (a1-2-10(d)) | | | | | | | | | | 100 |
| Urethane resin emulsion (a1-2-11(d)) | | | | | | | | | | |
| Urethane resin emulsion (a1-2-12(d)) | | | | | | | | | | |
| Urethane resin emulsion (a1-2-13(d)) | | | | | | | | | | |
| Urethane resin emulsion (a1-2-14(d)) | | | | | | | | | | |
| Hydroxy-containing acrylic resin water dispersion (a1-1-1(d)) | | | | | | | | | | |
| Hydroxy-containing acrylic resin water dispersion a1-1-2(d)) | 80 | 80 | 80 | 80 | 80 | 80 | 80 | 80 | 80 | 80 |
| Hydroxy-containing acrylic resin water dispersion (a1-1-3(d)) | | | | | | | | | | |
| Hydroxy-containing acrylic resin water dispersion (a1-1-4(d)) | | | | | | | | | | |
| Hydroxy-containing polyester resin solution (a1-3-1(d)) | 20 | 20 | 20 | 20 | 20 | 20 | 20 | 20 | 20 | 20 |
| Cymel 325 | 25 | 25 | 25 | 25 | 25 | 25 | 25 | 25 | 25 | 25 |
| Pigment dispersion (a2-1(d)) | 157 | 157 | 157 | 157 | 157 | 157 | 157 | 157 | 157 | 157 |

TABLE 10-continued

| Pigment dispersion (a2-2(d)) | | | | | | | | | | |
|---|---|---|---|---|---|---|---|---|---|---|
| Pigment dispersion (a2-3(d)) | 4 | 4 | 4 | 4 | 4 | 4 | 4 | 4 | 4 | 4 |

| | Production Example | | | | | | | | | |
|---|---|---|---|---|---|---|---|---|---|---|
| | D33 | D34 | D35 | D36 | D37 | D38 | D39 | D40 | D41 | D42 |
| Aqueous colored coating compositions (A) | A-11(d) | A-12(d) | A-13(d) | A-14(d) | A-15(d) | A-16(d) | A-17(d) | A-18(d) | A-19(d) | A-20(d) |
| Urethane resin emulsion (a1-2-1(d)) | | | | | 100 | 100 | 100 | 100 | 100 | 67 |
| Urethane resin emulsion (a1-2-2(d)) | | | | | | | | | | |
| Urethane resin emulsion (a1-2-3(d)) | | | | | | | | | | |
| Urethane resin emulsion (a1-2-4(d)) | | | | | | | | | | |
| Urethane resin emulsion (a1-2-5(d)) | | | | | | | | | | |
| Urethane resin emulsion (a1-2-6(d)) | | | | | | | | | | |
| Urethane resin emulsion (a1-2-7(d)) | | | | | | | | | | |
| Urethane resin emulsion (a1-2-8(d)) | | | | | | | | | | |
| Urethane resin emulsion (a1-2-9(d)) | | | | | | | | | | |
| Urethane resin emulsion (a1-2-10(d)) | | | | | | | | | | |
| Urethane resin emulsion (a1-2-11(d)) | 100 | | | | | | | | | |
| Urethane resin emulsion (a1-2-12(d)) | | 100 | | | | | | | | |
| Urethane resin emulsion (a1-2-13(d)) | | | 100 | | | | | | | |
| Urethane resin emulsion (a1-2-14(d)) | | | | 100 | | | | | | |
| Hydroxy-containing acrylic resin water dispersion (a1-1-1(d)) | | | | | | 80 | | | | |
| Hydroxy-containing acrylic resin water dispersion a1-1-2(d)) | 80 | 80 | 80 | 80 | | | | 100 | 80 | 100 |
| Hydroxy-containing acrylic resin water dispersion (a1-1-3(d)) | | | | | | | 80 | | | |
| Hydroxy-containing acrylic resin water dispersion (a1-1-4(d)) | | | | | | | | 80 | | |

TABLE 10-continued

| | | | | | | | | | | |
|---|---|---|---|---|---|---|---|---|---|---|
| Hydroxy-containing polyester resin solution (a1-3-1(d)) | 20 | 20 | 20 | 20 | 20 | 20 | 20 | | 20 | 20 |
| Cymel 325 | 25 | 25 | 25 | 25 | 25 | 25 | 25 | 25 | 25 | 38 |
| Pigment dispersion (a2-1(d)) | 157 | 157 | 157 | 157 | 157 | 157 | 157 | 157 | 39 | 157 |
| Pigment dispersion (a2-2(d)) | | | | | | | | | 190 | |
| Pigment dispersion (a2-3(d)) | 4 | 4 | 4 | 4 | 4 | 4 | 4 | 4 | 4 | 4 |

Production of Hydroxy-Containing Polyester Resin (b1-2)

Production Example D43

The hydroxy-containing polyester resin solution (b1-2-1(a)) obtained in the method described in Production Example A11 above was used as a hydroxy-containing polyester resin solution (b1-2-1(d)) below.

Production of Effect Pigment Dispersion

Production Examples D44 to D53

The effect pigment dispersions (b2-1(a)) to (b2-10(a)) obtained in the methods described in Production Examples A12 to A21 above were used as effect pigment dispersions (b2-1(d)) to (b2-10(d)) below.

Production of Effect Pigment-Containing Aqueous Coating Composition (B)

Production Examples D54 to D68

The effect pigment-containing aqueous coating compositions (B-1(a)) to (B-15(a)) obtained in the methods described in Production Examples A22 to A36 above were used as effect pigment-containing aqueous coating compositions (B-1(d)) to (B-15(d)) below.

Preparation of Test Plate 4

The aqueous colored coating compositions (A-1(d)) to (A-20(d)) obtained in Production Examples D23 to D42, and the effect pigment-containing aqueous coating compositions (B-1(d)) to (B-15(d)) obtained in Production Examples D54 to D68 were used in the following manner to prepare test plates. Evaluation tests were then performed.

Examples D1 to D29 and Comparative Examples D1 to D5

Test plates were prepared in the same manner as in "Preparation of Test Substrate to be Coated 1" and Example A1 described above, except that the aqueous colored coating compositions (A-1(d)) to (A-20(d)) obtained in Production Examples D23 to D42, and the effect pigment-containing aqueous coating compositions (B-1(d)) to (B-15(d)) obtained in Production Examples D54 to D68 were used; and that the coating compositions were applied in such a manner that the film thickness when cured was as shown in Table 11 below.

Evaluation Test 4

The test plates obtained in Examples D1 to D29 and Comparative Examples D1 to D5 were evaluated according to the test method below. Table 11 shows the evaluation results.

Test Method 4

Smoothness: The test plates were measured and evaluated by the method described in Test Method 1 above.

Distinctness of image: Distinctness of image was evaluated based on the Wb values measured by a Wave Scan DOI (product name, produced by BYK Gardner). The smaller the Wa value, the higher the distinctness of image on the coating surface.

Chipping resistance: A test panel was placed on a sample holder of a chipping test device (product name JA-400, produced by Suga Test Instruments Co., Ltd.), and 50 g of crushed granite of No. 7 particle size was blown onto the test plate at an angle of 30° C. with compressed air at 0.392 MPa (4 kgf/cm$^2$) at a distance of 30 cm from the test plate and at a temperature of −20° C. Subsequently, the resulting test plate was washed with water and dried, and a cloth adhesive tape (produced by Nichiban Co., Ltd.) was applied to the coating surface; afterward, the tape was peeled off to visually observe and evaluate the occurrence of the scratches formed on the coating film.

A: Sizes of scratches are small, and the electrodeposition surface and the substrate steel plate are not exposed.

B: Sizes of scratches are small, but the electrodeposition surface and the substrate steel plate are exposed.

C: Sizes of scratches are considerably large, and the substrate steel plate is also largely exposed.

TABLE 11

| | | Aqueous colored coating composition (A) | | Effect pigment-containing aqueous coating composition (B) | | | | Clear coating composition (C) | | Evaluation result | | |
|---|---|---|---|---|---|---|---|---|---|---|---|---|
| | | | | | Content of each component relative to 100 mass parts of binder component (b1) on a solids basis [parts] | | | | | | | |
| | | Type | Film thickness when cured [μm] | Type | Effect pigment (b2) | Hydro-phobic solvent (b3) | Solids concentration [%] | Film thickness when cured [μm] | Type | Film thickness when cured [μm] | Smoothness | Distinctness of image | chipping resistance |
| Example | D1 | A-1(d) | 20 | B-1(d) | 16 | 40 | 25 | 12 | C-1(d) | 35 | 6 | 13 | A |
| | D2 | A-1(d) | 20 | B-2(d) | 19 | 40 | 19 | 10 | C-1(d) | 35 | 5 | 13 | A |
| | D3 | A-1(d) | 20 | B-3(d) | 19 | 40 | 22 | 10 | C-1(d) | 35 | 5 | 10 | A |
| | D4 | A-1(d) | 20 | B-4(d) | 19 | 40 | 25 | 10 | C-1(d) | 35 | 5 | 9 | A |
| | D5 | A-1(d) | 20 | B-5(d) | 19 | 40 | 25 | 10 | C-1(d) | 35 | 6 | 10 | A |
| | D6 | A-1(d) | 20 | B-6(d) | 19 | 40 | 28 | 10 | C-1(d) | 35 | 6 | 8 | A |
| | D7 | A-1(d) | 20 | B-7(d) | 19 | 40 | 32 | 10 | C-1(d) | 35 | 8 | 8 | A |
| | D8 | A-1(d) | 20 | B-8(d) | 22 | 30 | 26 | 9 | C-1(d) | 35 | 6 | 10 | A |
| | D9 | A-1(d) | 20 | B-9(d) | 22 | 50 | 24 | 9 | C-1(d) | 35 | 6 | 9 | A |
| | D10 | A-1(d) | 20 | B-10(d) | 27 | 40 | 25 | 7 | C-1(d) | 35 | 6 | 9 | A |
| | D11 | A-2(d) | 20 | B-4(d) | 19 | 40 | 25 | 10 | C-1(d) | 35 | 6 | 10 | A |
| | D12 | A-3(d) | 20 | B-4(d) | 19 | 40 | 25 | 10 | C-1(d) | 35 | 6 | 13 | A |
| | D13 | A-4(d) | 20 | B-4(d) | 19 | 40 | 25 | 10 | C-1(d) | 35 | 8 | 9 | A |
| | D14 | A-5(d) | 20 | B-4(d) | 19 | 40 | 25 | 10 | C-1(d) | 35 | 5 | 9 | A |
| | D15 | A-6(d) | 20 | B-4(d) | 19 | 40 | 25 | 10 | C-1(d) | 35 | 5 | 10 | A |
| | D16 | A-7(d) | 20 | B-4(d) | 19 | 40 | 25 | 10 | C-1(d) | 35 | 5 | 10 | A |
| | D17 | A-8(d) | 20 | B-4(d) | 19 | 40 | 25 | 10 | C-1(d) | 35 | 5 | 9 | A |
| | D18 | A-9(d) | 20 | B-4(d) | 19 | 40 | 25 | 10 | C-1(d) | 35 | 5 | 9 | A |
| | D19 | A-10(d) | 20 | B-4(d) | 19 | 40 | 25 | 10 | C-1(d) | 35 | 6 | 11 | A |
| | D20 | A-11(d) | 20 | B-4(d) | 19 | 40 | 25 | 10 | C-1(d) | 35 | 6 | 9 | B |
| | D21 | A-12(d) | 20 | B-4(d) | 19 | 40 | 25 | 10 | C-1(d) | 35 | 6 | 10 | A |
| | D22 | A-13(d) | 20 | B-4(d) | 19 | 40 | 25 | 10 | C-1(d) | 35 | 6 | 13 | A |
| | D23 | A-14(d) | 20 | B-4(d) | 19 | 40 | 25 | 10 | C-1(d) | 35 | 9 | 9 | A |
| | D24 | A-15(d) | 20 | B-4(d) | 19 | 40 | 25 | 10 | C-1(d) | 35 | 6 | 15 | A |
| | D25 | A-16(d) | 20 | B-4(d) | 19 | 40 | 25 | 10 | C-1(d) | 35 | 7 | 9 | A |
| | D26 | A-17(d) | 20 | B-4(d) | 19 | 40 | 25 | 10 | C-1(d) | 35 | 8 | 9 | A |
| | D27 | A-18(d) | 20 | B-4(d) | 19 | 40 | 25 | 10 | C-1(d) | 35 | 6 | 9 | A |
| | D28 | A-19(d) | 20 | B-4(d) | 19 | 40 | 25 | 10 | C-1(d) | 35 | 6 | 9 | A |
| | D29 | A-20(d) | 20 | B-4(d) | 19 | 40 | 25 | 10 | C-1(d) | 35 | 6 | 11 | A |
| Comparative Example | D1 | A-1(d) | 20 | B-11(d) | 13 | 40 | 25 | 15 | C-1(d) | 35 | 10 | 20 | A |
| | D2 | A-1(d) | 20 | B-12(d) | 33 | 40 | 25 | 5 | C-1(d) | 35 | 10 | 21 | A |
| | D3 | A-1(d) | 20 | B-13(d) | 19 | 20 | 25 | 10 | C-1(d) | 35 | 10 | 22 | A |
| | D4 | A-1(d) | 20 | B-14(d) | 19 | 65 | 25 | 10 | C-1(d) | 35 | 10 | 20 | A |
| | D5 | A-1(d) | 20 | B-15(d) | 19 | 0 | 25 | 10 | C-1(d) | 35 | 10 | 20 | A |

The invention claimed is:

1. A method for forming a multilayer coating film by sequentially performing the following steps (1) to (4):
   (1) applying an aqueous colored coating composition (A) to a substrate to form an uncured colored coating film;
   (2) applying an effect pigment-containing aqueous coating composition (B) comprising a binder component (b1), an effect pigment (b2), and a hydrophobic solvent (b3) in proportions relative to 100 parts by mass of the solids content of the binder component (b1), of 15 to 30 parts by mass of effect pigment (b2) and 25 to 60 parts by mass of hydrophobic solvent (b3), to the uncured colored coating film formed in step (1), without preheating the uncured colored coating film, to form an uncured effect coating film having a film thickness of 7 to 13 μm when cured;
   (3) applying a clear coating composition (C) to the uncured effect coating film formed in step (2) to form an uncured clear coating film; and
   (4) heating the uncured colored coating film, the uncured effect coating film, and the uncured clear coating film formed respectively in steps (1) to (3) to simultaneously cure these three coating films, wherein the aqueous colored coating composition (A) comprises a binder component (a1) and a pigment (a2), wherein the binder component (a1) comprises a urethane resin emulsion (a1-1(c)) having a weight average molecular weight of 2,000 to 50,000 produced with a polyisocyanate component and a polyol component, as starting materials, wherein the polyisocyanate component comprises alicyclic diisocyanate and the polyol component comprises 50 mass % or more of polycarbonatediol relative to a total amount of the polyol component.

2. The method for forming a multilayer coating film according to claim 1, wherein the effect pigment-containing aqueous coating composition (B) has a solids concentration of 18 to 35 mass %.

3. The method for forming a multilayer coating film according to claim 1, wherein the aqueous colored coating composition (A) comprises titanium dioxide and/or barium sulfate, and a total content of the titanium dioxide and barium sulfate is 50 to 150 parts by mass relative to 100 parts by mass of the solids content of the binder component (a1).

4. The method for forming a multilayer coating film according to claim 1, wherein the binder component (b1)

comprises, as at least a part thereof, a hydroxy-containing polyester resin in which alicyclic polybasic acid content is 20 to 100 mol % relative to a total content of acid components in a starting material thereof.

5. The method for forming a multilayer coating film according to claim 1, wherein the aqueous colored coating composition (A) has a solids content of 45 to 65% thirty seconds after the application thereof, and a viscosity of 50,000 to 500,000 mPa·s thirty seconds after the application thereof measured at 23° C. and a shear rate of 0.1 sec$^{-1}$, when the aqueous colored coating composition (A) is applied at a temperature of 20° C. and humidity of 65% so as to have a coating film thickness of 20 μm when cured.

6. The method for forming a multilayer coating film according to claim 5, wherein a part of a resin component, which is a binder component, of the aqueous colored coating composition (A) is an aqueous urethane resin.

7. The method for forming a multilayer coating film according to claim 1, wherein the polycarbonatediol is obtained by reacting a diol component and a carbonylating agent, the diol component comprises a diol having 6 or more carbon atoms in an amount of 90 mass % or more relative to a total amount of the diol component, and the diol having 6 or more carbon atoms comprises a cycloalkylene group-containing alicyclic diol having 6 or more carbon atoms.

8. The method for forming a multilayer coating film according to claim 1, wherein the pigment (a2) comprises titanium dioxide and/or barium sulfate, and a total content of the titanium dioxide and barium sulfate is 50 to 150 parts by mass relative to 100 parts by mass of the solids content of the binder component (a1).

9. The method for forming a multilayer coating film according to claim 1, wherein the binder component (a1) comprises, as at least a part thereof, a hydroxy-containing acrylic resin emulsion (a1-1(d)) having an acid value of 25 mgKOH/g or less, and a blocked isocyanate-containing urethane resin emulsion (a1-2(d)) produced with, as starting materials, a polyisocyanate component that contains alicyclic diisocyanate and a polyol component that contains 50 mass % or more polycarbonatediol.

10. The method for forming a multilayer coating film according to claim 9, wherein the hydroxy-containing acrylic resin emulsion (a1-1(d)) is a core-shell-type emulsion having a core portion that is a copolymer (I) comprising, as copolymer components, 0.1 to 30 mass % of a polymerizable unsaturated monomer having two or more polymerizable unsaturated groups per molecule and 70 to 99.9 mass % of a polymerizable unsaturated monomer having one polymerizable unsaturated group per molecule, and a shell portion that is a copolymer (II) comprising, as copolymer components, 1 to 40 mass % of a hydroxy-containing polymerizable unsaturated monomer, 1 to 30 mass % of a carboxy-containing polymerizable unsaturated monomer, and 30 to 98 mass % of other polymerizable unsaturated monomers.

11. The method for forming a multilayer coating film according to claim 9, wherein the blocked isocyanate-containing urethane resin emulsion (a1-2(d)) has a weight average molecular weight of 2,000 to 50,000.

12. The method for forming a multilayer coating film according to claim 9, wherein the polycarbonatediol is obtained by reacting a diol component and a carbonylating agent, the diol component comprises a diol having 6 or more carbon atoms in an amount of 90 mass % or more relative to a total amount of the diol component, and the diol having 6 or more carbon atoms comprises a cycloalkylene group-containing alicyclic diol having 6 or more carbon atoms.

13. The method for forming a multilayer coating film according to claim 9, wherein the pigment (a2) comprises titanium dioxide and/or barium sulfate, and a total content of the titanium dioxide and barium sulfate is 50 to 150 parts by mass relative to 100 parts by mass of the solids content of the binder component (a1).

14. An article comprising a coating film formed by the method for forming a multilayer coating film according to claim 1.

* * * * *